United States Patent
Baskaran et al.

(10) Patent No.: US 12,464,346 B2
(45) Date of Patent: Nov. 4, 2025

(54) SLICE-SPECIFIC SECURITY REQUIREMENT INFORMATION

(71) Applicant: Lenovo (Singapore) Pte. Ltd., New Tech Park (SG)

(72) Inventors: Sheeba Backia Mary Baskaran, Friedrichsdorf (DE); Andreas Kunz, Ladenburg (DE); Genadi Velev, Darmstadt (DE)

(73) Assignee: Lenovo (Singapore) Pte. Ltd., Singapore (SG)

( * ) Notice: Subject to any disclaimer, the term of this patent is extended or adjusted under 35 U.S.C. 154(b) by 29 days.

(21) Appl. No.: 18/015,264

(22) PCT Filed: Jul. 8, 2021

(86) PCT No.: PCT/IB2021/056164
§ 371 (c)(1),
(2) Date: Jan. 9, 2023

(87) PCT Pub. No.: WO2022/009156
PCT Pub. Date: Jan. 13, 2022

(65) Prior Publication Data
US 2023/0269589 A1    Aug. 24, 2023

Related U.S. Application Data

(60) Provisional application No. 63/049,549, filed on Jul. 8, 2020.

(51) Int. Cl.
*H04W 12/041* (2021.01)
*H04W 12/033* (2021.01)
*H04W 12/037* (2021.01)

(52) U.S. Cl.
CPC ....... *H04W 12/041* (2021.01); *H04W 12/033* (2021.01); *H04W 12/037* (2021.01)

(58) Field of Classification Search
CPC ............. H04L 41/0894; H04L 63/0272; H04L 63/0428–0492; H04L 63/20; H04W 12/03–037; H04W 12/041; H04W 12/06
See application file for complete search history.

(56) References Cited

U.S. PATENT DOCUMENTS

| | | |
|---|---|---|
| 2019/0141081 A1 | 5/2019 | Kunz et al. |
| 2019/0342082 A1* | 11/2019 | Lei ........................... H04L 9/14 |
| 2023/0232219 A1* | 7/2023 | Mao .................... H04W 12/041 455/411 |

OTHER PUBLICATIONS

PCT/IB2021/056164, "Notification of Transmittal of the International Search Report and the Written Opinion of the International Searching Authority, or the Declaration", International Searching Authority, Sep. 29, 2021, pp. 1-17.

(Continued)

*Primary Examiner* — Kevin Bechtel
(74) *Attorney, Agent, or Firm* — Kunzler Bean & Adamson

(57) ABSTRACT

Apparatuses, methods, and systems are disclosed for determining and enforcing service specific network slice security. One apparatus in a mobile communication network includes processor that performs primary authentication with a mobile communication network and a transceiver that receives a SMC message comprising SSI. The processor applies slice security for control plane and user plane traffic related to a network slice according to a Security Requirement Type indicated in the SSI.

12 Claims, 19 Drawing Sheets

(56) References Cited

OTHER PUBLICATIONS

Lenovo et al., "Update to Solution#6", 3GPP TSG-SA3 Meeting #102bis-e S3-211119, Mar. 1-5, 2021, pp. 1-5.
3GPP, "3rd Generation Partnership Project; Technical Specification Group Services and System Aspects; Study on the security aspects of the next generation system (Release 14)", 3GPP TR 33.899 V1.3.0, Aug. 2017, pp. 1-605.
3GPP, "3rd Generation Partnership Project; Technical Specification Group Services and System Aspects; Service requirements for the 5G system; Stage 1 (Release 17)", 3GPP TS 22.261 V17.2.0, Mar. 2020, pp. 1-83.
3GPP, "3rd Generation Partnership Project; Technical Specification Group Services and System Aspects; System architecture for the 5G System (5GS); Stage 2 (Release 16)", 3GPP TS 23.501 V16.4.0, Mar. 2020, pp. 1-430.
3GPP, "3rd Generation Partnership Project; Technical Specification Group Services and System Aspects; Procedures for the 5G System (5GS); Stage 2 (Release 16)", 3GPP TS 23.502 V16.4.0, Mar. 2020, pp. 1-582.
3GPP, "3rd Generation Partnership Project; Technical Specification Group Services and System Aspects; Security architecture and procedures for 5G system (Release 16)", 3GPP TS 33.501 V16.2.0, Mar. 2020, pp. 1-227.
3GPP, "3rd Generation Partnership Project; Technical Specification Group Radio Access Network; NR; Packet Data Convergence Protocol (PDCP) specification (Release 16)", 3GPP TS 38.323 V16.0.0, Mar. 2020, pp. 1-37.

\* cited by examiner

SLICE-SPECIFIC SECURITY REQUIREMENT INFORMATION

CROSS-REFERENCE TO RELATED APPLICATIONS

This application claims priority to U.S. Provisional Patent Application No. 63/049,549 entitled "NETWORK SLICE SECURITY REQUIREMENT DETERMINATION, ENFORCEMENT AND HANDLING IN 5G SYSTEM" and filed on Jul. 8, 2020 for Sheeba Backia Mary Baskaran, Andreas Kunz and Genadi Velev, which application is incorporated herein by reference.

FIELD

The subject matter disclosed herein relates generally to wireless communications and more particularly relates to network slice security requirement determination, enforcement, and handling in Fifth Generation ("5G") Systems.

BACKGROUND

In a 5G System ("5GS"), an operator network may support different slice(s) to provide operator-provided services, as well as services provided (or controlled) by a third party. Here, the slices in the operator network meet both default operator-provided service (eMBB, URLLC, mIoT, V2X)-based slice requirements and third-party service provider-based slice requirements.

BRIEF SUMMARY

Disclosed are procedures for determining and enforcing service specific network slice security. Said procedures may be implemented by apparatus, systems, methods, or computer program products.

One method of a Unified Data Management ("UDM") function includes receiving a subscription data request message from an Access and Mobility management Function ("AMF"), said request message containing a Subscription Identifier of an authenticated User Equipment ("UE") and a Slice selection Subscription data information element ("IE"). The method includes retrieving Slice-specific Security requirement Information ("SSI") associated with a set of network slices and sending a subscription data response message to the AMF, the response message containing the retrieved SSI.

One method of an AMF includes performing primary authentication with a UE and sending a subscription data request message to a UDM. Here, the subscription data request message contains a Subscription Identifier of the authenticated UE and a Slice selection Subscription data IE. The method includes receiving a subscription data response message from the UDM and enforcing slice security for control plane and user plane traffic related to a network slice according to a Security Requirement Type indicated in the SSI, where the response message contains a set of network slices of the UE and SSI for the network slices.

One method of a UE includes performing primary authentication with a mobile communication network and receiving a Security Mode Command ("SMC") message containing SSI. The method includes applying slice security for control plane and user plane traffic related to a network slice according to a Security Requirement Type indicated in the SSI.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
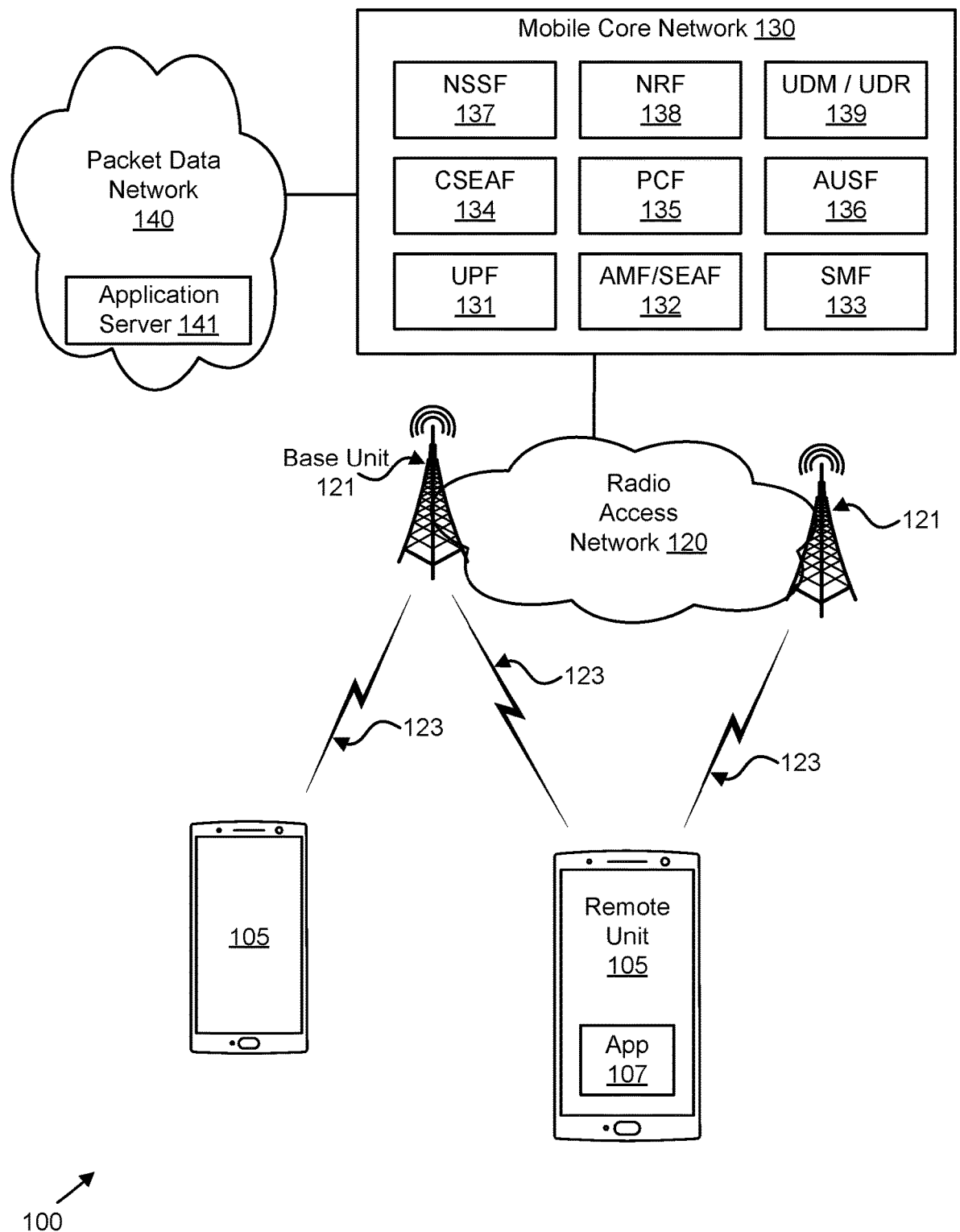
FIG. 1 is a schematic block diagram illustrating one embodiment of a wireless communication system for determining and enforcing service specific network slice security.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects.

For example, the disclosed embodiments may be implemented as a hardware circuit comprising custom very-large-scale integration ("VLSI") circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain or store a program for use by or in connection with an instruction execution system, apparatus, or device.

Code for carrying out operations for embodiments may be any number of lines and may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN"), wireless LAN ("WLAN"), or a wide area network ("WAN"), or the connection may be made to an external computer (for example, through the Internet using an Internet Service Provider ("ISP")).

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C. As used herein, "a member selected from the group consisting of A, B, and C and combinations thereof" includes only A, only B, only C, a combination of A and B, a combination of B and C, a combination of A and C or a combination of A, B and C.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart diagrams and/or block diagrams.

The code may also be stored in a storage device that can direct a computer, other programmable data processing apparatus, or other devices to function in a particular manner, such that the instructions stored in the storage device produce an article of manufacture including instructions which implement the function/act specified in the flowchart diagrams and/or block diagrams.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart diagrams and/or block diagrams.

The flowchart diagrams and/or block diagrams in the Figures illustrate the architecture, functionality, and operation of possible implementations of apparatuses, systems, methods, and program products according to various embodiments. In this regard, each block in the flowchart diagrams and/or block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Generally, the present disclosure describes systems, methods, and apparatus by which network slice security requirements are determined and enforced, and by which security keys are provisioned in 5G system. In certain embodiments, the methods may be performed using computer code embedded on a computer-readable medium. In certain embodiments, an apparatus or system may include a computer-readable medium containing computer-readable code which, when executed by a processor, causes the apparatus or system to perform at least a portion of the below described solutions.

In the Third-Generation Partnership Project ("3GPP") 5G System ("5GS"), an Anchor Key, "Kseaf" is to be generated after successful primary authentication between a UE and the network, irrespective of the slice(s) and related security requirements (e.g., deployments expecting strict slice isolation). The key Kseaf is applied to a common security context (e.g., Kamf and KgNB) for all signaling and all user plane data of a UE. The existing slice-agnostic security (NAS security and AS security) will impact the data privacy of the service offered by the slices (related to third party service) in the following slice deployment scenario (or slice business models).

Primary authentication and key agreement procedures in 5GS enables mutual authentication between the UE and the network and provides keying material that can be used between the UE and the serving network in subsequent security procedures. In certain embodiments, secondary authentication may also be performed, such as network slice-specific authentication.

A UE accessing operator provided service (via operator-controlled slice) and simultaneously accessing a third party service ((Case 1: via a private slice controlled and managed by the third-party service provider where the UE additionally authenticated using secondary authentication for the third part service) or (Case 2: via operator hosted slice where slice access authenticated and authorized by the thirst party authentication, authorization, and accounting ("AAA") Server by means of additional slice authentication). In either case, using of common security context will breach data privacy between the operator and third party when a strict data privacy is required either for the operator service (from the third party) or third-party service (from the operator).

The 5G system comprising an operator network can support different slice(s) to provide operator provided services and third party provided/controlled services. In other words, the slices in the operator network meet both default operator provided service (eMBB, URLLC, mIoT, V2X)-based slice requirements and third-party service provider-based slice requirements. Sometime even the private slice(s) in the operator network can be managed completely by the trusted and authorized third party service provider.

Currently based on the subscription information when required, additional authentication and authorization such as Secondary authentication for access to third party services or private slices (controlled and managed by third party service provider) and slice-specific authentication for specific slices access (managed by third party Slice provider) are done in addition to the primary authentication of the UE. But irrespective of who manages the actual slice in an operator network and privacy requirements of various service offered supported by the slices, the security keys used to protect NAS and AS signaling, and user data remains the same for all traffic that are exchanged between the UE and the network which will lead to the data privacy of slice communication among the Operator and the third party service/slice provider.

The following service requirements specified in 3GPP shows the possible network slice deployment scenario which involves the co-existence of operator and third-party services and related network slice(s) in the operator network (i.e., PLMN).

The 5GS permits the network operator to authorize a third-party to create, modify and delete network slices, subject to an agreement between the third-party and the network operator. Based on operator policy, a 5G network provides suitable means to allow a trusted and authorized third-party to create and modify network slices used for the third-party with appropriate security policies (e.g., user data privacy handling, slices isolation, enhanced logging). The 5G LAN-VN is to be able to verify the identity of a UE requesting to join a specific private communication. The 5GS is to provide suitable means to allow use of a trusted third-party provided encryption between any UE served by a private slice and a core network entity in that private slice.

The 5GS is to provide suitable means to allow use of a trusted and authorized third-party provided integrity protection mechanism for data exchanged between an authorized UE served by a private slice and a core network entity in that private slice. The 5GS is to provide suitable means to allow use of a trusted and authorized third-party provided integrity protection mechanism for data exchanged between an authorized UE served by a non-public network and a core network entity in that non-public network. For a private network using 5G technology, the 5G system shall support network access using identities, credentials, and authentication methods provided and managed by a third-party and supported by 3GPP.

3GPP TS 23.502 Clause 3.1 has the following definitions which clarifies that an AMF set which comprise some AMFs that can serve certain network slice and in such case, this disclosure assumes that different slice based service may need different AMFs or different AMF instances which may or may not belong to a single AMF set:

AMF Region: An AMF Region consists of one or multiple AMF Sets.

AMF Set: An AMF Set consists of some AMFs that serve a given area and Network Slice(s). AMF Set is unique within an AMF Region, and it comprises of AMFs that support the same Network Slice(s). Multiple AMF Sets may be defined per AMF Region. The AMF instances in the same AMF Set may be geographically distributed but have access to the same context data.

The number of simultaneous connection of Network Slice instances per UE is limited by the number of S-NSSAIs in the Requested/Allowed NSSAI. In previous releases of the 3GPP specification it is assumed that in any (home or visited) PLMN it is always possible to select an AMF that can serve any combination of S-NSSAIs that will be provided as an Allowed NSSAI. Based on the Requested NSSAI (if any) and the Subscription Information, the 5GC is responsible for selection of a Network Slice instance(s) to serve a UE including the 5GC Control Plane and User Plane Network Functions corresponding to this Network Slice instance(s).

Network slice instances supporting an S-NSSAI subject to Network Slice-Specific Authentication and Authorization need to be deployed with AMFs supporting Network Slice-Specific Authentication and Authorization, otherwise S-NSSAIs requiring Network Slice-Specific Authentication and Authorization would be incorrectly allowed without execution of Network Slice-Specific Authentication and Authorization.

The main assumption from the above extracts is that a UE can be served using more than one Network Slice Instances for different services through an AMF. As far as 3GPP SA3 is concerned there is only optional secondary authentication (see, e.g., 3GPP TS 33.501 Clause 11.1) and slice-specific authentication exists to allow a UE access to external data network and specific third party-controlled slice respectively and no corresponding slice-specific security isolation solution is specified.

To remedy the above mentioned problems with UE security context handling considering network slice-specific security requirements, the present disclosure describes a common network function ("NF") in the 5G core network ("5GC") that performs new security functionality by determining and enforcing a network slice security requirement (e.g., strict isolation between different slices and/or security domains), as well as controlling key generation and/or provisioning. In certain embodiments, the common network function is embodied in a new network function which can be referred to as any one of the following: a Common Security Anchor Function ("CSEAF"), Security Management Function ("SEMF") or Security Control Function ("SECF"). In other embodiments, the common network function may be implemented by an existing network function that performs new security functionality. Examples of suitable existing NFs include, but are not limited to, an Authentication Server Function ("AUSF"), a Network Slice Selection Function ("NS SF"), a Network Repository Function ("NRF"), or another well-connected NF.

In various embodiments, the common NF (e.g., AUSF, CSEAF, etc.) may be slice agnostic. As used herein, "slice agnostic" refers to the security context being designed to be compatible with different network slices. In certain embodiments, the common NF is located in the serving network. Alternatively, based on the deployment scenario, a common NF may also be located at the home network.

To support security context handling with slice-specific security requirements, the Common NF (i.e., AUSF, CSEAF, etc.) acts as the UE security context storage and control function managing the security context at the serving network which is provided by the home network after a successful authentication. The Common NF controls the security context provision to other NFs such as AMFs, co-located Security Anchor Functions ("SEAFs"), etc. by determining and enforcing the network slice security requirements, such as slice security isolation and slice service data privacy. As used herein, the notation "AMF/SEAF" refers to an AMF having a co-located SEAF.

FIG. 1 depicts a wireless communication system 100 for determining and enforcing service specific network slice security, according to embodiments of the disclosure. In one embodiment, the wireless communication system 100 includes at least one remote unit 105, a radio access network ("RAN") 120, and a mobile core network 130. The RAN 120 and the mobile core network 130 form a mobile communication network. The RAN 120 may be composed of a base unit 121 with which the remote unit 105 communicates using wireless communication links 123. Even though a specific number of remote units 105, base units 121, wireless communication links 123, RANs 120, and mobile core networks 130 are depicted in FIG. 1, one of skill in the art will recognize that any number of remote units 105, base units 121, wireless communication links 123, RANs 120, and mobile core networks 130 may be included in the wireless communication system 100.

In one implementation, the RAN 120 is compliant with the 5G system specified in the Third Generation Partnership Project ("3GPP") specifications. For example, the RAN 120 may be a NG-RAN, implementing NR RAT and/or LTE RAT. In another example, the RAN 120 may include non-3GPP RAT (e.g., Wi-Fi® or Institute of Electrical and Electronics Engineers ("IEEE") 802.11-family compliant WLAN). In another implementation, the RAN 120 is compliant with the LTE system specified in the 3GPP specifications. More generally, however, the wireless communication system 100 may implement some other open or proprietary communication network, for example Worldwide Interoperability for Microwave Access ("WiMAX") or IEEE 802.16-family standards, among other networks. The present disclosure is not intended to be limited to the implementation of any particular wireless communication system architecture or protocol.

In one embodiment, the remote units 105 may include computing devices, such as desktop computers, laptop computers, personal digital assistants ("PDAs"), tablet computers, smart phones, smart televisions (e.g., televisions connected to the Internet), smart appliances (e.g., appliances connected to the Internet), set-top boxes, game consoles, security systems (including security cameras), vehicle on-board computers, network devices (e.g., routers, switches, modems), or the like. In some embodiments, the remote units 105 include wearable devices, such as smart watches, fitness bands, optical head-mounted displays, or the like. Moreover, the remote units 105 may be referred to as the UEs, subscriber units, mobiles, mobile stations, users, access terminals, mobile terminals, fixed terminals, subscriber stations, user terminals, wireless transmit/receive unit ("WTRU"), a device, or by other terminology used in the art. In various embodiments, the remote unit 105 includes a subscriber identity and/or identification module ("SIM") and the mobile equipment ("ME") providing mobile termination functions (e.g., radio transmission, handover, speech encoding and decoding, error detection and correction, signaling and access to the SIM). In certain embodiments, the remote unit 105 may include a terminal equipment ("TE") and/or be embedded in an appliance or device (e.g., a computing device, as described above).

The remote units 105 may communicate directly with one or more of the base units 121 in the RAN 120 via uplink ("UL") and downlink ("DL") communication signals. Furthermore, the UL and DL communication signals may be carried over the wireless communication links 123. Here, the RAN 120 is an intermediate network that provides the remote units 105 with access to the mobile core network 130. As described in greater detail below, the RAN 120 may send a measurement and reporting configuration 111 to the remote unit 105, wherein the remote unit 105 sends a measurement report 113 to the RAN 120.

In some embodiments, the remote units 105 communicate with an application server 141 via a network connection with the mobile core network 130. For example, an application 107 (e.g., web browser, media client, telephone and/or Voice-over-Internet-Protocol ("VoIP") application) in a remote unit 105 may trigger the remote unit 105 to establish a protocol data unit ("PDU") session (or other data connection) with the mobile core network 130 via the RAN 120. The mobile core network 130 then relays traffic between the remote unit 105 and the application server 141 in the packet data network 140 using the PDU session. The PDU session represents a logical connection between the remote unit 105 and the User Plane Function ("UPF") 131.

In order to establish the PDU session (or PDN connection), the remote unit 105 must be registered with the mobile core network 130 (also referred to as "attached to the mobile core network" in the context of a Fourth Generation ("4G") system). Note that the remote unit 105 may establish one or more PDU sessions (or other data connections) with the mobile core network 130. As such, the remote unit 105 may have at least one PDU session for communicating with the packet data network 140. The remote unit 105 may establish additional PDU sessions for communicating with other data networks and/or other communication peers.

In the context of a 5G system ("5GS"), the term "PDU Session" refers to a data connection that provides end-to-end ("E2E") user plane ("UP") connectivity between the remote unit 105 and a specific Data Network ("DN") through the UPF 131. A PDU Session supports one or more Quality of Service ("QoS") Flows. In certain embodiments, there may be a one-to-one mapping between a QoS Flow and a QoS profile, such that all packets belonging to a specific QoS Flow have the same 5G QoS Identifier ("5QI").

In the context of a 4G/LTE system, such as the Evolved Packet System ("EPS"), a Packet Data Network ("PDN") connection (also referred to as EPS session) provides E2E UP connectivity between the remote unit and a PDN. The PDN connectivity procedure establishes an EPS Bearer, i.e., a tunnel between the remote unit 105 and a Packet Gateway ("PGW", not shown) in the mobile core network 130. In certain embodiments, there is a one-to-one mapping between an EPS Bearer and a QoS profile, such that all packets belonging to a specific EPS Bearer have the same QoS Class Identifier ("QCI").

The base units 121 may be distributed over a geographic region. In certain embodiments, a base unit 121 may also be referred to as an access terminal, an access point, a base, a base station, a Node-B ("NB"), an Evolved Node B (abbreviated as eNodeB or "eNB," also known as Evolved Universal Terrestrial Radio Access Network ("E-UTRAN") Node B), a 5G/NR Node B ("gNB"), a Home Node-B, a relay node, a RAN node, or by any other terminology used in the art. The base units 121 are generally part of a RAN, such as the RAN 120, that may include one or more controllers communicably coupled to one or more corresponding base units 121. These and other elements of radio access network are not illustrated but are well known generally by those having ordinary skill in the art. The base units 121 connect to the mobile core network 130 via the RAN 120.

The base units 121 may serve a number of remote units 105 within a serving area, for example, a cell or a cell sector, via a wireless communication link 123. The base units 121 may communicate directly with one or more of the remote units 105 via communication signals. Generally, the base units 121 transmit DL communication signals to serve the remote units 105 in the time, frequency, and/or spatial domain. Furthermore, the DL communication signals may be carried over the wireless communication links 123. The wireless communication links 123 may be any suitable carrier in licensed or unlicensed radio spectrum. The wireless communication links 123 facilitate communication between one or more of the remote units 105 and/or one or more of the base units 121. Note that during NR-U operation, the base unit 121 and the remote unit 105 communicate over unlicensed radio spectrum.

In one embodiment, the mobile core network 130 is a Fifth-Generation Core network ("5GC") or an Evolved Packet Core network ("EPC"), which may be coupled to a packet data network 140, like the Internet and private data networks, among other data networks. A remote unit 105 may have a subscription or other account with the mobile core network 130. In various embodiments, each mobile core network 130 belongs to a single mobile network operator ("MNO"). The present disclosure is not intended to be limited to the implementation of any particular wireless communication system architecture or protocol.

The mobile core network 130 includes several network functions ("NFs"). As depicted, the mobile core network 130 includes at least one UPF 131. The mobile core network 130 also includes multiple control plane ("CP") functions including, but not limited to, an Access and Mobility Management Function ("AMF") 132 that serves the 5G-RAN 115, a Session Management Function ("SMF") 133, a Policy Control Function ("PCF") 135, an Authentication Server Function ("AUSF") 136, a Network Slice Selection Function ("NSSF") 137, a Network Repository Function ("NRF") 138, a Unified Data Management function ("UDM") and a User Data Repository ("UDR"). The depicted mobile core network includes a Common Security Anchor Function ("CSEAF") 134; however, in other embodiments the CSEAF is omitted as a discrete NF and its security functionality implemented by another NF in the mobile core network 140, such as the AUSF 136, the NSSF 137, or the NRF 138.

The UPF(s) 141 is/are responsible for packet routing and forwarding, packet inspection, QoS handling, and external PDU session for interconnecting Data Network ("DN"), in the 5G architecture. The AMF 132 is responsible for termination of Non-Access Stratum ("NAS") signaling, NAS ciphering & integrity protection, registration management, connection management, mobility management, access authentication and authorization, security context management. While FIG. 1 shows a single AMF 132, in other embodiments the mobile core network 130 may include multiple AMFs 132. The SMF 133 is responsible for session management (i.e., session establishment, modification, release), remote unit (i.e., UE) Internet Protocol ("IP") address allocation & management, DL data notification, and traffic steering configuration of the UPF 131 for proper traffic routing.

The CSEAF 134 is a well-connected network function that handles security in the mobile core network 130. In some embodiments, the CSEAF 134 enforces a network slice security requirement (e.g., strict isolation between different slices and/or security domains) and controls security key generation and/or provisioning. The PCF 135 is responsible for unified policy framework, providing policy rules to CP functions, access subscription information for policy decisions in UDR. The AUSF 136 acts as an authentication server and allows the AMF 132 to authenticate the remote unit 105.

The NSSF 137 is responsible for selecting of the Network Slice instances to serve the remote unit 105, for determining the allowed network slice selection assistance information ("NSSAI"), and for determining the set of AMF(s) 132 to be used to serve the remote unit 105. Here, "NSSAI" refers to a vector value including one or more S-NSSAI values. The NRF 138 provides NF service registration and discovery, enabling NFs to identify appropriate services in one another and communicate with each other over Application Programming Interfaces ("APIs").

The UDM is responsible for generation of Authentication and Key Agreement ("AKA") credentials, user identification handling, access authorization, subscription management. The UDR is a repository of subscriber information and can be used to service a number of network functions. For example, the UDR may store subscription data, policy-related data, subscriber-related data that is permitted to be exposed to third party applications, and the like. In some embodiments, the UDM is co-located with the UDR, depicted as combined entity "UDM/UDR" 139.

In various embodiments, the mobile core network 130 may also include a Network Exposure Function ("NEF") (which is responsible for making network data and resources easily accessible to customers and network partners), an Application Function ("AF") (which supports application influence on traffic routing, accessing NEF, interaction with policy framework for policy control, or other NFs defined for the 5GC. In certain embodiments, the mobile core network 130 may include an authentication, authorization, and accounting ("AAA") server.

In various embodiments, the each of the mobile core network 130 supports different types of mobile data connections and different types of network slices, wherein each mobile data connection utilizes a specific network slice. Here, a "network slice" refers to a portion of a core network optimized for a certain traffic type or communication service. A network slice instance may be identified by a single-network slice selection assistance information ("S-NSSAI") while a set of network slices for which the remote unit 105 is authorized to use may be identified by NSSAI. In certain embodiments, the various network slices may include separate instances of network functions, such as the SMF 133 and UPF 131. In some embodiments, the different network slices may share some common network functions, such as the AMF 132. The different network slices are not shown in FIG. 1 for ease of illustration, but their support is assumed.

Although specific numbers and types of network functions are depicted in FIG. 1, one of skill in the art will recognize that any number and type of network functions may be included in the mobile core network 130. Moreover, in an LTE variant where the mobile core network 130 is an EPC, the depicted network functions may be replaced with appropriate EPC entities, such as a Mobility Management Entity ("MME"), a Serving Gateway ("SGW"), a PGW, a Home Subscriber Server ("HSS"), and the like. For example, the AMF 132 may be mapped to an MME, the SMF 133 may be mapped to a control plane portion of a PGW and/or to an MME, the UPF 131 may be mapped to an SGW and a user plane portion of the PGW, the UDM/UDR 139 may be mapped to an HSS, etc.

While FIG. 1 depicts components of a 5G RAN and a 5G core network, the described embodiments for determining and enforcing service specific network slice security apply to other types of communication networks and RATs, including IEEE 802.11 variants, Global System for Mobile Communications ("GSM", i.e., a 2G digital cellular network), General Packet Radio Service ("GPRS"), Universal Mobile Telecommunications System ("UMTS"), LTE variants, CDMA 2000, Bluetooth, ZigBee, Sigfox, and the like.

In the following descriptions, the term "RAN node" is used for the base station but it is replaceable by any other radio access node, e.g., gNB, eNB, Base Station ("BS"), Access Point ("AP"), etc. The term UE is used for the user equipment, but it is replaceable by any other radio access node, e.g., mobile terminal ("MT"), access terminal ("AT"), WTRU, IAB node, etc. Further, the operations are described mainly in the context of 5G NR. However, the described solutions/methods are also equally applicable to other mobile communication systems determining and enforcing service specific network slice security.

Figure 2:
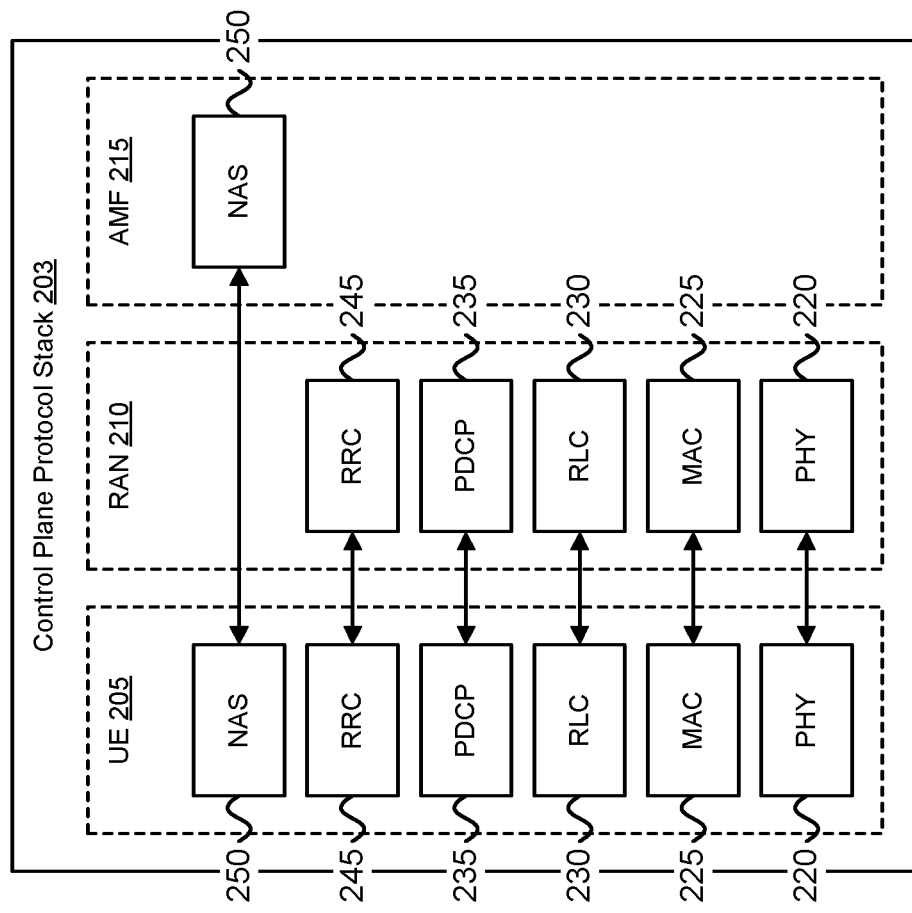
FIG. 2 is a block diagram illustrating one embodiment of a Fifth-Generation ("5G") New Radio ("NR") protocol stack.
Figure 2:
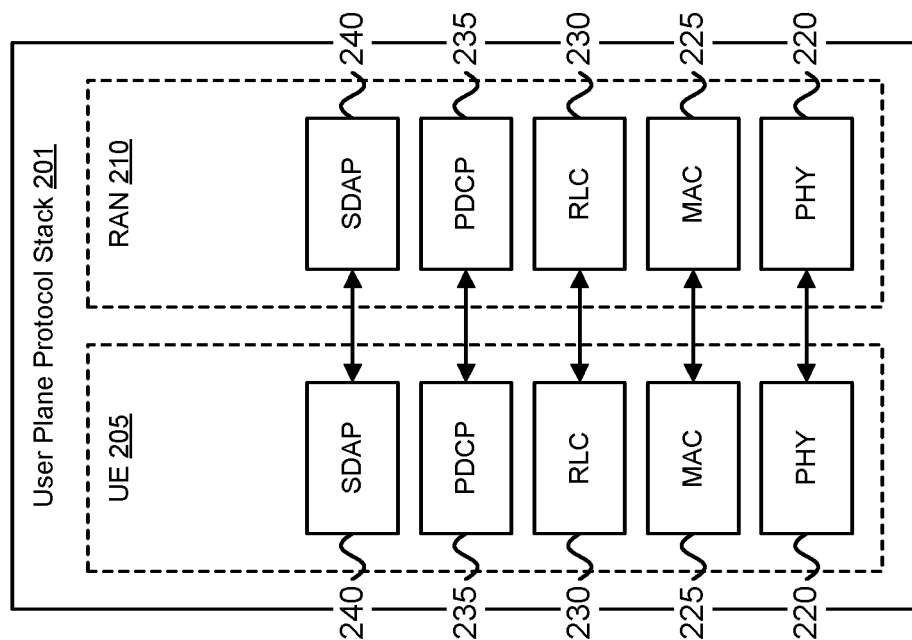

FIG. 2 depicts a NR protocol stack 200, according to embodiments of the disclosure. While FIG. 2 shows the UE 205, the RAN 210 and an AMF 215 in a 5G core network ("5GC"), these are representative of a set of remote units 105 interacting with a base unit 121 and a mobile core network 130. As depicted, the protocol stack 200 comprises a User Plane protocol stack 201 and a Control Plane protocol stack 203. The User Plane protocol stack 201 includes a physical ("PHY") layer 220, a Medium Access Control ("MAC") sublayer 225, the Radio Link Control ("RLC") sublayer 230, a Packet Data Convergence Protocol ("PDCP") sublayer 235, and Service Data Adaptation Protocol ("SDAP") layer 240. The Control Plane protocol stack 203 includes a physical layer 220, a MAC sublayer 225, a RLC sublayer 230, and a PDCP sublayer 235. The Control Plane protocol stack 203 also includes a Radio Resource Control ("RRC") layer 245 and a Non-Access Stratum ("NAS") layer 250.

The AS layer (also referred to as "AS protocol stack") for the User Plane protocol stack 201 consists of at least SDAP, PDCP, RLC and MAC sublayers, and the physical layer. The AS layer for the Control Plane protocol stack 203 consists of at least RRC, PDCP, RLC and MAC sublayers, and the physical layer. The Layer-2 ("L2") is split into the SDAP, PDCP, RLC and MAC sublayers. The Layer-3 ("L3") includes the RRC sublayer 245 and the NAS layer 250 for the control plane and includes, e.g., an Internet Protocol ("IP") layer and/or PDU Layer (not depicted) for the user plane. L1 and L2 are referred to as "lower layers," while L3 and above (e.g., transport layer, application layer) are referred to as "higher layers" or "upper layers."

The physical layer 220 offers transport channels to the MAC sublayer 225. The physical layer 220 may perform Clear Channel Assessment ("CCA") and/or Listen Before Talk ("LBT") procedure using energy detection thresholds, as described herein. In certain embodiments, the physical layer 220 may send a notification of UL LBT failure to a MAC entity at the MAC sublayer 225. The MAC sublayer 225 offers logical channels to the RLC sublayer 230. The RLC sublayer 230 offers RLC channels to the PDCP sublayer 235. The PDCP sublayer 235 offers radio bearers to the SDAP sublayer 240 and/or RRC layer 245. The SDAP sublayer 240 offers QoS flows to the core network (e.g., 5GC). The RRC layer 245 provides for the addition, modification, and release of Carrier Aggregation and/or Dual Connectivity. The RRC layer 245 also manages the establishment, configuration, maintenance, and release of Signaling Radio Bearers ("SRBs") and Data Radio Bearers ("DRBs").

The NAS layer 250 is between the UE 205 and the AMF 215. NAS messages are passed transparently through the RAN 210. The NAS layer 250 is used to manage the establishment of communication sessions and for maintaining continuous communications with the UE 205 as it moves between different cells of the RAN 210. In contrast, the AS layer is between the UE 205 and the RAN 210 (i.e., a RAN node, such as gNB) and carries information over the wireless portion of the network.

A first option for a UE Attach Procedure that supports network slice security includes deploying a Slice Security Server (SSS), which is a repository for the different slice security requirements. In the UE attach procedure, the UE sends an attach (i.e., registration) request to the RAN 210, which forwards the attach/registration request to a CP function, such as the AMF 215. In certain embodiments, the CP function (i.e., AMF 215) is unable to identify the UE 205 and thus initiates an identity request/response procedure with the UE 205.

According to the first option, the CP function sends an authentication request to the EPS HSS or 5GS UDM, the request containing a UE identifier (e.g., IMSI, SUCI), a serving network identifier ("ID"), a network type, and one or more Slice IDs. The HSS/UDM sends a slice security request to the SSS, the request containing the Slice ID(s), and receives a slice security response, the response containing the Slice ID(s) and corresponding Slice Security requirements per slice ID. In certain embodiments, the security requirement(s) may indicate the algorithm to be used. In certain embodiments, the security requirement(s) may indicate a security level, e.g., high security, middle security, low security. In further embodiments, the security requirement(s) may point to a predefined security profile out of a set of predefined profiles. Those predefined security profiles could be available in all network nodes, i.e., known to all CP Functions and RAN nodes, HSS/UDM, etc., so that only a pointer to the profile ID is required in the security requirements.

According to the first option, the HSS/UDM selects—per-slice—the relevant security algorithm, i.e., based on the security requirement(s), and generates Authentication Vectors per slice. The HSS/UDM then sends an authentication response to the CP function (e.g., AMF 215), the response containing Authentication Vector(s) with Slice ID(s). Subsequently, the CP function sets up control-plane layer security (e.g., NAS layer security) and the RAN 210 sets up Access Layer Security (e.g., AS layer security). The UE 205 configures UL filters for each slice and the UE 205 and CP function perform bearer setup per slice with individual.

However, while the security requirement per Slice ID indicates algorithms and/or indicates a security level (such as high, middle, low), it does not specify whether data related to a slice (e.g., an S-NSSAI of the subscribed NSSAI) can be protected using default primary authentication related security context or any slice-specific security in the operator network. Therefore, the security requirement in the first option is limited to indicating security algorithms and thus is not sufficient for slice security isolation. Also, security profile indication from SSS to all Control plane and RAN node to select a security profile for Slice will be complex as it is against the working assumption of Rel-15 and Rel-16 5G system where the AMF 215 (for NAS security) and the gNB (for AS security) selects their own cryptographic algorithms considering the UE security capabilities.

As used herein, a "default" security context is not slice-specific and thus may be shared by different network slices. Further, the "default" security context (or a set of "default" security keys) may also be referred to as a "common" security context (or "common" set of security keys). Accordingly, the notation "default/common" may be used herein to refer to a non-slice-specific security context or a non-slice-specific security key.

As used herein, a "dedicated" security context is slice-specific and thus may not be shared by different network slices. Accordingly, the "dedicated" security context (or a set of "default" security keys) is generated and used when slice isolation is required. The dedicated security context (or security key) may also be referred to as a "slice-specific" security context (or "common" set of security keys).

A second option for slice-specific NAS key derivation and distribution includes having a SEAF derive all slice-specific NAS keys (e.g., $K_{CP-S1} \ldots K_{CP-SN}$), with slice IDs as inputs to the key derivation functions (KDF). The inputs may also contain slice-specific CP (or NAS) algorithm type (e.g., NAS-Slc), algorithm ID (Alg-ID), RAND etc. SEAF sends inputs to AMF (here, co-location of the SEAF and the AMF 215 is assumed). The AMF 215 sends parameters for deriving slice-specific NAS keys (e.g., Slc-ID1 . . . Slc-IDN and NAS-Slc) to the UE 205 (e.g., via RAN 210). The UE 205 derives slice-specific NAS keys, with the parameters received from the AMF 215 (e.g., KDF(KSEAF, Slc-ID1, NAS-Slc, Alg-ID) for slice n's).

However, sending of Slice ID over air can breach the privacy of slice ID. Further the second option also does not define that a Slice ID can be related or similar to a S-NSSAI anywhere in the description. In the Rel-15 and Rel-16 5G system it is unclear which Network function would trigger the SEAF to derive slice-specific key and under what circumstance the slice-specific key is derived in 5GS. Further, according to the second option the SEAF is to send the slice-specific NAS keys to SMF for each slice, which is against the Rel-15 and Rel-16 working assumptions, where the user plane security has to be taken care between UE and gNB to set up user plane integrity and ciphering.

To enable the 5G system to support third-party service specific network slice security in operator's network based on the third-party slice security requirements for the UE's control plane and user plane data protection, solutions and examples are given below.

According to a first solution, slice-specific security (confidentiality and integrity protection) establishment is supported in the 5GC. This requires new updates in the 5G system to support slice-specific security (confidentiality and integrity protection) establishment considering the strict slice isolation requirements to ensure service data privacy among different slices controlled/managed by different parties (operator or third parties).

Figure 3A:
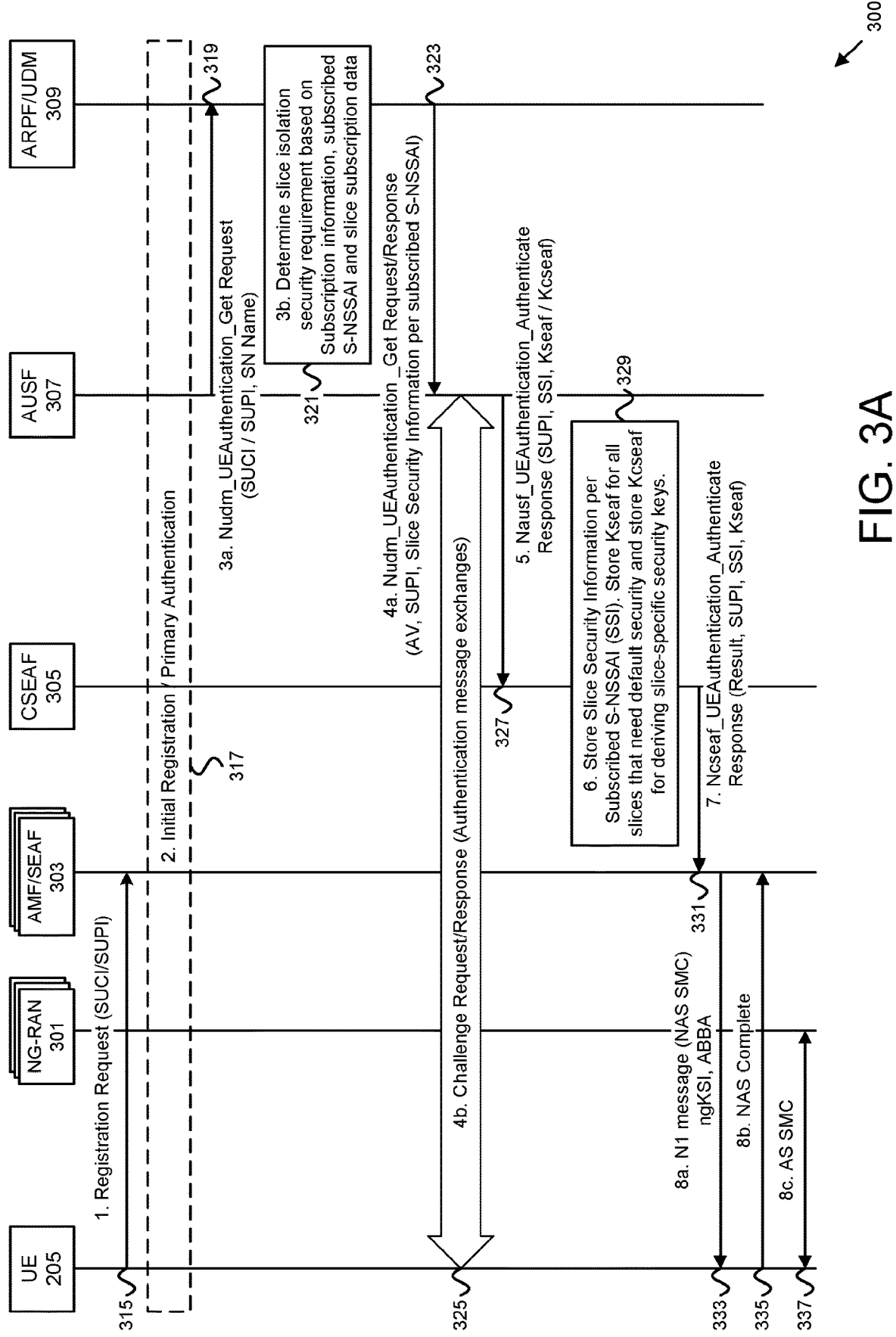
FIG. 3A depicts a signal flow diagram illustrating one embodiment of solution for slice security determination and enforcement procedure during primary authentication and slice authentication.
Figure 3B:
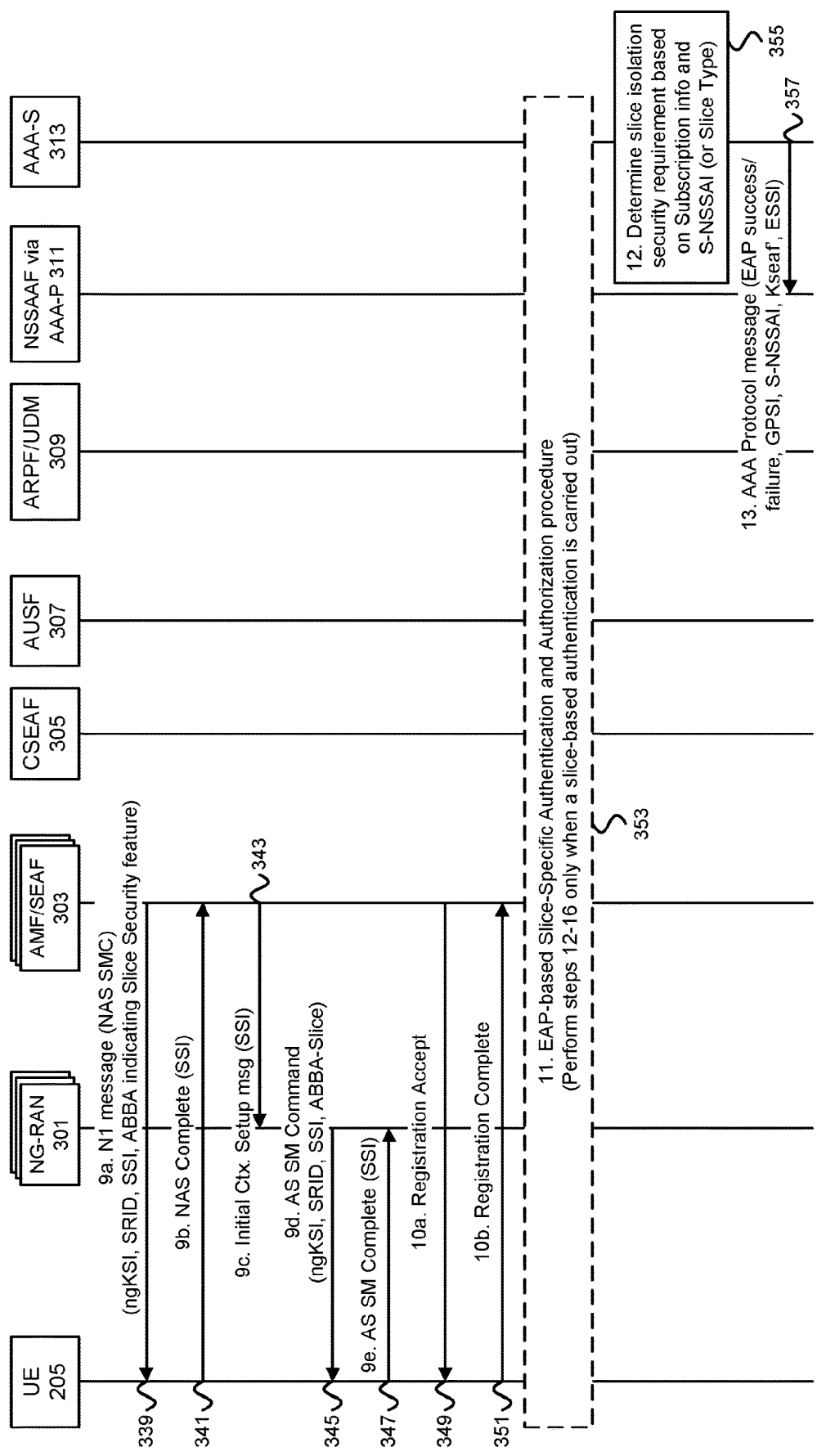
FIG. 3B is a continuation of the procedure illustrated in FIG. 3A.
Figure 3C:
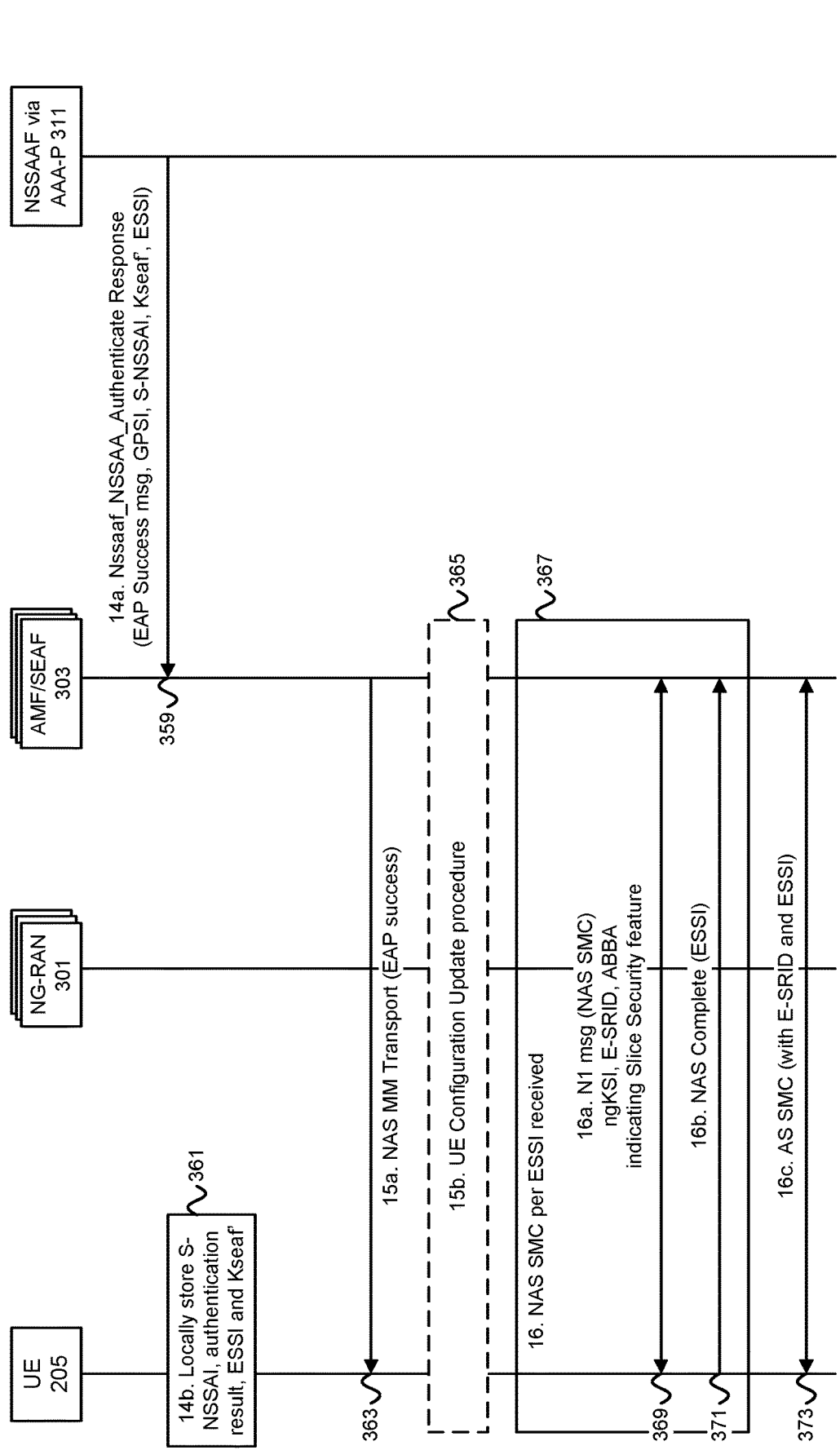
FIG. 3C is a continuation of the procedure illustrated in FIG. 3B.

FIGS. 3A-3C depict signaling flow of a procedure 300 for network slice security policy and enforcement (using different NAS and AS security keys), according to the first solution for supporting network slice security. The procedure 300 involves the UE 205, a NG-RAN 301, an AMF with co-located SEAF (depicted as combined entity "AMF/SEAF" 303), a CSEAF 305 (representative of the Common NF), an AUSF 307, and an Authentication credential Repository and Processing Function ("ARPF") co-located with UDM (depicted as combined entity "ARPF/UDM" 309). Here, the NG-RAN 301 may be an implementation of the RAN 120 and/or RAN 210, the AMF/SEAF 303 may be an implementation of the AMF 132, the CSEAF 305 may be an implementation of the CSEAF 134, the AUSF 307 may be an implementation of the AUSF 136, and the ARPF/UDM 309 may be an implementation of the UDM/UDR 139.

The procedure 300 illustrates one embodiment of a slice security determination and enforcement procedure during primary authentication and slice authentication. The depicted message exchanges are described in the following steps:

At Step 1, the UE 205 sends a Registration Request with a SUCI and a list of S-NSSAIs, e.g., Requested NSSAI (see messaging 315). Here, the list of S-NSSAIs does not include those S-NSSAIs of the UE 205 for which Slice-specific Authentication and Authorization is ongoing, regardless of access type. In various embodiments, the Registration Request and list of S-NSSAIs are as described in 3GPP TS 23.501, clause 5.15.5.2.1, and 3GPP TS 23.502, clause 4.2.2.2.2.

An S-NSSAI is comprised of a Slice/Service Type ("SST"), which refers to the expected Network Slice behavior in terms of features and services. In certain embodiments, the SST can be "1. eMBB," "2. URLLC," "3. MIoT," "4.V2X," and "5. HMTC" and any value may be assigned in future for new types. The S-NSSAI may optionally include a Slice Differentiator ("SD"), which is optional information that complements the Slice/Service type(s) to differentiate amongst multiple Network Slices of the same Slice/Service type.

At Step 2, for an initial Registration Request, the AMF/SEAF 303 invokes the Primary authentication (see block 317). Here, the authentication procedure may be as described in clause 6.1.2 of 3GPP TS 33.501. For a subsequent Registration Request with a 5G-GUTI, the Primary authentication may be skipped if the UE 205 has already been authenticated and the AMF/SEAF 303 has valid security context.

At Step 3a, during initial Registration, the ARPF/UDM 309 receives an authentication request message (e.g., Nudm_UEAuthentication_Get Request) from the AUSF 307 which contains a Subscription Identifier of the UE 205 (e.g., SUCI or SUPI) and a Serving Network Name ("SNN") (see messaging 319). Where the Subscription ID is a SUCI, the ARPF/UDM 309 performs de-concealment of SUCI into SUPI, e.g., by invoking a Subscription Identifier De-concealing Function ("SIDF"). Further, the ARPF/UDM 309 selects an Authentication Method, e.g., based on SUPI and subscription information.

At Step 3b, to support slice-specific security establishment, the ARPF/UDM 309 fetches subscription information and slice subscription data related to SUPI, determines the slice isolation security requirement, and generates Slice-specific Security requirement Information ("SSI") per subscribed S-NSSAI (see block 321). Here, the slice security requirement may be determined based on the UE's subscription information, the UE slice subscription data, the subscribed NSSAI/S-NSSAI(s).

In one embodiment, the SSI is subscriber-specific parameter, i.e., for a first UE a first slice may include SSI, but for a second UE, the first slice does not include SSI. Here, the subscriber-specific parameter may be stored in the UDR. In another embodiment, the SSI is a slice-specific parameter, i.e., where the first slice would include SSI (or not) for all UEs. Here, the slice-specific parameter may be stored in the UDM (i.e., local configuration in the UDM for the S-NSSAI). Additionally, the UDM/UDR may contain the third-party service/slice security information locally stored for a UE as part of the Slice subscription data.

The SSI is used to enforce the slice isolation security for the required services in the control plane and user plane of network slice instance(s) for any third-party service/slice or Data Network Name ("DNN"). The slice isolation security based on the determined slice isolation security requirement and generated corresponding SSI can be realized either by (i) applying independent Slice security context for the required S-NSSAI(s) or (ii) introducing cryptographic separation for required S-NSSAI(s) for both Control Plane (CP) and User Plane (UP) traffic of the UE by using slice-specific inputs in the CP and UP data ciphering and integrity protection.

In case of supporting slice isolation security with option (i) by applying independent Slice security context, the slice security isolation can be introduced at any one of the following level(s) in the 5G System: Slice-specific SEAF key ("Kseaf") at the SEAF level.

Slice-specific AMF key ("Kamf") at the AMF Network-slice-instance level. Alternatively, Slice-specific NAS keys (i.e., NAS Integrity Key ("Knas-int") and NSA Encryption Key ("Knas-enc")) at the AMF Network-slice-instance level.

Slice-specific gNB key ("KgNB") at the RAN Network-slice-instance level. Alternatively, Slice-specific AS keys (i.e., RRC Integrity Key ("Krrc-int") and RRC Encryption key ("Krrc-enc") for RRC signaling messages and UP Integrity key ("Kup-int") and UP Encryption key ("Kup-enc") for user plane data) at the RAN Network-slice-instance level.

In case of supporting slice isolation security with option (ii) any one or more of the following slice-specific parameter can be used as an input along with the security key, control plane (RRC signaling, NAS signaling data) and user plane data during the control plane and user plane integrity and confidentiality protection:
S-NSSAI
SSI specific to an S-NSSAI
Slice Type or Service Type (e.g., SST of S-NSSAI)
Slice Security Requirement ID ("SRID") specified in SSI for an S-NSSAI Regarding SSI Definition: Slice security information (i.e., SSI) can contain information on one or more slices with Slice ID(s) (i.e., S-NSSAI) and its Corresponding Security Type Required. Security Requirement Type can take any one value i.e., Type-1: Default/Common Security, or Type-2: Security Isolation/Dedicated Security Required).

Security Requirement Type-1: Default/Common Security, means the user plane and control plane traffic for a UE over slice (related to a S-NSSAI) can be protected using the common security contexts (NAS Keys and AS Keys) available after a successful primary authentication. If several slices (related to different S-NSSAIs) have the Security Requirement Type set to Default/Common Security, then they share the same security context without security separation.

Security Requirement Type-2: Security Isolation/Dedicated Security Required, means the user plane and control plane traffic for a UE over slice (related to a S-NSSAI for a third party service) need to be protected using a separate and dedicated security contexts (Slice-specific NAS Keys and AS Keys) specifically derived after a successful primary authentication. Alternatively, for Type-2: Security Isolation/Dedicated Security Required, the separate slice security for an S-NSSAI can be achieved by cryptographic separation in the NAS and AS security (i.e., using slice-specific input(s) such as S-NSSAI or any slice/service specific information during the key derivation (NAS and AS Key) or Control Plane and User Plane data ciphering).

Regarding SSI Format: In general, the format of SSI can be [Slice Security Requirement ID (SRID), Slice ID, Security Requirement Type] for each S-NSSAI in a Subscribed NSSAIs.

The SSI can be provided by the UDM to the AMF via SEAF, and AUSF. Alternatively, via AUSF, CSEAF and SEAF (collocated with AMF).

The SSI can contain one or more slice security requirement information each corresponding to the S-NSSAI(s) of the UE's subscribed NSSAI available in the UDM/UDR. The SRID (can be a 3-4 bit indicator) is assigned by the UDM/ARPF to uniquely identify a security requirement information corresponding to a single S-NSSAI in an SSI for a UE. An SSI can contain the slice security requirement information for one or more slices (i.e., for all Subscribed S-NSSAIs of UE. Example one for each S-NSSAIs of Subscribed NSSAI).

For example, in case of subscribed NSSAI with 3 slices (S-NSSAI X, S-NSSAI Y, S-NSSAI Z), the following SSI may be generated by the ARPF/UDM 309:
([SRID: '001', Slice ID: 'S-NSSAI X', Security Requirement: 'Type-1: Default Security'],

[SRID: '010', Slice ID: (i.e., 'S-NSSAI Y', Security Requirement: 'Type-2: Security Isolation/Dedicated Security Required'], and
[SRID: '011', Slice ID: (i.e., 'S-NSSAI Z', Security Requirement: 'Type-1: Default Security']).

At Step 4a, the ARPF/UDM 309 sends the generated Slice Security Information (SSI) containing one or more slice security requirement information to the AUSF 307 along with the other information such as SUPI, Authentication Vector ("AV") and authentication method indication in the Nudm_UEAuthentication_Get Response message (see messaging 323). The granularity of security information in the SSI can be per S-NSSAI (or Subscribed S-NSSAI).

At Step 4b, the AUSF 307 performs authentication-method-specific message exchanges between the UE 205 and the AUSF 307 based on the authentication method selected and indicated by the ARPF/UDM 309 (see procedure 325).

At Step 5, after successful primary authentication and Message Authentication Code verification between the UE 205 and the AUSF 307, if the AUSF 307 received an SSI from the ARPF/UDM 309 in Step 4, then it performs one of the Key Generation options described herein to support slice-specific control plane and user plane protection in the 5G System when required according to the received SSI. Key Generation is described in further detail below with reference to FIGS. 4A-4F (for deployments with CSEAF) and FIGS. 5A-5B (for deployments without CSEAF).

In the depicted embodiments, it is assumed that the CSEAF 305 is deployed, thus key generation and provisions is according to any of the options described below with reference to FIGS. 4A-4F. Here, at Step 5 the AUSF 307 further sends to the CSEAF 305 the authentication response message (e.g., Nausf_UEAuthentication_Authenticate Response) containing the authentication result, the received SSI, the SUPI along with either a default/common Kseaf or a dedicated/slice-specific Kseaf (see messaging 327). Alternatively, the AUSF 307 may send to the CSEAF 305 a dedicated CSEAF key ("Kcseaf"), e.g., if derived based on the operator deployment. The delivered security keys Kseaf/Kcseaf enable dedicated security keys for various network slices that require separate security context and has strict service data privacy. Where derived, the Kcseaf may act as the serving network master key from which any number of slice-specific keys (NAS keys and AS keys) can be generated for various network slices simultaneously or when required.

Note that for embodiments where the CSEAF 305 is not deployed, the AUSF 307 provides one or more slice-specific Kseaf(s) to the co-located SEAF as applicable based on the AMF/SEAF 303 Slice capabilities (i.e., where the AUSF 307 has the prior knowledge of the slice capabilities of initial AMF/SEAF 303). The slice-specific Kseaf may be included as part of the received SSI in addition to the SRID, Slice ID (S-NSSAI), and Slice Security Requirement information where it is indicated as 'Slice security isolation is required.' Alternatively (i.e., for deployments without CSEAF 305), the AUSF 307 sends the Nausf_UEAuthenticate_Response message to the co-located SEAF, said message containing authentication result, received SSI, Kseaf (for default security) and optionally slice-specific Kseaf (for slice-specific security) and SUPI.

The AUSF 307 may locally stores the derived default Kseaf, slice-specific Kseaf(s), and/or Kcseaf. The local storage of slice-specific Kseaf(s) at the AUSF 307 will let the other NFs contact the AUSF 307 to fetch the slice-specific Kseaf(s). For example, another AMF/SEAF that can handle a UE's service request for a specific S-NSSAI may request a slice-specific Kseaf if it cannot contact the initial AMF/SEAF (i.e., due to strict slice isolation requirement and lack of N14 interface to fetch the UE security context). Note that for deployments that require strict slice isolation, no N14 interface may be supported and so direct reroute, and retrieval of UE NAS security context is not possible using conventional mechanisms. In case of RAN rerouting to support slice isolation, the NAS message alone is rerouted, and the UE NAS security context cannot be rerouted via RAN from the Initial AMF to Target AMF considering the security of NAS security context.

At Step 6 (note that step 6 is skipped for the deployment scenario where no Common SEAF ("CSEAF") 305 is involved), if the CSEAF 305 is deployed in the operator network to control and enforce slice-based security in 5G system, then the CSEAF 305 will receive the authentication response message specified above which contains the SSI, the SUPI, and the Kseaf(s) and/or Kcseaf. The CSEAF 305 then stores the received SSI, SUPI, Kseaf/Kcseaf in its local memory (see block 329).

Note that in the case of strict slice isolation, if another AMF/SEAF needs to serve the UE for a specific slice (S-NSSAI) simultaneously or at any a particular point of time during registration procedure or registration mobility update procedure, the CSEAF 305 can provide the slice-specific Kseaf key as part of the UE Security Context to the network function such as AMF/SEAF.

The CSEAF 305 receives keys for default and slice-specific security based on any one of the following options:

Option 1—Separate Anchor Key for Default security and Slice-specific security: the CSEAF 305 receives the one default Kseaf or more slice-specific Kseaf(s) from the AUSF 307 and stores the received security anchor keys (default and slice-specific) in its local memory. Note here that if only a default Kseaf is received from the AUSF 307, then the CSEAF 305 generates one or more slice-specific Kseaf from the Kseaf received from the AUSF 307, as described below with reference to FIGS. 4A-4B. The CSEAF 305 provides to the AMF/SEAF 303 the default Kseaf along with the corresponding SSI. Here, each slice-specific Kseaf is included as part of the SSI in the corresponding SRID related security information. Accordingly, the CSEAF 305 provides one Kseaf for all slice(s) that use default security and provides additional slice-specific Kseaf(s) for those network slice(s) which need separate security context.

Option 2—Derive a slice-specific security anchor key (Kcseaf) from Kseaf Security: the CSEAF 305 derives a common slice Security anchor key (Kcseaf) from the default Kseaf received from the AUSF 307 and generates either a Slice-specific NAS security (i.e., Kamf) from the common/default security anchor key (Kseaf) or from a slice-specific security anchor key (Kcseaf) when required and provide it to the AMF/SEAF 303 along with SSI, as described below with reference to FIGS. 4C-4E.

Option 3—Default and Slice Security Anchor Key derivation: the CSEAF 305 receives the Kseaf and in addition a Kcseaf (in Option 3, a separate security context from which in turn any number of slice-specific security context can be derived when required) and provide the Kseaf and slice-specific Kseaf to the one or more SEAF (e.g., of AMF/SEAF 303) as required, as described below with reference to FIG. 4F.

Note that whenever the AUSF 307 provides the slice-specific Key to the Kseaf, in addition to the default Kseaf, the AUSF 307 may include the slice-specific Kseaf key as part of the SSI along with the corresponding Slice ID (S-NSSAI) and Slice Security Requirement indicated as 'Slice Security Isolation Required'.

At Step 7, the SEAF of the AMF/SEAF 303 receives either from the AUSF 307 (as mentioned in step 5) or from the CSEAF 305 (as mentioned in the step 6), the authentication result, SUPI, Kseaf (and/or slice-specific Kseaf (s)) and the SSI. In the depicted embodiment, the CSEAF 305 sends an authentication response to the SEAF 303 which contains the authentication result, the SUPI, the SSI and the Kseaf (i.e., default Kseaf and/or slice-specific Kseaf) (see messaging 331). The SEAF 303 further provides the authentication result, Kamf (and/or slice-specific Kamf (s) for different AMF network slice instance), ngKSI, an ABBA parameter and SSI to the co-located AMF (or AMF instance(s) handling the slice(s) related to the S-NSSAI(s)). The slice-specific Kamf can be included as part of the SSI along with the corresponding SRID indicated slice security information.

At Step 8a, the AMF 303 on receiving the SSI (with slice security information for one or more S-NSSAIs) in addition to the Kamf, ngKSI and authentication result, will check the SSI, to identify if any network slice instance corresponding to a S-NSSAI requires security isolation (i.e., dedicated security) and locally stores the received SSI. The AMF 303 further forwards the authentication result to the UE 205 in the NAS Security Mode Command ("SMC") message (see messaging 333). The AMF 303 derives NAS security Keys (i.e., Knas-int and Knas-enc) from Kamf and perform the NAS SMC procedure with UE 205 to set up default NAS security by sending the NAS SMC message to the UE 205.

At Step 8b, the UE 205 after successful verification of the NAS SMC message, sends the NAS Security mode complete message to the AMF 303 where it contains the complete Initial UE message with Requested S-NSSAIs (see messaging 335).

After successful NAS SMC and after the AMF 303 receives the requested S-NSSAI from the UE 205, the default NAS security set up between the UE 205 and the AMF 303 may be used to protect all NAS signaling data related to the allowed S-NSSAIs (mapped to the Subscribed S-NSSAI) that require Type-1: default security as indicated in the received SSI. The default NAS security set up between the UE 205 and the AMF 303 is used to protect all NAS signaling data related to the allowed S-NSSAI related to the S-NSSAIs specified in the received SSI that require Type-1: default security as indicated in the received SSI.

At Step 8c, the default AS Security Mode Command ("SMC") procedure is initiated by the gNB in the NG-RAN 301, e.g., on receiving an initial UE context set up message from the AMF 303 (see messaging 337). The AS SMC initiated by the gNB between the NG-RAN 301 and the UE 205 will set up the RRC and User Plane security context between the UE 205 and the gNB.

Continuing at FIG. 3B, the AMF 303 on receiving the Requested S-NSSAIs, determines if any of the requested S-NSSAI mapped to the allowed S-NSSAI needs slice security isolation based on the received and locally stored SSI.

Further for the allowed S-NSSAIs mapped to S-NSSAI(s) those are indicated with Security Requirement Type as, 'Type-2: Security Isolation/Dedicated Security Required', the AMF 303 determines to initiate a dedicated NAS SMC per S-NSSAI (as shown in steps 9a-9b) to set up dedicated slice-specific NAS security context. The NAS SMC per S-NSSAI can negotiate slice-specific cryptographic algorithms (ciphering and integrity) based on the local configuration and policies of the network slice instance corresponding to the S-NSSAI (to govern the third-party service/slice security requirements) with the UE 205. The AMF/SEAF 303 can use the SSI to indicate the UE 205 to derive a slice-specific NAS keys (i.e., Knas-int and Knas-enc) from the Kamf using at least one of the inputs described below, such as SSI/SRID/S-NSSAI/Service type.

Alternatively, if the AMF/SEAF 303 receives the slice-specific Kamf(s) per S-NSSAI that needs security isolation along with the SSI in addition to the default Kamf, ngKSI and authentication result, then the AMF/SEAF 303 will check the SSI, to identify the network slice instance corresponding to the allowed S-NSSAI related to S-NSSAI(s) indicated in the SSI that requires security isolation (i.e., dedicated security).

Further for the S-NSSAI(s) those are indicated with Security Requirement Type as, 'Type-2: Security Isolation/Dedicated Security Required', the AMF/SEAF 303 initiates a dedicated NAS SMC procedure per S-NSSAI (as shown in steps 9a-9b) to set up dedicated NAS security context. The NAS SMC procedure per S-NSSAI negotiates slice-specific cryptographic algorithms (ciphering and integrity) based on the local configuration and policies of the network slice instance corresponding to the S-NSSAI (to govern the third-party service/slice security requirements) with the UE 205. The AMF/SEAF 303 using the SSI can indicate the UE 205 to derive slice-specific Kamf from the Kseaf/slice-specific Kseaf/Kcseaf accordingly similar to the network (e.g., as described below with reference to FIGS. 4A-4F or FIG. 5A-5B).

At Step 9a, to initiate slice-specific NAS security context set up for the allowed S-NSSAI mapped to the subscribed S-NSSAI(s) indicated in the received SSI with Security Requirement Type as, 'Type-2: Security Isolation/Dedicated Security Required', the AMF/SEAF 303 sends a NAS SMC message containing SRID, SSI per S-NSSAI to indicate to the UE 205 to set up and apply slice-specific NAS security Keys (Knas-int, Knas-enc), new ABBA value (to indicate Slice Security feature) and cryptographic algorithms.

In one embodiment, the Slice-specific NAS SMC message can be integrity protected with the slice-specific Knas-int key. In another embodiment, the Slice-specific NAS SMC message may be integrity protected and confidentiality protected (i.e., encrypted) using the default NAS security keys (Knas-int, Knas-enc).

At Step 9b, upon receiving the additional Slice-specific NAS SMC message with SRID, SSI per S-NSSAI, the UE 205 derives the slice-specific NAS Security context (Slice-specific Kamf/slice-specific NAS keys such as Knas-int and Knas-enc using SRID and SSI as input). If the UE 205 successfully sets up the slice-specific NAS security based on SSI and SRID, then the UE 205 further sends the received SSI per S-NSSAI in the NAS security mode complete message to the AMF/SEAF 303.

In one embodiment, the Slice-specific NAS Security mode complete message can be integrity protected and confidentiality protected with the slice-specific Knas-int and Knas-enc keys. In another embodiment, the Slice-specific NAS Security mode complete message can be integrity protected and confidentiality protected using the default NAS security keys (Knas-int, Knas-enc).

At Step 9c, the AMF/SEAF 303 further derives a KgNB from Kamf and sends a S-NSSAI slice-specific initial context setup request message containing KgNB and SSI to a serving gNB in the NG-RAN 301. Upon receiving the slice-specific initial context set up request message with KgNB and SSI, the gNB derives the slice-specific access security keys from the available KgNB. In some embodiments, the available KgNB is the default (i.e., common) KgNB. In such embodiments, the slice-specific access security keys are derived as follows:

$$\text{Krrc-int} = \text{Trunc-128}(\text{KDF (KgNB, RRC Integrity Algorithm ID, S-NSSAI/SRID)}) \quad \text{Equation (1)}$$

$$\text{Krrc-enc} = \text{Trunc-128}(\text{KDF (KgNB, RRC Ciphering Algorithm ID, S-NSSAI/SRID)}) \quad \text{Equation (2)}$$

$$\text{Kup-int} = \text{Trunc-128}(\text{KDF (KgNB, UP Integrity Algorithm ID, S-NSSAI/SRID)}) \quad \text{Equation (3)}$$

$$\text{Kup-enc} = \text{Trunc-128}(\text{KDF (KgNB, UP Ciphering Algorithm ID, S-NSSAI/SRID)}) \quad \text{Equation (4)}$$

Alternatively, the AMF/SEAF 303 further sends a S-NSSAI slice-specific initial context setup request message containing SSI and a slice-specific KgNB derived from the slice-specific Kamf to the gNB. In such embodiments, the slice-specific access security keys may be derived from the slice-specific KgNB as follows:

$$\text{Krrc-int} = \text{Trunc-128}(\text{KDF (slice-specific KgNB, RRC Integrity Algorithm ID, S-NSSAI/SRID)}) \quad \text{Equation (5)}$$

$$\text{Krrc-enc} = \text{Trunc-128}(\text{KDF (slice-specific KgNB, RRC Ciphering Algorithm ID, S-NSSAI/SRID)}) \quad \text{Equation (6)}$$

$$\text{Kup-int} = \text{Trunc-128}(\text{KDF (slice-specific KgNB, UP Integrity Algorithm ID, S-NSSAI/SRID)}) \quad \text{Equation (7)}$$

$$\text{Kup-enc} = \text{Trunc-128}(\text{KDF (slice-specific KgNB, UP Ciphering Algorithm ID, S-NSSAI/SRID)}) \quad \text{Equation (8)}$$

The slice-specific KgNB may be derived as follows using any one of the following two options, wherein the parameter "[slice-specific input]" can be any of: SRID, SSI, S-NSSAI, Service Type, and/or Slice Type.

$$\text{Slice-specific KgNB} = \text{KDF (Slice-specific Kamf, [slice-specific input])} \quad \text{Equation (9)}$$

$$\text{Slice-specific KgNB} = \text{KDF (Kamf, [slice-specific input])} \quad \text{Equation (10)}$$

At Step 9d, the gNB in the NG-RAN 301 sends to the UE 205 a slice-specific AS SMC message containing slice-specific ciphering and integrity protection algorithms (based on local configuration), SRID, SSI, and Message Authentication Code for Integrity ("MAC-I"). In one embodiment, the slice-specific AS SMC message is integrity protected using the slice-specific Krrc-int key. In another embodiment, the Slice-specific AS SMC message can be integrity protected and confidentiality protected using the default AS security keys (Krrc-int, Krrc-enc).

At Step 9e, upon receiving the SRID, the UE 205 derives the slice-specific Krrc-int and Krrc-enc, and further verifies the received slice-specific AS SMC message. If the verification is successful, the UE 205 sends an AS security mode complete message with corresponding SSI to the gNB. In one embodiment, the slice-specific AS Security mode complete message is integrity protected using the slice-specific Krrc-int key. In another embodiment, the Slice-specific AS Security mode complete message can be integrity protected and confidentiality protected using the default AS security keys (Krrc-int, Krrc-enc).

At Step 10a-10b, the AMF/SEAF 303 sends the Registration Accept message to the UE 205. At Step 10b, the UE 205 optionally sends a Registration Complete.

At Step 11, for certain S-NSSAIs, if additional Network Slice-specific Authentication and Authorization ("NSSAA") is required based on the determination done by the AMF/SEAF 303 during primary authentication using information stored locally or from the ARPF/UDM 309, then the AMF/ SEAF 303 may trigger the start of the Network Slice-specific Authentication and Authorization procedure, e.g., as described in 3GPP TS 33.501. Network slice-specific authentication and authorization procedure enables the AAA-S 313 via the Network Slice Specific Authentication and Authorization Function ("NSSAAF") 311 to authenticate and/or authorize the upper layers of the UE 205. Here, the AMF/SEAF 303 performs the role of the EAP Authenticator and communicates with the AAA server ("AAA-S") 313 via the NSSAA Function 311 and an EAP method is used for Network slice-specific authentication and authorization between the UE 205 and the AAA-S 313.

Based on the determination at step 11, the step 12-16 may be executed if a slice-specific authentication is performed.

At Step 12, after a successful slice-specific authentication and authorization, the AAA-S 313 determines if a specific slice S-NSSAI access requires strict slice security isolation and data privacy, e.g., based on the slice subscription information and slice security requirements locally stored.

At Step 13, if the AAA-S 313 determines to enforce a slice security, then the AAA-S 313 provides External-Slice Security Information ("ESSI") to the NSSAAF 311 via AAA-Proxy in AAA protocol message along with EAP Success indication and GPSI.

Regarding the External Slice Security Requirement Information ("ESSI") and its Format: The AAA-S 313 fetches the subscription information and slice subscription data related to the GPSI and UE ID, determines the slice isolation security requirement based on the third-party/service-based UE's subscription information, slice subscription data, and generates the ESSI. The ESSI is used to enforce the slice isolation security for the required services in the control plane and user plane of network slice instance(s) for any third-party service/slice or DNN.

The ESSI may contain information on one or more slices with Slice Security Requirement ID (e.g., External SRID), Slice ID(s) (e.g., S-NSSAI) and its Corresponding Security Type Required. Here, the Security Requirement Type can take any one value i.e., Type-1: Default Security, or Type-2: Security Isolation/Dedicated Security Required.

The Security Requirement Type 1: Default Security means the user plane and control plane traffic for a UE 205 over third party slice (related to a S-NSSAI) can be protected using the common security contexts (NAS Keys and AS Keys) available after a successful primary authentication. If several slices (related to different S-NSSAIs) have the Security Requirement Type set to Default Security, then they share the same security context without security separation.

The Security Requirement Type 2: Security Isolation/ Dedicated Security Required, means the user plane and control plane traffic for a UE 205 over third party slice (related to a S-NSSAI) need to be protected using a separate and dedicated security context provided by the AAA Server after a successful slice authentication.

In general, the format of ESSI can be [E-SRID, Slice ID, Security Requirement Type] for each S-NSSAI (one or all Subscribed third party NSSAIs). Further, the AAA-S 313 if determines to provide the slice authentication specific security context, then the AAA-S 313 also generates the Kseaf' ("Kseaf Prime", an anchor key from the slice authentication) from the Master Session Key ("MSK"), or Extended Master Session Key ("EMSK"), obtained after the slice authentication as follows and provide the Kseaf' to the NSSAAF 311 along with ESSI in step 12.

$$\text{Kseaf'=KDF (MK/MSK/EMSK, S-NSSAI/E-SRID)} \quad \text{Equation (11)}$$

At Step 14a, the NSSAAF forwards the received AAA message to the AMF/SEAF 303 in the Nssaaf_NSSAA_Authenticate Response message containing the EAP Success message, the GPSI, the S-NSSAI, the Kseaf' and the ESSI.

The SEAF may provide the Kseaf' as Kamf to the co-located AMF or can derive Kamf from the received Kseaf'.

Continuing on FIG. 3C, at Step 14b, the AMF/SEAF 303 locally stores the received ESSI along with authentication result and S-NSSAI. If an ESSI is received with any security key, the AMF/SEAF 303 determines to set up a slice-specific NAS security from the Kamf available related to the primary authentication using E-SRID as the cryptographic separation parameter to derive slice-specific Kamf or NAS security keys. Alternatively, if the AMF/SEAF 303 also received a Kamf along with the ESSI, the AMF/SEAF 303 will locally store the Kamf to set up a separate NAS security context for the S-NSSAI.

At Step 15a-b, the AMF/SEAF 303 transmits a NAS MM Transport message (EAP-Success/Failure) to the UE 205 (here, based on the above flow an EAP Success will be transmitted). Based on the result of Slice-specific authentication (EAP-Success/Failure), if a new Allowed NSSAI or new Rejected NSSAIs needs to be delivered to the UE 205, or if the AMF/SEAF 303 re-allocation is required, the AMF/SEAF 303 initiates the UE Configuration Update procedure, for each Access Type, e.g., as described in clause 4.2.4.2 of 3GPP TS 23.502.

At Step 16a, after successful UE Configuration update procedure, the AMF/SEAF 303 initiates a Slice-specific NAS SMC procedure. The AMF/SEAF 303 on receiving an ESSI from AAA-S 313, where the ESSI contains E-SRID, the S-NSSAI and the Slice Security Requirement type as 'Dedicated Security required' and new ABBA value (to indicate Slice Security feature), the AMF generates the slice-specific NAS security keys (Knas-int, Knas-enc) as follows $$\text{Knas-int=KDF (Kamf, Algorithm ID, S-NSSAI/E-SRID)} \quad \text{Equation (12)}$$

$$\text{Knas-enc=KDF (Kamf, Algorithm ID, S-NSSAI/E-SRID)} \quad \text{Equation (13)}$$

The AMF/SEAF 303 sends to the UE 205 a NAS SMC message containing E-SRID, ESSI and ESSI inclusion parameter which indicates to the UE 205 that it needs to derive a separate NAS security for the data and signaling traffic protection related to the S-NSSAI from the existing Kamf (using E-SRID as input for cryptographic separation). Alternatively, if the AMF/SEAF 303 received a specific Kamf from the AAA-Server, then to indicate the UE 205 to derive the slice-specific security context from the slice authentication, the AMF/SEAF 303 may additionally send an indicator (called as 'Use Slice Authentication Key Indicator') to the UE 205.

In one embodiment, the AMF/SEAF 303 uses the slice-specific Knas-int key to integrity protect the slice-specific NAS SMC message and the ESSI (if it needs to be privacy protected). Here, the ESSI alone is integrity protected and confidentiality protected using the default NAS security context and the ESSI inclusion parameter sent to the UE 205 will indicate the UE 205 to obtain the ESSI using the default NAS security context. The S-NSSAI fetched from the ESSI later can be used as input in the slice-specific NAS ciphering and integrity protection. In another embodiment, the Slice-specific NAS SMC message may be integrity protected and confidentiality protected using the default NAS security keys (Knas-int, Knas-enc), where ESSI inclusion parameter can be skipped.

At Step 16b, the UE 205 on receiving the ESSI inclusion parameter will use the default NAS security context to decipher the protected ESSI and further the UE 205 derives the slice-specific NAS keys using a slice-specific input similar to the AMF/SEAF 303 as described in step 16a and verifies the received slice-specific NAS SMC message and if the verification is successful, then the UE 205 sends the NAS Security mode complete message to the AMF/SEAF 303 which contains the ESSI. Alternatively, the Slice-specific NAS Security mode complete message may be integrity protected and confidentiality protected using the default NAS security keys (Knas-int, Knas-enc).

At Step 16c, the AMF/SEAF 303 further sends a S-NSSAI slice-specific initial context setup request message containing ESSI and slice authentication related Kamf to the gNB in the NG-RAN 301. Upon receiving the slice-specific initial context set up request message with ESSI, the gNB derives the new slice-specific KgNB from the slice-specific Kamf and further derives the slice-specific access security keys from the KgNB available (as described in step 9c, where the E-SRID is used instead of SRID) and sends to the UE 205 an AS SMC message containing slice-specific ciphering and integrity protection algorithms (based on local configuration), E-SRID, ESSI, an ESSI inclusion parameter and MAC-I. In one embodiment, the slice-specific AS SMC is integrity protected with the slice-specific RRC key (Krrc-int). In another embodiment, the Slice-specific AS SMC message can be integrity protected and confidentiality protected using the default AS security keys (Krrc-int, Krrc-enc).

The UE 205, on receiving the ESSI inclusion parameter will use the default AS security context to decipher the protected ESSI and derives the slice-specific RRC integrity key. Further, the UE 205 verifies the received AS SMC message and if the verification is successful, the UE 205 sends the AS security mode complete message with corresponding ESSI to the gNB. In one embodiment, the Slice-specific AS Security mode complete message is integrity protected and confidentiality protected using the Slice-specific AS security keys (Krrc-int, Krrc-enc). In another embodiment, the Slice-specific AS Security mode complete message may be integrity protected and confidentiality protected using the default AS security keys (Krrc-int, Krrc-enc).

FIG. 4A-4F depict various variant of key derivations leading to the slice-specific AMF key, Kamf, for network deployments using a Common SEAF ("CSEAF"). Note that single-lined boxes are used to indicate which security keys are default/common keys and double-lined boxes are used to indicate which security keys are slice-specific keys. Described below are three options for deployments with the CSEAF.

Figure 4B:
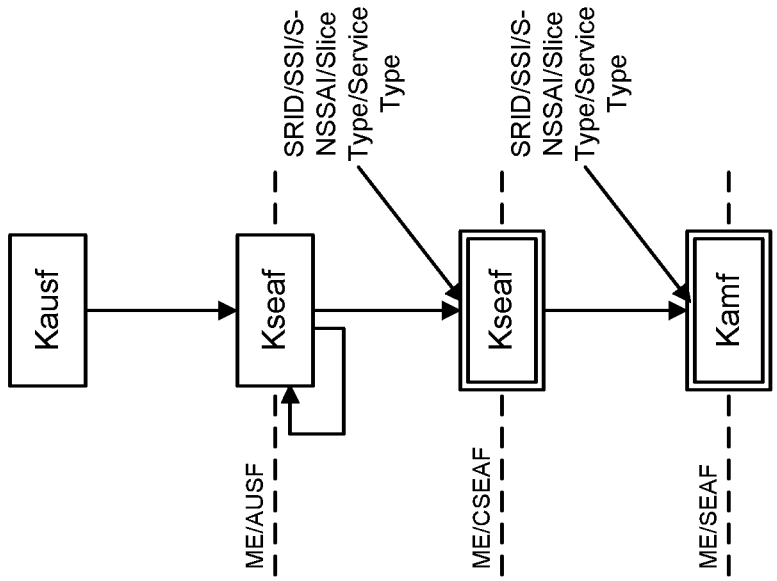
FIG. 4B is a diagram illustrating a second embodiment of slice-specific key derivations that can be used in the 5G system.
Figure 4A:
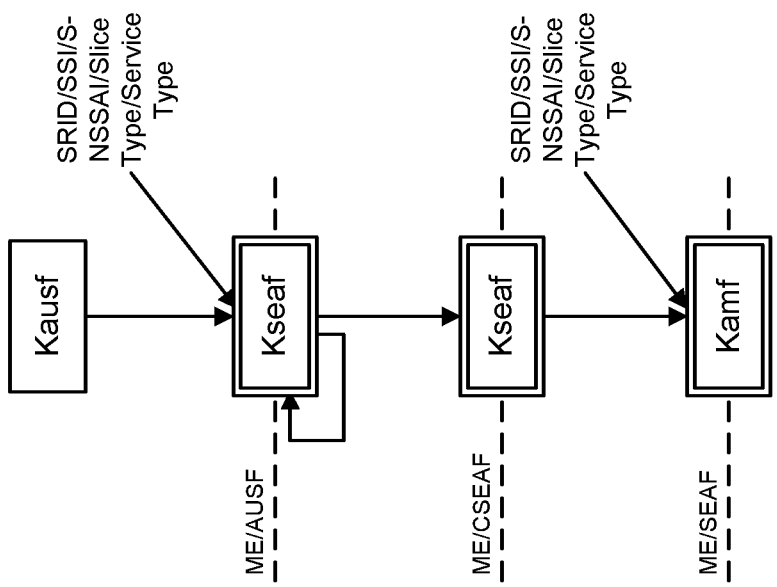
FIG. 4A is a diagram illustrating a first embodiment of slice-specific key derivations that can be used in the 5G system.

Option 1—Slice-specific Security Anchor Key generation and Provision: The AUSF generates one or more security anchor keys (Kseaf(s)) based on the SSI, using SRID, S-NSSAI and Slice Security Requirement type as input to the key derivation and provides to CSEAF as shown in FIGS. 4A and 4B. Where the slice-specific Kseaf is provided along with SSI as part of slice security requirement information indicated by a related SRID.

Option 2—Security Anchor Key generation and Provision: The AUSF generates a security anchor key (Kseaf) and provides to CSEAF as shown in FIGS. 4C to 4E. Here, the AUSF locally stores the default Kseaf key and in addition for Option 2, the slice-specific Kseaf(s) (in case any slice needs dedicated security context) and sends the Nausf_UEAuthenticate_Response message to CSEAF containing authentication result, received SSI, Kseaf (for default security) and optionally slice-specific Kseaf (for slice-specific security) and SUPI.

Option 3—Default and Slice Security Anchor Key derivation and provisioning: The AUSF derives the key Kseaf (for default security) and in addition derive a key Kcseaf (for slice-specific-security) from the Kausf using the S-NSSAI, SRID and security requirement type as inputs to the key derivation, as shown in FIG. 4F, a separate security context from which in turn any number of slice-specific security context can be derived when required) and provide the Kseaf and Kcseaf to the CSEAF.

Here, the AUSF 307 further sends to CSEAF 305: the authentication result, the received SSI, the SUPI along with the derived Kseaf (as in Option 2) and in addition slice-specific Kseaf (as in option 1) or additional dedicated anchor key (Kcseaf) (as shown in Option 3 in FIG. 4, if derived based on the operator deployment) to enable dedicated security keys for various network slices that require separate security context and has strict service data privacy. The Kcseaf acts as the serving network master key from which any number of slice-specific keys (NAS keys and AS keys) can be generated for various network slices simultaneously or when required.

The variants of possible slice-specific key generations shown in FIGS. 4A-4F are described as follows.

FIG. 4A depicts a first key derivation 400 according to Option 1—Slice-specific Kseaf generation by the AUSF/CSEAF. In the depicted embodiment, the AUSF 307 derives the slice-specific Kseaf using Equation (14). The AUSF 307 delivers the slice-specific Kseaf to the CSEAF 305, which in turn delivers the slice-specific Kseaf to the SEAF (i.e., co-located at the AMF/SEAF 303). The SEAF then derives a slice-specific Kamf using Equation (15). Here, the parameter "[slice-specific input]" can be any of: SRID, SSI, S-NSSAI, Service Type, and/or Slice Type.

$$\text{Slice-specific Kseaf}=\text{KDF (Kausf, [slice-specific input])} \quad \text{Equation (14)}$$

$$\text{Slice-specific Kamf}=\text{KDF (slice-specific Kseaf, [slice-specific input])} \quad \text{Equation (15)}$$

FIG. 4B depicts a second key derivation 405 according to Option 1—Slice-specific Kseaf generation by the AUSF/CSEAF. In the depicted embodiment, the AUSF 307 provisions the CSEAF 305 with a default Kseaf. The CSEAF 305 than derives a slice-specific Kseaf from the default Kseaf using Equation (16). Here, the parameter "[slice-specific input]" can be any of: SRID, SSI, S-NSSAI, Service Type, and/or Slice Type.

$$\text{Slice-specific Kseaf}=\text{KDF (Kseaf, [slice-specific input])} \quad \text{Equation (16)}$$

The AUSF 307 delivers the slice-specific Kseaf to the CSEAF 305, which in turn delivers the slice-specific Kseaf to the SEAF (i.e., co-located at the AMF/SEAF 303). The SEAF then derives a slice-specific Kamf using Equation (15).

Figure 4D:
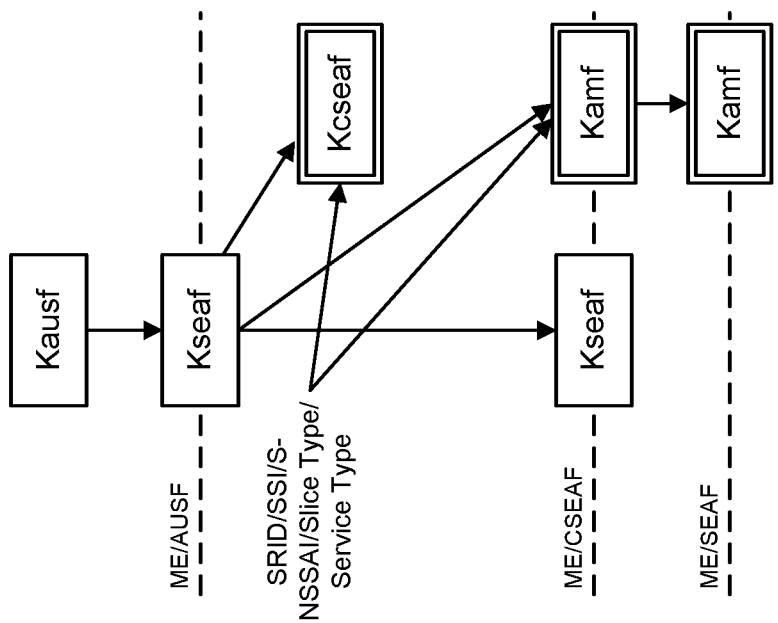
FIG. 4D is a diagram illustrating a fourth embodiment of slice-specific key derivations that can be used in the 5G system.
Figure 4C:
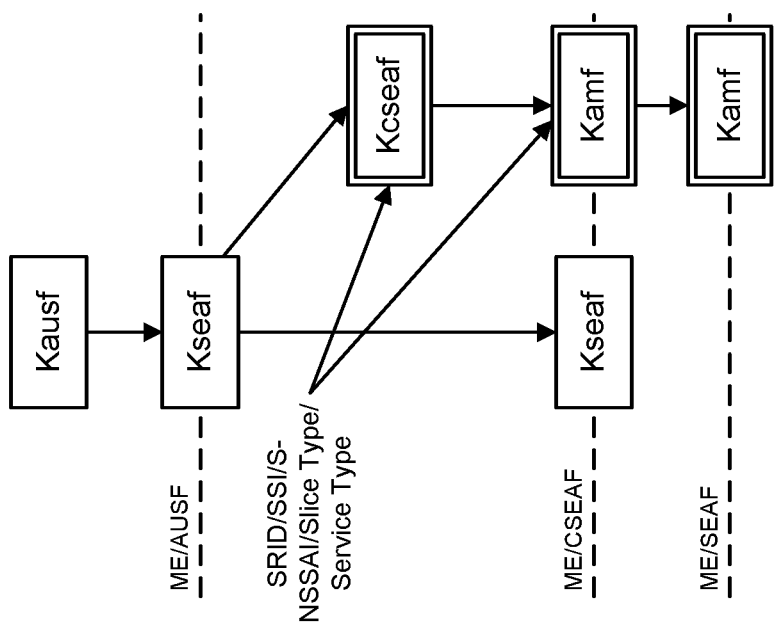
FIG. 4C is a diagram illustrating a third embodiment of slice-specific key derivations that can be used in the 5G system.

FIG. 4C depicts a third key derivation 410 according to Option 2—Slice-specific security anchor key (Kcseaf) or NAS Key generation (Kamf) by CSEAF/SEAF. In the depicted embodiment, the AUSF 307 delivers a default Kseaf (i.e., derived from Kausf) to the CSEAF 305. The CSEAF 305 derives a slice-specific Kcseaf from the default Kseaf using Equation (17). Using the slice-specific Kcseaf, the CSEAF 305 further derives a slice-specific Kamf using Equation (18). The CSEAF delivers the default Kseaf and the slice-specific Kamf to the SEAF (i.e., co-located at the AMF/SEAF 303). Here, the parameter "[slice-specific input]" can be any of: SRID, SSI, S-NSSAI, Service Type, and/or Slice Type.

$$\text{Slice-specific Kcseaf=KDF (Kseaf, [slice-specific input])} \quad \text{Equation (17)}$$

$$\text{Slice-specific Kamf=KDF (slice-specific Kcseaf, [slice-specific input])} \quad \text{Equation (18)}$$

FIG. 4D depicts a fourth key derivation 420 according to Option 2—Slice-specific security anchor key (Kcseaf) or NAS Key generation (Kamf) by CSEAF/SEAF. In the depicted embodiment, the AUSF 307 delivers a default Kseaf (i.e., derived from Kausf) to the CSEAF 305. The CSEAF 305 derives a slice-specific Kcseaf from the default Kseaf using Equation (17). Using the default Kseaf, the CSEAF 305 further derives a slice-specific Kamf using Equation (19). The CSEAF delivers the default Kseaf and the slice-specific Kamf to the SEAF (i.e., co-located at the AMF/SEAF 303). Here, the parameter "slice-specific input" can be any of: SRID, SSI, S-NSSAI, Service Type, and/or Slice Type.

$$\text{Slice-specific Kamf=KDF (Kseaf, [slice-specific input])} \quad \text{Equation (19)}$$

Figure 4F:
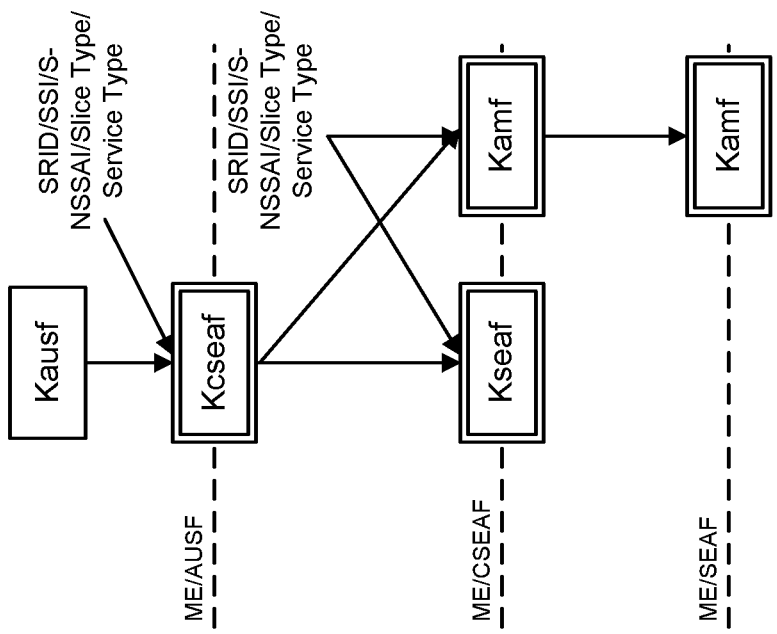
FIG. 4F is a diagram illustrating a sixth embodiment of slice-specific key derivations that can be used in the 5G system.
Figure 4E:
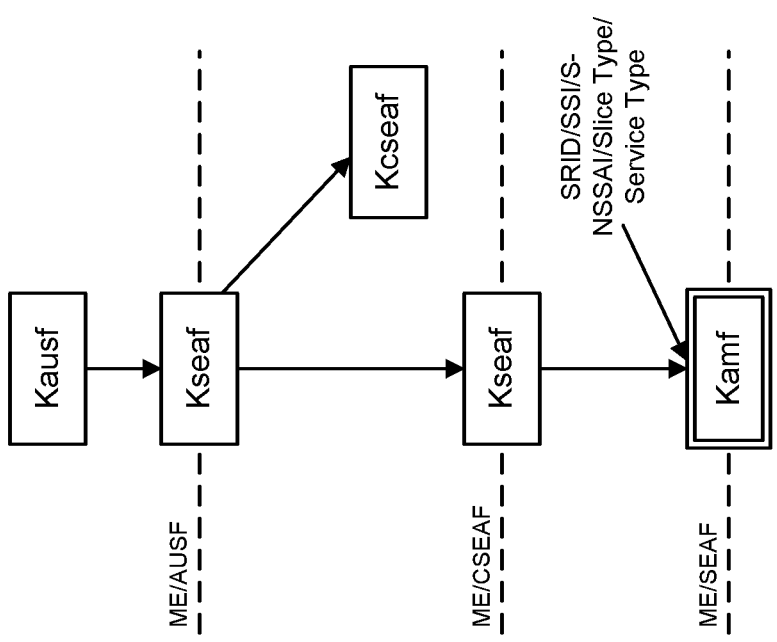
FIG. 4E is a diagram illustrating a fifth embodiment of slice-specific key derivations that can be used in the 5G system.

FIG. 4E depicts a fourth key derivation 420 according to Option 2—Slice-specific security anchor key (Kcseaf) or NAS Key generation (Kamf) by CSEAF/SEAF. In the depicted embodiment, the AUSF 307 delivers a default Kseaf (i.e., derived from Kausf) to the CSEAF 305. The CSEAF 305 derives a default Kcseaf from the default Kseaf. The CSEAF delivers the default Kseaf to the SEAF (i.e., co-located at the AMF/SEAF 303). Using the default Kseaf, the SEAF 303 further derives a slice-specific Kamf using Equation (19).

FIG. 4F depicts a fifth key derivation 425 according to Option 3—Slice-specific security anchor key generation (Kcseaf) by AUSF 307 and slice-specific Kseaf and NAS Key (i.e., Kamf) generation by CSEAF 305. Here, the AUSF 307 derives a slice-specific Kcseaf from Kausf using Equation (20) and delivers the slice-specific Kcseaf to the CSEAF 305. The CSEAF 305 then derives a slice-specific Kseaf is derived from the slice-specific Kcseaf using Equation (21) and further derives the slice-specific NAS key, Kamf, from the Kcseaf using Equation (22). Again, the parameter "[slice-specific input]" can be any of: SRID, SSI, S-NSSAI, Service Type, and/or Slice Type.

$$\text{Slice-specific Kcseaf=KDF (Kausf, [slice-specific input])} \quad \text{Equation (20)}$$

$$\text{Slice-specific Kseaf=KDF (slice-specific Kcseaf, [slice-specific input])} \quad \text{Equation (21)}$$

$$\text{Slice-specific Kamf=KDF (slice-specific Kcseaf, [slice-specific input])} \quad \text{Equation (22)}$$

Figure 5B:
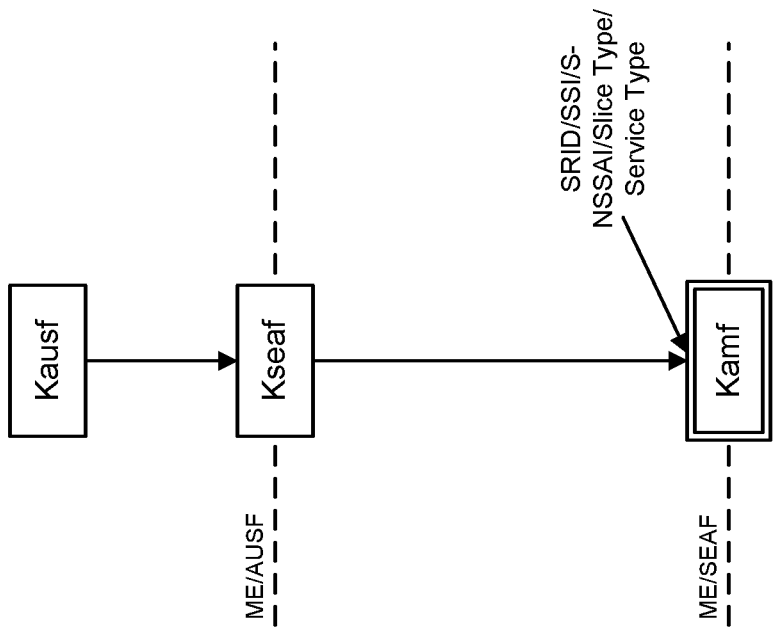
FIG. 5B is a diagram illustrating another embodiment of slice-specific key derivations that can be used in the 5G system.
Figure 5A:
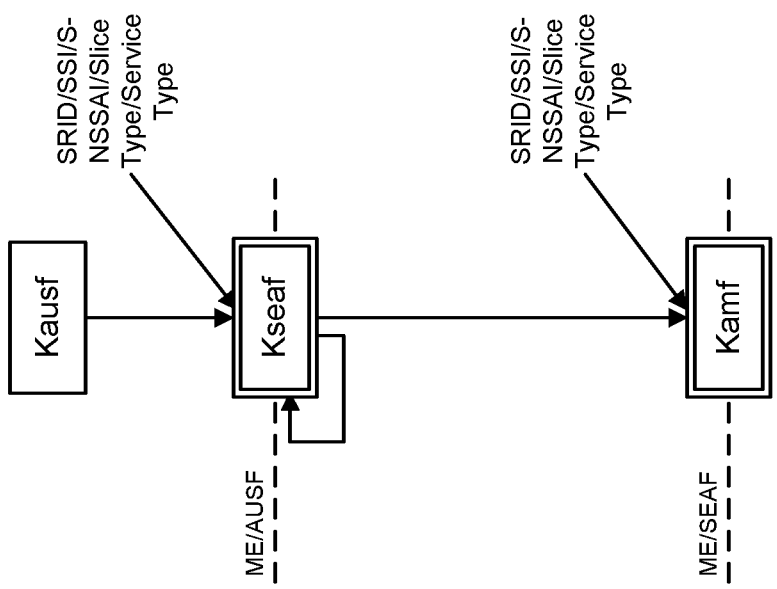
FIG. 5A is a diagram illustrating one embodiment of slice-specific key derivations that can be used in the 5G system.

FIG. 5A-5B depict various variant of key derivations leading to the slice-specific AMF key, Kamf, for network deployments using a Common SEAF ("CSEAF"). Note that single-lined boxes are used to indicate which security keys are default/common keys and double-lined boxes are used to indicate which security keys are slice-specific keys. Described below are two options for deployments without the CSEAF.

Option A—Slice-specific Security Anchor Key generation and Provision: The AUSF 307 generates one or more security anchor keys (Kseaf(s)) based on the SSI, using S-NSSAI, SRID and Slice Security Requirement type as input to the key derivation and provides to the SEAF (i.e., co-located at the AMF/SEAF 303) as shown in FIG. 5A.

Option B—Security Anchor Key generation and Provision: The AUSF generates a security anchor key (Kseaf) and provides to SEAF as shown in FIG. 5B.

FIG. 5A depicts a first key derivation 500 according to Option A—Slice-specific Kseaf generation by the AUSF. In the depicted embodiment, the AUSF 307 derives the slice-specific Kseaf using Equation (14). Here, the AUSF 307 provides one or more slice-specific Kseaf(s) to the SEAF 303 as applicable based on the AMF/SEAF Slice capabilities (if the AUSF 307 has the prior knowledge of the slice capabilities of the AMF/SEAF 303). The slice-specific Kseaf can be included as part of the received SSI in addition to the SRID, Slice ID (S-NSSAI), and Slice Security Requirement information where it is indicated as 'Slice security isolation is required.' Moreover, the SEAF derives the slice-specific NAS key, Kamf, from the slice-specific Kseaf using Equation (15).

FIG. 5B depicts a second key derivation 505 according to Option B—Slice-specific NAS key (i.e., Kamf) generation by the SEAF. In the depicted embodiment, the AUSF 307 derives the default Kseaf from the Kausf and provision the default Kseaf to the SEAF (i.e., co-located at the AMF/SEAF 303). Moreover, the SEAF derives the slice-specific NAS key, Kamf, from the default Kseaf using Equation (19). Here, the AUSF 307 locally stores the default Kseaf key and in addition for Option B, the slice-specific Kseaf(s) (in case any slice needs dedicated security context) and sends the Nausf_UEAuthenticate_Response message to the SEAF 303 containing authentication result, received SSI, Kseaf (for default security) and optionally slice-specific Kseaf (for slice-specific security) and SUPI.

The local storage of slice-specific Kseaf(s) at AUSF 307 will let the other NFs (such as appropriate another AMF/SEAF that can handle a UE's service request for a specific S-NSSAI, if cannot contact the initial AMF/SEAF (example due to strict slice isolation requirement and lack of N14 interface to fetch the UE security context), can contact the AUSF 307 to fetch the slice-specific Kseaf(s).

Figure 6:
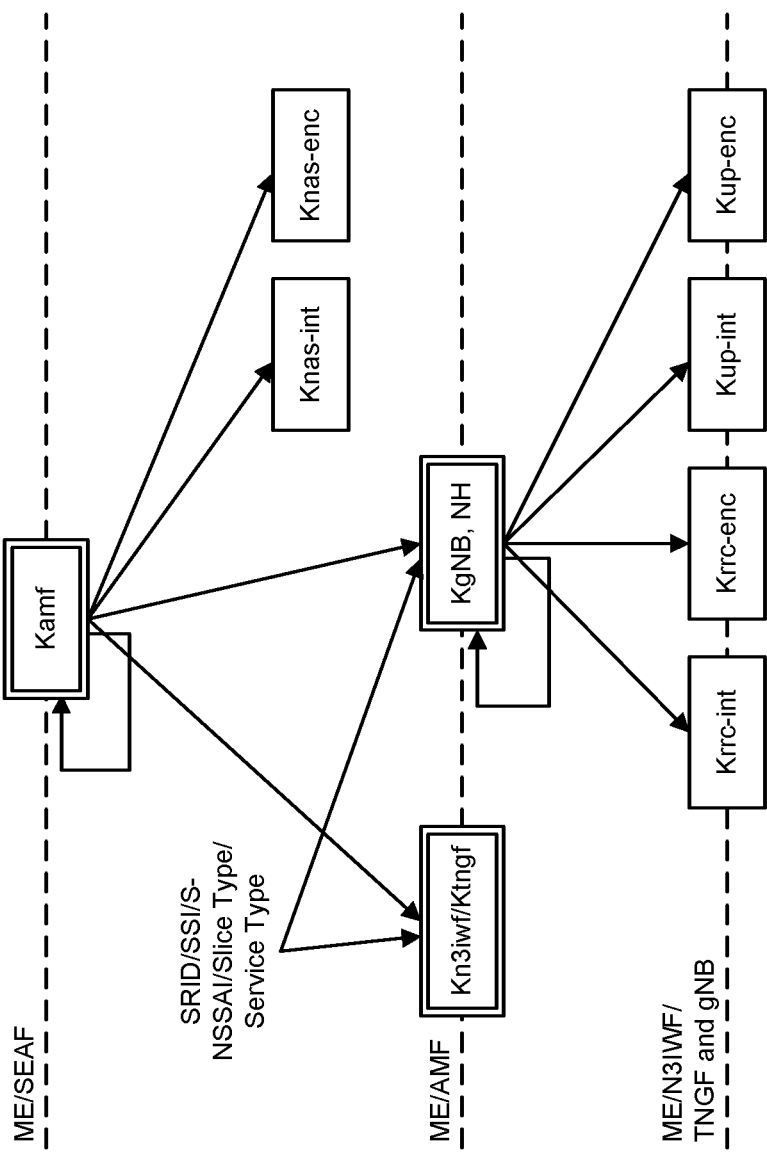
FIG. 6 is a diagram illustrating one embodiment of NAS and AS slice-specific key derivations that can be used in the 5G system.

FIG. 6 depicts NAS and AS level slice-specific key generation applicable to all options specified in FIGS. 4A-4F and FIG. 5A-5B. In certain embodiments, the NAS security keys and AS security keys are slice-specific due to being generated from a slice-specific Kamf. The slice-specific Kamf may be generated using any of the method described with reference to FIGS. 4A-4F of FIGS. 5A-5B. Alternatively, the slice-specific Kamf may be generated using slice-specific inputs as described herein.

Regarding Slice-specific NAS Key generation, based on the 5G deployment (whether a Kamf is slice-specific or not), a slice-specific NAS security keys (Knas-int, Knas-enc) can be derived from the available Kamf (i.e., either the default Kamf or a slice-specific Kamf). In one embodiment, the NAS Integrity key, Knas-int, is slice-specific key due to being generated from the slice-specific Kamf (as depicted in FIG. 6). In other embodiments, the Knas-int may be derived using the default Kamf (or slice-specific Kamf) and slice-specific inputs according to Equation (23). In one embodiment, the NAS Encryption key, Knas-enc, is slice-specific key due to being generated from the slice-specific Kamf (as depicted in FIG. 6). In other embodiments, the Knas-enc may be derived using the default Kamf (or slice-specific Kamf) and slice-specific inputs according to Equation (24).

Here, the parameter "[slice-specific input]" can be any of: SRID, SSI, S-NSSAI, Service Type, and/or Slice Type.

$$\text{Knas-int} = \text{KDF (Kamf, Algorithm ID, [slice-specific input])} \quad \text{Equation (23)}$$

$$\text{Knas-enc} = \text{KDF (Kamf, Algorithm ID, [slice-specific input])} \quad \text{Equation (24)}$$

Regarding Slice-specific AS Key generation, based on the 5G deployment, slice-specific AS security keys (Krrc-int, Krrc-enc, Kup-int, Kup-enc) can be derived from the available default KgNB. Alternatively, the slice-specific AS security keys may be derived from a slice-specific KgNB (i.e., derived using slice-specific KgNB and/or slice-specific inputs, as depicted in FIG. 6). In one embodiment, the RRC Integrity key, Krrc-int, is slice-specific key due to being generated from the slice-specific KgNB (as depicted in FIG. 6). In other embodiments, the Krrc-int may be derived using the default KgNB (or slice-specific KgNB) and slice-specific inputs according to Equation (25). In one embodiment, the RRC Encryption key, Krrc-enc, is slice-specific key due to being generated from the slice-specific KgNB (as depicted in FIG. 6). In other embodiments, the Krrc-enc may be derived using the default KgNB (or slice-specific KgNB) and slice-specific inputs according to Equation (26). Here, the parameter "[slice-specific input]" can be any of: SRID, SSI, S-NSSAI, Service Type, and/or Slice Type.

$$\text{Krrc-int} = \text{Trunc-128(KDF (KgNB, RRC Integrity Algorithm ID, [slice-specific input]))} \quad \text{Equation (25)}$$

$$\text{Krrc-enc} = \text{Trunc-128(KDF (KgNB, RRC Ciphering Algorithm ID, [slice-specific input]))} \quad \text{Equation (26)}$$

In one embodiment, the User Plane ("UP") Integrity key, Kup-int, is slice-specific key due to being generated from the slice-specific KgNB (as depicted in FIG. 6). In other embodiments, the Kup-int may be derived using the default KgNB (or slice-specific KgNB) and slice-specific inputs according to Equation (27). In one embodiment, the UP Encryption key, Kup-enc, is slice-specific key due to being generated from the slice-specific KgNB (as depicted in FIG. 6). In other embodiments, the Kup-enc may be derived using the default KgNB (or slice-specific Kamf) and slice-specific inputs according to Equation (28). Here, the parameter "[slice-specific input]" can be any of: SRID, SSI, S-NSSAI, Service Type, and/or Slice Type.

$$\text{Kup-int} = \text{Trunc-128(KDF (KgNB, UP Integrity Algorithm ID, [slice-specific input]))} \quad \text{Equation (27)}$$

$$\text{Kup-enc} = \text{Trunc-128(KDF (KgNB, UP Ciphering Algorithm ID, [slice-specific input]))} \quad \text{Equation (28)}$$

Alternatively, the slice-specific AS security keys (Krrc-int, Krrc-enc, Kup-int, Kup-enc) can be derived from the slice-specific KgNB. Again, the parameter "[slice-specific input]" can be any of: SRID, SSI, S-NSSAI, Service Type, and/or Slice Type.

$$\text{Krrc-int} = \text{Trunc-128(KDF (slice-specific KgNB, RRC Integrity Algorithm ID, [slice-specific input]))} \quad \text{Equation (29)}$$

$$\text{Krrc-enc} = \text{Trunc-128(KDF (slice-specific KgNB, RRC Ciphering Algorithm ID, [slice-specific input]))} \quad \text{Equation (30)}$$

$$\text{Kup-int} = \text{Trunc-128(KDF (slice-specific KgNB, UP Integrity Algorithm ID, [slice-specific input]))} \quad \text{Equation (31)}$$

$$\text{Kup-enc} = \text{Trunc-128(KDF (slice-specific KgNB, UP Ciphering Algorithm ID, [slice-specific input]))} \quad \text{Equation (32)}$$

According to a second solution, the first solution is expanded to enforce slice security isolation (at the lower level i.e., NAS and AS level as shown in FIG. 6) by introducing cryptographic separation (by using slice-specific inputs such as SRID/S-NSSAI/Service type) during ciphering and integrity protection of a slice (S-NSSAI) specific signaling and user pane traffic using the same default NAS and AS security context rather than deriving multiple slice-specific NAS and As security context.

The changes with respect to the steps of procedure described in FIGS. 3A-3C are alone described below and rest every step works same as described above with reference to FIGS. 3A-3C.

Step 1-8b are same as depicted in FIG. 3A-3B. Here, however, the SEAF provides only the received SSI along with authentication result, Kamf (default/slice-specific) to the AMF in the Authentication response message in step 7.

According to the second solution Step 9a of FIG. 3B is expanded, so that the AMF/SEAF 303 locally stores the received SSI as part of the UE NAS security context. The AMF/SEAF 303 is locally configured with the third-party slice-specific ciphering and integrity algorithms. Further to initiate slice-specific NAS security context set up at the UE 205 for the allowed S-NSSAI(s) related to the Subscribed S-NSSAI indicated in SSI with Security Requirement Type as, 'Type-2: Security Isolation/Dedicated Security Required', the AMF sends a NAS SMC message containing SSI Inclusion Indication parameter, SRID, SSI per S-NSSAI to indicate the UE 205 to set up and apply slice-specific NAS security, new ABBA value (to indicate Slice Security feature) and slice-specific cryptographic algorithms.

In one embodiment, the Slice-specific NAS SMC message is integrity protected and confidentiality protected using the default NAS security keys (Knas-int, Knas-enc). In another embodiment, the Slice-specific NAS SMC message may be integrity protected using the slice-specific NAS security keys (Knas-int). The AMF/SEAF 303, considering the slice privacy, sends the SSI both integrity protected and confidentiality protected with the default NAS security.

According to the second solution Step 9a of FIG. 3B is also expanded, so that upon receiving additional Slice-specific NAS SMC message, the UE 205 uses the default NAS security keys (Knas-int, Knas-enc) for integrity verification and deciphering of the message. If the UE 205 successfully verifies the NAS SMC message, the UE 205 stores the indicated SSI as part of the NAS security context and sends the NAS security mode complete message protected using the default NAS security keys (Knas-int, Knas-enc), AMF indicated slice-specific ciphering and integrity algorithms and Slice Information set to 'S-NSSAI' and 'SRID'. Where based on the received 'SSI' the cryptographic separation is introduced by the UE 205, using the indicated 'S-NSSAI' and 'SRID' as input in the cryptographic protection of the NAS message. The UE 205 further sends the received SSI in the NAS security mode complete message to the AMF as an acknowledgement to the successful setup of slice-specific NAS security.

Alternatively, if the Slice-specific NAS SMC message is integrity protected using the slice-specific NAS security keys (Knas-int), then the SSI inclusion indication parameter sent by the AMF/SEAF 303 to the UE 205 will let the UE 205 understand that SSI alone is protected using the default NAS security context (Knas-int, Knas-enc). In another embodiment, the Slice-specific NAS Security mode complete message can be integrity protected and confidentiality protected using the Slice NAS security keys (Knas-int, Knas-enc).

From now onwards all NAS connection messages specific to the S-NSSAI as indicated in the SSI is ciphered and integrity protected using the slice-specific ciphering and integrity algorithms and using an input Slice Information set to 'S-NSSAI and/SRID' as the cryptographic separation parameter.

According to the second solution Step 9c of FIG. 3B is expanded, so that the AMF/SEAF 303 further sends a S-NSSAI slice-specific initial context setup request message containing SSI to the gNB. The gNB on receiving the slice-specific initial context set up request message with SSI, derives a new slice-specific KgNB from the available default Kamf as follows. The access security keys from the slice-specific KgNB can be derived similar to the key derivation specified in 3GPP TS 33.501, with the following modifications.

$$\text{Slice-specific KgNB=KDF (Kamf, FC, Uplink NAS COUNT, Access Type Distinguisher, Slice ID='S-NSSAI,' SRID)} \quad \text{Equation (33)}$$

$$\text{Krrc-int=Trunc-128(KDF (Slice-specific KgNB, RRC Integrity Algorithm ID))} \quad \text{Equation (34)}$$

$$\text{Krrc-enc=Trunc-128(KDF (Slice-specific KgNB, RRC Ciphering Algorithm ID))} \quad \text{Eq. (35)}$$

$$\text{Kup-int=Trunc-128(KDF (Slice-specific KgNB, UP Integrity Algorithm ID))} \quad \text{Equation (36)}$$

$$\text{Kup-enc=Trunc-128(KDF (Slice-specific KgNB, UP Ciphering Algorithm ID))} \quad \text{Eq. (37)}$$

The gNB further sends to the UE 205 an AS SMC message containing slice-specific ciphering and integrity protection algorithms (based on local configuration), SSI, SRID, SSI inclusion indication parameter and MAC-I. In certain embodiments, the gNB protects the AS SMC message using the slice-specific cryptographic algorithms and newly derived slice-specific RRC keys. But the slice ID (i.e., S-NSSAI) part of the SSI which contains the S-NSSAI should be confidentiality protected (i.e., ciphered) and integrity protected using the default RRC security keys and the S-NSSAI is never in clear text sent over the RRC signaling. The SSI inclusion indication parameter sent by the gNB to the UE 205 will let the UE 205 understand that an SSI is protected using the primary authentication based default AS security context (Krrc-int, Krrc-enc). In other embodiments, the Slice-specific AS SMC message may be integrity protected and confidentiality protected using the default AS security keys (Krrc-int, Krrc-enc).

According to the second solution Step 9d of FIG. 3B is expanded, so that the UE 205 verifies the received AS SMC message and if the verification is successful, the UE 205 derives 20 the slice-specific KgNB similar to step 9c and uses the slice-specific Krrc-int and Krrc-enc keys along with, slice-specific cryptographic algorithms along with the input Slice Information set to 'S-NSSAI' and 'SRID' to integrity and confidentiality protect the AS security mode complete message. The UE 205 further sends the received SSI in the AS security mode complete message to the AMF/SEAF 303 as an acknowledgement to the successful setup of slice-specific AS security. Alternatively, the Slice-specific AS Security mode complete message can be integrity protected and confidentiality protected using the default AS security keys (Krrc-int, Krrc-enc).

From now onwards all RRC signaling messages and user plane data specific to the S-NSSAI indicated in the SSI is ciphered and integrity protected using the slice-specific ciphering and integrity algorithms and using inputs Slice Information set to 'S-NSSAI' and 'SRID.'

According to the second solution, Steps 9e and Step 10a-14b are same as depicted in FIGS. 3B-3C and described above.

According to the second solution Step 16a of FIG. 3C is expanded, so that after successful UE Configuration update procedure, the AMF/SEAF 303 initiates a Slice-specific NAS SMC procedure. The AMF/SEAF 303 on receiving an ESSI from AAA-Server, where the ESSI contains the S-NSSAI and the Slice Security Requirement type as 'Dedicated Security required' and new ABBA value (to indicate Slice Security feature), the AMF/SEAF 303 generates the slice-specific NAS security keys (Knas-int and Knas-enc) as follows:

$$\text{Knas-int=KDF (Kamf(available from primary/Slice authentication), Algorithm ID, S-NSSAI; E-SRID)} \quad \text{Equation (38)}$$

$$\text{Knas-enc=KDF (Kamf(available from primary/Slice authentication), Algorithm ID, S-NSSAI, E-SRID)} \quad \text{Equation (39)}$$

The AMF/SEAF 303 sends to the UE 205 a NAS SMC message containing ESSI which indicates the UE 205 that it needs to derive a separate NAS security of the data and signaling traffic protection related to the third-party slice (S-NSSAI) from the existing Kamf. If the AMF/SEAF 303 received a specific Kamf from the AAA-Server, then to indicate the UE 205 to derive the slice-specific security context from the slice authentication, then the AMF/SEAF 303 sends an additional indicator (Use Slice Authentication Key Indicator) to the UE 205.

In one embodiment, the NAS SMC message is integrity protected using the slice-specific NAS Key and the SSI part alone is integrity and ciphered using the default NAS key. In another embodiment, the Slice-specific NAS SMC message may be integrity protected and confidentiality protected using the default NAS security keys (Knas-int, Knas-enc).

According to the second solution Step 16b of FIG. 3C is expanded, so that the UE 205 derives the slice-specific NAS keys similar to the AMF/SEAF 303 as described in step 16a and verifies the received slice-specific NAS SMC message (or uses the default NAS security keys to verify) and SSI and if the verification is successful, then the UE 205 sends the NAS Security mode complete message to the AMF/SEAF 303 which contains the ESSI (as an acknowledgement to the successful setup of slice-specific NAS security). Alternatively, the Slice-specific NAS Security mode complete message can be integrity protected and confidentiality protected using the Slice NAS security keys (Knas-int, Knas-enc).

The AMF/SEAF 303 further sends a S-NSSAI slice-specific initial context setup request message containing ESSI and slice authentication related Kamf to the gNB. The gNB on receiving the slice-specific initial context set up request message with ESSI, derives the new slice-specific KgNB from the slice-specific Kamf as follows and further derives the slice-specific access security keys from the KgNB available (as described in step 9c) and sends to the UE 205 an AS SMC message containing slice-specific ciphering and integrity protection algorithms (based on local configuration), ESSI and MAC-I.

$$\text{Slice-specific KgNB=KDF (Kamf, FC, Uplink NAS COUNT, Access Type Distinguisher, Slice ID='S-NSSAI,' E-SRID)} \quad \text{Equation (40)}$$

Alternatively, the Slice-specific AS SMC message can be integrity protected and confidentiality protected using the default NAS security keys (Krrc-int, Krrc-enc).

The UE 205 verifies the received AS SMC message and if the verification is successful, the UE 205 sends the AS security mode complete message with corresponding ESSI to the gNB. Alternatively, the Slice-specific AS Security mode complete message can be integrity protected and confidentiality protected using the Slice-specific AS security keys (Krrc-int, Krrc-enc).

According to embodiments of the third solution, the AMF/SEAF 303 fetches Slice-specific Security requirement Information ("SSI") after successful primary authentication by the AMF/SEAF 303 along with the Slice Selection Subscription data from the ARPF/UDM 309 to perform enforcement of slice-specific security for control plane and user plane data related to third part service when required according to the slice subscription information.

Figure 7A:
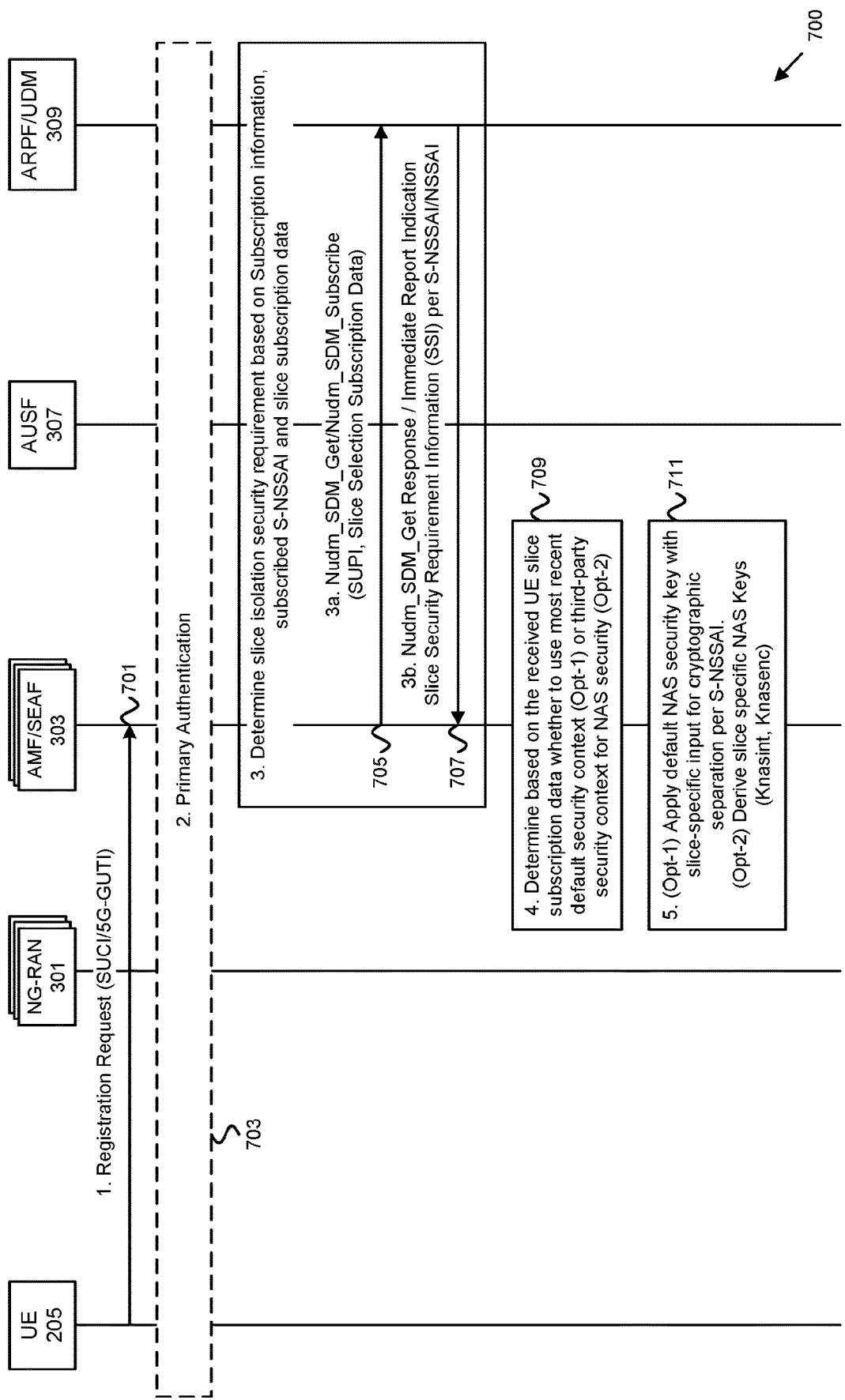
FIG. 7A depicts a signal flow diagram illustrating one embodiment of solution for User plane and Control Plane Network Slice Security Enforcement.
Figure 7B:
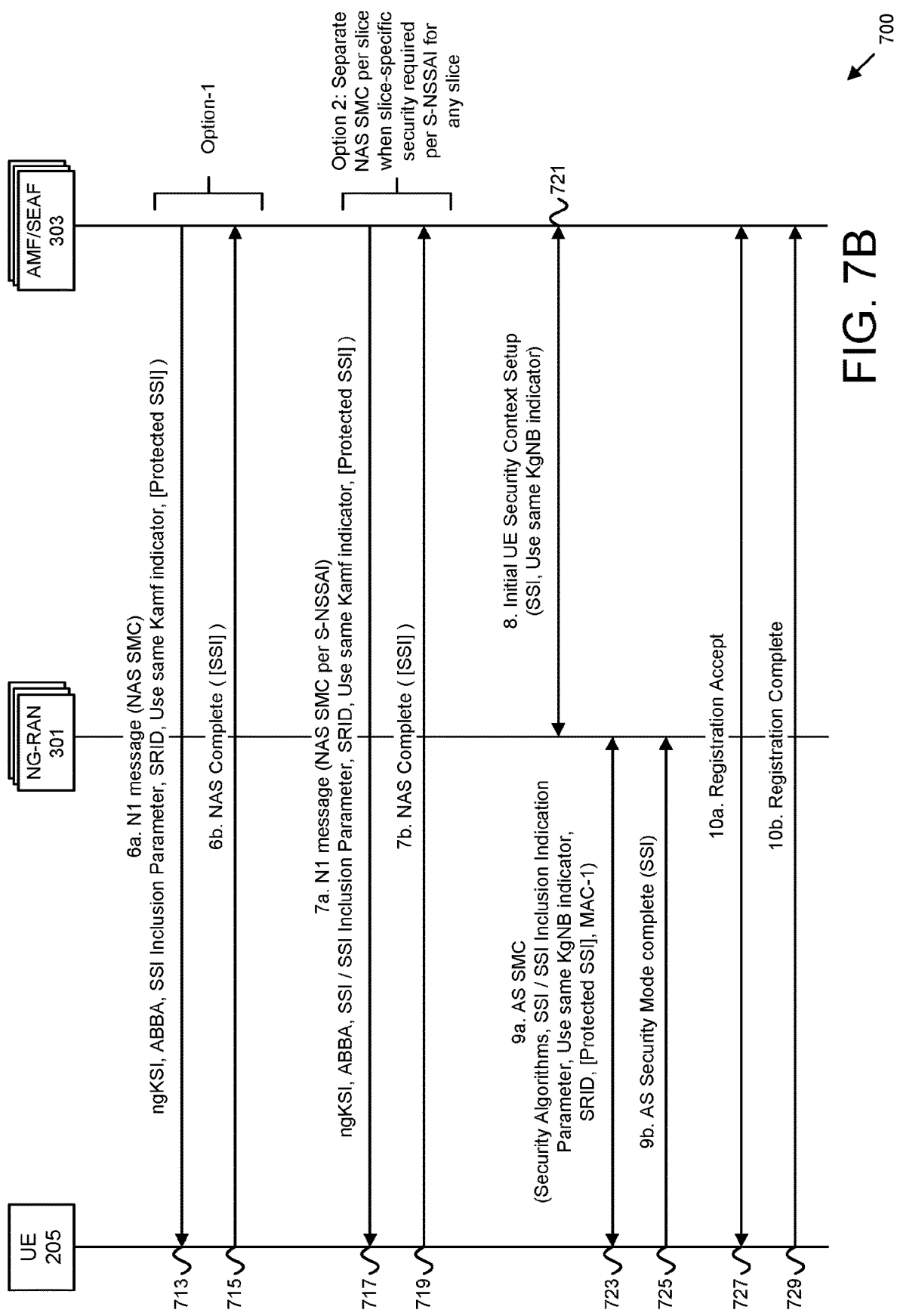
FIG. 7B is a continuation of the procedure illustrated in FIG. 7A.

FIGS. 7A-7B depict a procedure 700 for User plane and Control Plane Network Slice Security Enforcement by AMF (after primary authentication during registration procedure), according to embodiments of the disclosure. The procedure 300 involves the UE 205, the NG-RAN 301, the AMF/SEAF 303), the AUSF 307, and the ARPF/UDM 309. The steps involved in the procedure 700 is described as follows:

Starting on FIG. 7A, at Step 1 the UE 205 sends the Registration Request with SUCI/5G-GUTI to the AMF/SEAF 303 in the initial UE message (see messaging 701).

At Step 2, the AMF 303 forwards the Registration Request (or sends an authentication request) to the co-located SEAF by including the Serving Network Name ("SNN"). The SEAF 303 initiates the primary authentication by sending an authentication request to the AUSF 307. Further the primary authentication using any of the authentication methods such as EAP-AKA', 5G AKA, or any EAP method is selected by the ARPF/UDM 309 and it is performed between the UE 205 and the AUSF 307, e.g., as specified in 3GPP TS 33.501 (see block 703).

At Step 3a, after successful authentication, the AMF/SEAF 303 sends the Nudm_SDM_Get Request or Nudm_SDM_Subscribe request containing the SUPI and Slice selection Subscription data (see messaging 705). Alternatively, the AMF/SEAF 303 can also include the new IE Slice Security Requirement data to request the slice security requirement information (SSI).

At Step 3b, the ARPF/UDM 309 on receiving the Nudm_SDM_Get Request or Nudm_SDM_Subscribe request message containing the SUPI, Slice selection Subscription data and Slice Security Requirement Data, the ARPF/UDM 309 fetches the Slice-specific Security Requirement Information ("SSI") per S-NSSAI/NSSAI from the UDR based on the SUPI as part of UE subscription information and slice subscription data (see messaging 707).

Further the ARPF/UDM 309 sends accordingly the Nudm_SDM_Get Request or Nudm_SDM_Subscribe response message containing the Security Requirement Information (SSI) with one or more tuples of SRID, Slice ID (S-NSSAI), Slice Security requirement indicated (Type-1/Type-2) per S-NSSAI. Here the SSI definition and SSI format are as described above with reference to FIGS. 3A-3C, with the difference that no CSEAF is involved.

As an alternative variant for the new IE SSI being sent in step 3b: The proposed IE SSI is sent by the ARPF/UDM 309 as part of the Slice Selection Subscription data as depicted at Table 1, below. Here, the Slice Selection Subscription data comprises Slice Security Requirement Information or Slice Security Information (i.e., SSI).

TABLE 1

UE Subscription data types

| | | |
|---|---|---|
| Slice Selection Subscription data (data needed for Slice Selection as described in clause 4.2.2.2.3 and in clause 4.11.0a.5) | Subscribed S-NSSAIs | The Network Slices that the UE subscribes to. In roaming case, it indicates the subscribed network slices applicable to the serving PLMN. |
| | Default S-NSSAIs | The Subscribed S-NSSAIs marked as default S-NSSAI. In the roaming case, only those applicable to the Serving PLMN. |
| | S-NSSAIs subject to Network Slice-Specific Authentication and Authorization | The Subscribed S-NSSAIs marked as subject to NSSAA. |
| | Slice Security Requirement Information/Slice Security Information (SSI) | The Subscribed S-NSSAI(s) provided with slice security information such as Slice Security Requirement ID: SRID, Slice ID: S-NSSAI, and Security Requirement Type: Dedicated Security/Slice Security Isolation Required Indication |

Note that Table 1 may be a modification to the UE subscription data types defined in 3GPP TS 23.502, where the Subscribed S-NSSAI(s), the Default S-NSSAI(s), and the S-NSSAI(s) subject to Network Slice-Specific Authentication and Authorization may be as defined in claims 4.2.2.2.3 and/or clause 4.11.0a.5 of 3GPP TS 23.502.

Returning to FIG. 7A, at Step 4 the AMF/SEAF 303 locally stores the received Slice-specific Security requirement Information ("SSI") (see block 709). Based on the received SSI and local policy, the AMF/SEAF 303 determines to enforce the slice security over control plane and user plane traffic related to a slice according to the Security requirement type indicated in the SSI using any of the options listed below (which depends on the operator deployment and implementation of slice isolation security).

Option-1: Cryptographic separation by using slice-specific inputs in ciphering and integrity protection. In Option-1, slice security isolation through slice-specific cryptographic separation is achieved by using slice-specific inputs (i.e., SRID, SSI per S-NSSAI, S-NSSAI, and/or Slice/Service type) in the ciphering and integrity protection while applying the default primary authentication-based security context for NAS connection.

Option-2: Cryptographic separation by using slice-specific NAS keys for ciphering and integrity protection. In Option-2, slice security isolation through slice-specific cryptographic separation is achieved by applying slice-specific NAS security keys (i.e., slice-specific Knas-int and Knas-enc keys) for NAS connection.

At Step 5, if the AMF/SEAF 303 determines to enforce the Slice security isolation as indicated in the received SSI using Option-1 (i.e., using default security but using slice-specific inputs in the NAS signaling protection to achieve cryptographic isolation), then step 6 is performed and step 7 can be skipped (see block 711). Otherwise, if the AMF/SEAF 303 determines to use Option-2 (cryptographic separation achieved by using slice-specific NAS security keys for NAS signaling protection), e.g., based on Slice security isolation for the received SSI, then step 7 is performed and step 6 can be skipped.

Continuing at FIG. 7B, at Step 6 if the AMF/SEAF 303 received the complete initial UE message in step 1, then the AMF/SEAF 303 knows the Requested S-NSSAI(s), in that regard, in steps 6a-6b the default NAS SMC procedure used to set up the default NAS Security as in the existing 5G system with minimum cryptographic separation.

Else, if the AMF/SEAF 303 received only limited clear text IEs in the Step 1, the AMF/SEAF 303 performs the default NAS SMC procedure after successful primary authentication and receives the complete UE initial message from the UE 205 which contains the Requested S-NSSAI. In the latter case, after determining the allowed NSSAI the AMF/SEAF 303 performs steps 6a and 6b in a slice-specific NAS SMC following the default NAS SMC procedure.

At Step 6a, the AMF/SEAF 303 based on the received SSI, if any slice (S-NSSAI) has a security requirement type indicated as 'Type 2: Security Isolation/Dedicated Security Required', then the AMF/SEAF 303 sends to the UE 205 the NAS SMC message containing SSI inclusion indication parameter, Security Requirement Identifier (SRID) and "Use same Kamf" indicator (see messaging 713).

The new Information Element ("IE") SSI inclusion indication parameter indicates that the slice security information (SSI) for enforcement at the UE 205 is provided along with NAS SMC message, but it is both integrity protected and confidentiality protected with default NAS security keys. Here, the SRID indicates that the slice-specific NAS SMC message is cryptographic separated with SRID. The MAC-I for the complete NAS SMC message and the protected SSI is also provided along with the NAS SMC message.

At Step 6b, upon receiving the SSI inclusion indication parameter, SRID and "Use same Kamf" indicator, the UE 205 derives the default NAS Security context such a Knas-int and Knas-enc (as specified in 33.501) and first verifies the integrity of the NAS SMC message by using the cryptographic separation input SRID. Then, as indicated by the SSI inclusion parameter, the UE 205 decrypts the protected SSI to obtain the Slice security information for each S-NSSAI.

Further based on each S-NSSAI that has the Slice Security Requirement as 'Type 2: Security Isolation/Dedicated Security Required', the UE 205 includes any of the corresponding slice-specific information such as SRID/S-NSSAI/Slice type/Service type as received in the SSI as input along with the default NAS security keys while ciphering and integrity protecting the NAS signaling messages. The "Use same Kamf" indicator will indicate the UE 205 to use the available default Kamf and related NAS keys for slice-specific NAS security, along with cryptographic separation parameter.

Further the UE 205 sends the NAS Security mode complete message to the AMF/SEAF 303 by including the received SSI as an acknowledgement to initiate SSI enforcement at the UE 205 (see messaging 715).

At Step 7a, if the AMF/SEAF 303 determines to set up individual Slice-specific NAS security Keys (i.e., Option 2 based implementation) and negotiate Slice-specific NAS ciphering and integrity algorithms, for all S-NSSAI's that require slice security isolation according to SSI, then the AMF/SEAF 303 initiates per S-NSSAI based NAS procedure in addition to the default NAS SMC procedure. Accordingly, the AMF/SEAF 303 sends a Slice-specific NAS SMC message containing SSI inclusion indication parameter, SRID, "Use same Kamf" indicator and protected SSI (see messaging 717). The Slice-specific NAS SMC message is integrity protected and confidentiality protected with default NAS Keys.

Alternatively, the Slice-specific NAS SMC message along with the SSI inclusion indication parameter is integrity protected with slice-specific NAS integrity Key and the SSI alone is integrity protected and confidentiality protected with default NAS Keys. The SSI inclusion indication parameter will indicate the UE 205 to first use the default NAS security keys to obtain the SSI.

At Step 7b, the UE 205 on receiving the Slice-specific NAS SMC message by implementation can use the default NAS security keys to decrypt and integrity verify the slice-specific NAS SMC message and derives the slice-specific NAS security keys from the available default Kamf as indicated by the SSI. The "Use same Kamf" indicator will indicate the UE 205 to use the available default Kamf to derive the slice-specific NAS security keys.

Alternatively, the UE 205 on receiving the Slice-specific NAS SMC message containing SSI inclusion indication parameter, SRID, will use the default security key to obtain the SSI and then derive the slice-specific integrity key to verify the Slice-specific NAS SMC message and further the UE 205 generates the slice-specific NAS ciphering key similar to the AMF/SEAF 303.

Either way, if the verification of the Slice-specific NAS SMC message is successful, the UE 205 sends the Slice-specific NAS Security mode complete message containing SSI per S-NSSAI to the AMF/SEAF 303 which is both ciphered and integrity protected using the slice-specific NAS keys (see messaging 719).

At Step 8, the AMF/SEAF 303 on receiving the Slice-specific NAS Security mode complete message for any SSI, will send to the gNB in the NG-RAN 301, the UE Initial Security Context Set up message containing SSI and "use same KgNB" indicator (see messaging 721).

At Step 9a, the gNB on receiving the Slice-specific UE Initial Security Context Set up message containing SSI and "use same KgNB" indicator, the gNB will initiate the slice-specific AS SMC procedure (following step 7A-B for Option-2 based on operator implementation) or use a default AS SMC (following step 6A-B for Option-1 based on operator implementation) to enforce slice security isolation at the RRC signaling and UP data level for the required Slice (S-NSSAI) based on the received SSI (see messaging 723).

Option 1: The gNB sends the AS SMC message containing SSI inclusion indication parameter, SRID, "Use same KgNB" indicator and protected SSI. The new Information Element (IE) SSI inclusion indication parameter indicates that the slice security information (SSI) for enforcement at the UE 205 is provided along with AS SMC message, but it is both integrity protected and confidentiality protected with default AS security keys (Krrc-int, Krrc-enc). The MAC-I for the complete AS SMC message and the protected SSI is also provided along with the AS SMC message. The SRID indicates that it can be used as a cryptographic separation parameter).

Option 2: The gNB sends a Slice-specific AS SMC message (in addition to default AS SMC procedure) containing SSI inclusion indication parameter, SRID, "Use same KgNB" indicator and protected SSI. The Slice-specific AS SMC message is integrity protected and confidentiality protected with default AS Keys (RRC integrity and ciphering keys).

Alternatively, the Slice-specific AS SMC message along with the SSI inclusion indication parameter is integrity protected with slice-specific AS integrity Key and the SSI alone is integrity protected and confidentiality protected with default RRC Keys. The SSI inclusion indication parameter will indicate the UE 205 to first use the default RRC security keys to obtain the SSI. The SRID indicates that it can be used as a cryptographic separation parameter).

At Step 9b, Option 1: The UE 205 on receiving the SSI inclusion indication parameter, SRID and "use same KgNB" indicator, derives the KgNB and RRC security keys such a Krrc-int and Krrc-enc specified in 33.501) and first verifies the integrity of the AS SMC message, and then decrypts the protected SSI to obtain the Slice security information for each S-NSSAI.

Further based on each S-NSSAI that has the Slice Security Requirement as 'Type 2: Security Isolation/Dedicated Security Required', the UE 205 includes any of the slice-specific information such as SRID/S-NSSAI/Slice type/Service type as received in the SSI as input along with the default AS security keys while ciphering and integrity protecting the AS signaling messages and slice-specific user plane data.

The "Use same KgNB" indicator will indicate the UE 205 to use the available default KgNB to use for slice-specific AS security but along with cryptographic separation. Further, the UE 205 sends the NAS Security mode complete message to the AMF/SEAF 303 by including the received SSI as an acknowledgement to initiate SSI enforcement at the UE 205.

Option 2: The UE 205 on receiving the Slice-specific AS SMC message by implementation can use the default AS security keys (i.e., RRC keys) to decrypt and integrity verify the slice-specific AS SMC message and derives the slice-specific AS security keys from the available default KgNB as indicated by the SSI. The "Use same KgNB" indicator will indicate the UE 205 to use the available default KgNB to derive the slice-specific RRC and UP security keys using cryptographic separation parameter such as SRID/S-NSSAI/Slice Service type.

Alternatively, the UE 205 on receiving the Slice-specific AS SMC message containing SSI inclusion indication parameter, SRID, and "Use default KgNB" indicator, will use the default security key (i.e., RRC keys) to obtain the SSI and then derive the slice-specific RRC integrity key to verify the Slice-specific NAS SMC message and further the UE 205 generates the slice-specific RRC ciphering key similar to the gNB (using cryptographic separation parameter such as SRID/S-NSSAI/Slice Service type to default KgNB).

Either way, if the verification of the Slice-specific AS SMC message is successful, the UE 205 sends the Slice-specific AS Security mode complete message containing SSI per S-NSSAI to the gNB which is both ciphered and integrity protected using the slice-specific RRC integrity and ciphering keys (see messaging 725).

After a successful AS SMC the UE 205 and gNB with use the slice-specific RRC security keys and UP security keys (derived as mentioned in Embodiment 1) to integrity and confidentiality protect all Slice-specific RRC and User plane data according to the SSI (Slice Security Information based on the Slice subscription data).

At Step 10a, after a successful registration, the AMF/SEAF 303 sends the Registration Accept message to the UE 205 (see messaging 727).

At Step 10b, the UE 205 on receiving the Registration Accept message from the AMF/SEAF 303, acknowledges by sending a Registration complete message to the AMF/SEAF 303 (see messaging 729).

Note that based on the received SSI the NG-RAN 301 can either trigger a slice isolation at the RRC and UP level or only at the UP level which based on the operator deployment scenario.

According to a fourth solution, following a successful RRC security set up as described in FIG. 7B, step 9a-b, and a successful registration procedure, the UE 205 can send a PDU session establishment request to the network any time. During a PDU session establishment procedure related to an S-NSSAI, the SMF can contact the UDM to fetch the SSI and use the received SSI to indicate the gNB to enforce slice security isolation for any S-NSSAI at the user plane level for the UE 205.

Figure 8:
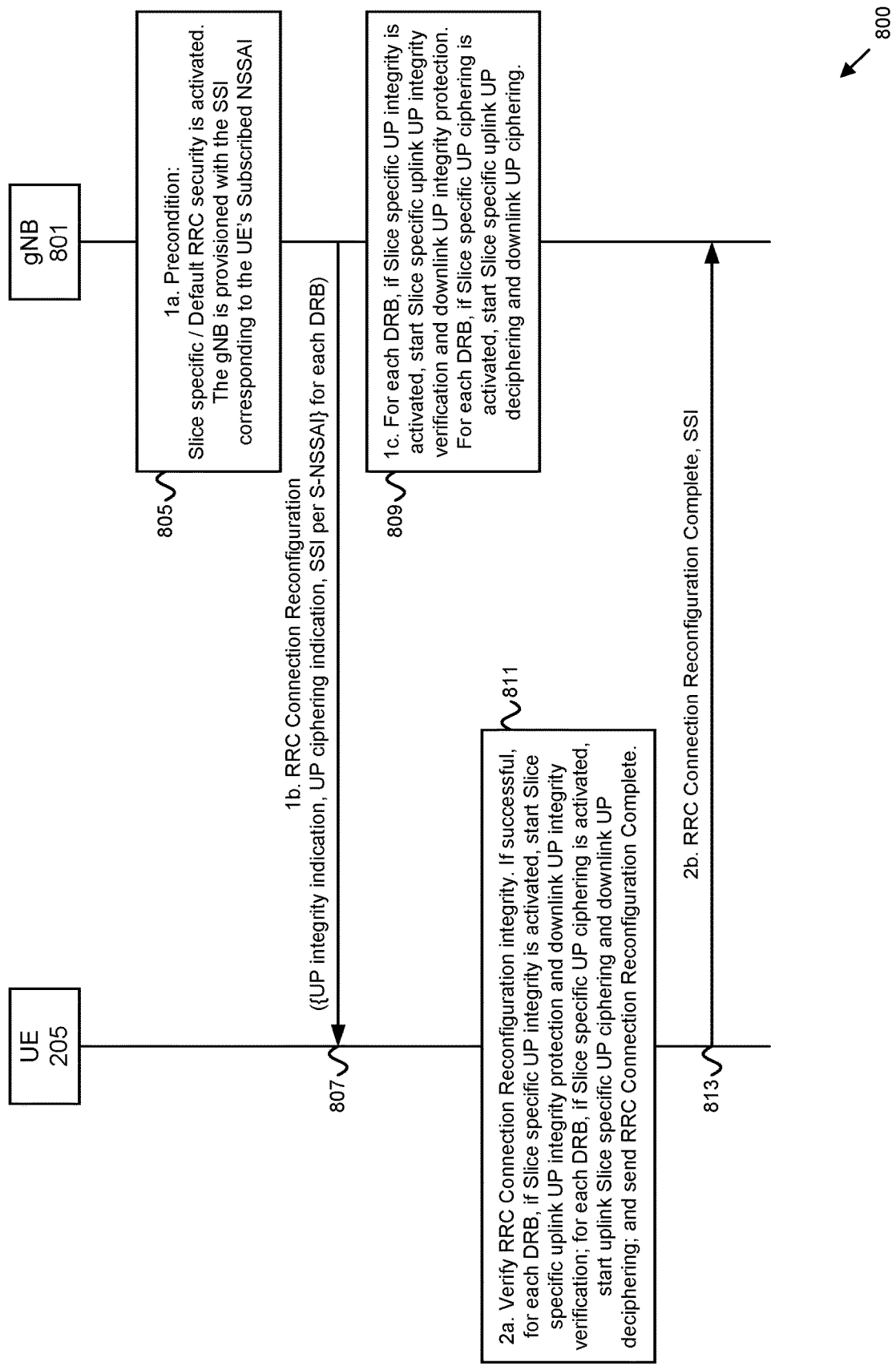
FIG. 8 depicts a signal flow diagram illustrating one embodiment of solution for SSI based slice-specific UP Security isolation and activation.

FIG. 8 depicts signaling flow 800 illustrating one embodiment of SSI-based slice-specific UP security isolation and activation, according to the fourth solution for supporting network slice security. The procedure 800 involves the UE 205 and a gNB 801, e.g., in the NG-RAN 301. Precondition involves the following steps:

The gNB 801 is already prepositioned with the SSI for the UE 205's subscribed NSSAI by the UDM (either directly as shown in step 3a-3b in this embodiment 3 or via AUSF 307 as shown in embodiment 1).

Further during the PDU Session establishment procedure, the SMF 133 retrieves the Slice subscription Security Requirement Information (SSI) as part of Session Management Subscription data using Nudm_SDM_Get (SUPI, Session Management Subscription data, selected DNN, S-NSSAI of the HPLMN, Serving PLMN ID, [NID]) and subscribes to be notified when this subscription data is modified using Nudm_SDM_Subscribe (SUPI, Session Management Subscription data, selected DNN, S-NSSAI of the HPLMN, Serving PLMN ID, [NID]).

The SMF 133 can provide the retrieved SSI to the AMF 132 in the N2 SM Information in the Namf_Communication_N1N2Message Transfer message. The AMF 132 sends the received SSI to the gNB 801 in the N2 PDU Session Request message which contains the N2 SM information.

The gNB 801 now triggers the following RRC Reconfiguration procedure to set up the UP security with sufficient security isolation/cryptographic separation as indicated by the SSI which is available in the gNB 801 (e.g., provisioned by the AMF/SEAF 303 as in FIG. 3.3 step 3a-b and/or SMF 133 as described above).

The gNB 801 can activate the UP confidentiality and/or UP integrity protection per each DRB according to the UP security policy and Slice security requirement Information (SSI).

If the slice security isolation is indicated as Security Requirement Type-2 (Slice Security Isolation/Dedicated Slice Security Required') in the SSI for any S-NSSAI, the gNB 801 is not to overrule the slice security requirement provided in the SSI.

At Step 1a, the gNB 801 has received and locally stored the SSI (after a primary authentication and/or during a PDU session establishment procedure) for a UE 205 (for a set of subscribed S-NSSAIs) from the AMF (see block 805).

At Step 1b, the gNB 801 can send the RRC Connection Reconfiguration message to the UE 205 for slice-specific UP security activation containing indications for the activation of UP integrity protection and ciphering for each DRB according to the security policy and SSI/SRID according to the received and locally stored SSI (see messaging 807).

The gNB 801 derives the slice-specific User plane security keys as follows based on the operator's deployment. Here, the parameter "[slice-specific input]" can be any of: SRID, SSI, S-NSSAI, Service Type, and/or Slice Type.

$$\text{Kup-int}=\text{Trunc-128}(\text{KDF (KgNB/slice-specific KgNB, UP Integrity Algorithm ID, [slice-specific input])}) \quad \text{Equation (41)}$$

$$\text{Kup-enc}=\text{Trunc-128}(\text{KDF (KgNB/slice-specific KgNB, UP Ciphering Algorithm ID, [slice-specific input])}) \quad \text{Equation (42)}$$

At Step 1c, if slice-specific UP integrity protection is activated for DRBs as indicated by SSI/SRID in the RRC Connection Reconfiguration message, and if the gNB 801 does not have slice-specific Kup-int, the gNB 801 generates slice-specific Kup-int and slice-specific UP integrity protection for such DRBs shall start at the gNB 801 (see block 809). Similarly, if slice-specific UP ciphering is activated for DRBs as indicated by SSI/SRID in the RRC Connection Reconfiguration message, and if the gNB 801 does not have slice-specific Kup-enc, the gNB 801 shall generate slice-specific Kup-enc and slice-specific UP ciphering for such DRBs shall start at the gNB 801.

At Step 2a, the UE 205 can verify the RRC Connection Reconfiguration message (see block 811). If successful: The UE 205 can derive the slice-specific user pane keys similar to the gNB 801 as mentioned in step 1b.

If slice-specific UP integrity protection is activated for DRBs as indicated by SSI/SRID per S-NSSAI in the RRC Connection Reconfiguration message, and if the UE 205 does not have slice-specific Kup-int, then the UE 205 generates slice-specific Kup-int and slice-specific UP integrity protection for such DRBs shall start at the UE 205.

Similarly, if slice-specific UP ciphering is activated for DRBs as indicated by SSI/SRID per S-NSSAI in the RRC Connection Reconfiguration message, and if the UE 205 does not have slice-specific Kup-enc, then the UE 205 generates slice-specific Kup-enc and slice-specific UP ciphering for such DRBs shall start at the UE 205.

At Step 2b, if the UE 205 successfully verifies integrity of the RRC Connection Reconfiguration message, then the UE 205 sends the RRC Connection Reconfiguration Complete message to the gNB 801 along with SSI (see messaging 813).

Alternatively, a slice-specific UP confidentiality and UP integrity can be supported by using any of the cryptographic separation parameters (SRID/SSI/S-NSSAI/Slice Type/Service Type) in the user plane confidentiality and integrity protection.

Regarding Slice-specific cryptographic separation in the User Plane Confidentiality Mechanism: The input parameters to the 128-bit NEA algorithms are the message packet, a 128-bit cipher key Kup-enc as KEY, any of the cryptographic separation parameters (SRID/SSI/S-NSSAI/Slice Type/Service Type), 5-bit bearer identity BEARER, the 1-bit direction of transmission DIRECTION, the length of the keystream required LENGTH and a bearer specific, and direction dependent 32-bit input COUNT.

Regarding Slice-specific cryptographic separation in the User Plane Integrity Mechanism: The input parameters to the 128-bit NIA algorithms are, the message packet, a 128-bit integrity key Kup-int as KEY, any of the cryptographic separation parameters (SRID/SSI/S-NSSAI/Slice Type/Service Type), a 5-bit bearer identity BEARER value of which is assigned as specified by 3GPP TS 38.323, the 1-bit direction of transmission DIRECTION, and a bearer specific, and direction dependent 32-bit input COUNT which corresponds to the 32-bit PDCP COUNT.

Figure 9:
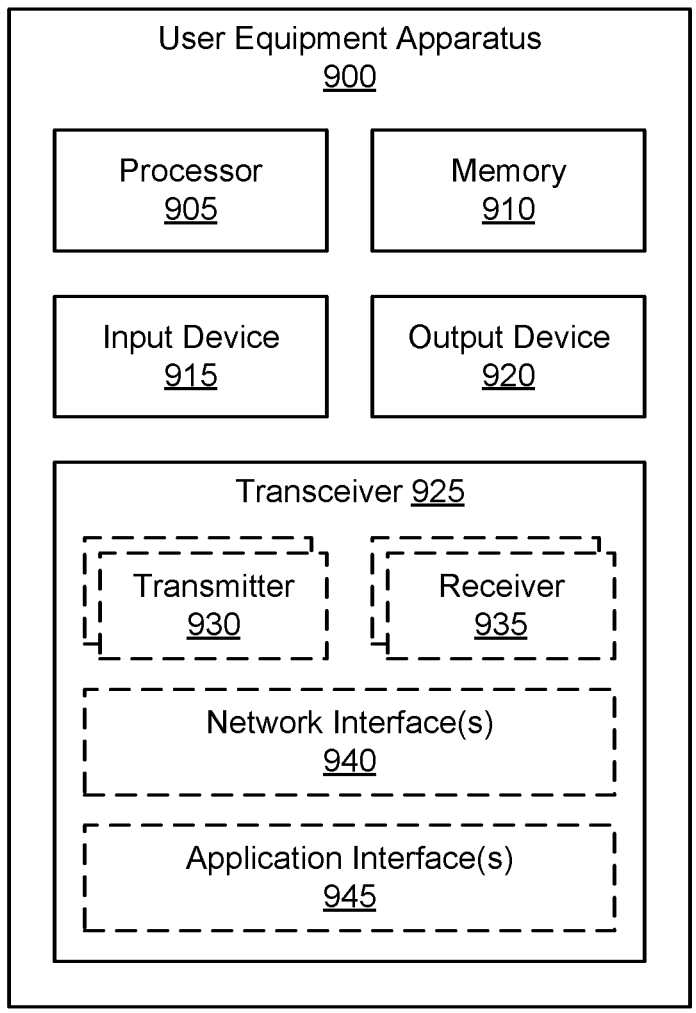
FIG. 9 is a diagram illustrating one embodiment of a user equipment apparatus that may be used for determining and enforcing service specific network slice security.

FIG. 9 depicts a user equipment apparatus 900 that may be used determining and enforcing service specific network slice security, according to embodiments of the disclosure. In various embodiments, the user equipment apparatus 900 is used to implement one or more of the solutions described above. The user equipment apparatus 900 may be one embodiment of the remote unit 105 and/or the UE 205, described above. Furthermore, the user equipment apparatus 900 may include a processor 905, a memory 910, an input device 915, an output device 920, and a transceiver 925.

In some embodiments, the input device 915 and the output device 920 are combined into a single device, such as a touchscreen. In certain embodiments, the user equipment apparatus 900 may not include any input device 915 and/or output device 920. In various embodiments, the user equipment apparatus 900 may include one or more of: the processor 905, the memory 910, and the transceiver 925, and may not include the input device 915 and/or the output device 920.

As depicted, the transceiver 925 includes at least one transmitter 930 and at least one receiver 935. In some embodiments, the transceiver 925 communicates with one or more cells (or wireless coverage areas) supported by one or more base units 121. In various embodiments, the transceiver 925 is operable on unlicensed spectrum. Moreover, the transceiver 925 may include multiple UE panel supporting one or more beams. Additionally, the transceiver 925 may support at least one network interface 940 and/or application interface 945. The application interface(s) 945 may support one or more APIs. The network interface(s) 940 may support 3GPP reference points, such as Uu, N1, PC5, etc. Other network interfaces 940 may be supported, as understood by one of ordinary skill in the art.

The processor 905, in one embodiment, may include any known controller capable of executing computer-readable instructions and/or capable of performing logical operations. For example, the processor 905 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 905 executes instructions stored in the memory 910 to perform the methods and routines described herein. The processor 905 is communicatively coupled to the memory 910, the input device 915, the output device 920, and the transceiver 925.

In certain embodiments, the processor 905 may include an application processor (also known as "main processor") which manages application-domain and operating system ("OS") functions and a baseband processor (also known as "baseband radio processor") which manages radio functions. In various embodiments, the processor 905 controls the user equipment apparatus 900 to perform the above described UE behaviors.

In various embodiments, the processor 905 performs primary authentication with a mobile communication network (e.g., with 5GC, including AMF, AUSF, etc.) and a transceiver 925 that receives a SMC message comprising SSI. The processor 905 applies slice security for control plane and user plane traffic related to a network slice according to a Security Requirement Type indicated in the SSI.

In some embodiments, applying security for control plane and user plane traffic related to a network slice includes deriving at least one slice-specific security key in response to the Security Requirement Type indicating that traffic of a corresponding network slice is to be protected using a dedicated (e.g., slice-specific) security context. In such embodiments, the processor 905 derives the at least one slice-specific security key using as inputs at least one of: a Slice SRID, the SSI, a Slice ID (e.g., S-NSSAI), a Slice Type, and a Service Type. In certain embodiments, the Slice Type and/or Service Type may be the SST value in the S-NSSAI requiring slice-specific security.

In certain embodiments, the at least one slice-specific security key comprises one or more of: a slice-specific AMF key ("Kamf"), a slice-specific RAN key (e.g., KgNB), slice-specific NAS keys (e.g., Knas-int and Knas-enc), and slice-specific AS keys (e.g., Krrc (Krrc-int, Krrc-enc) and Kup (Kup-int, Kup-enc)).

In some embodiments, applying security for control plane and user plane traffic related to a network slice comprises using slice-specific inputs (e.g., SRID, SSI per S-NSSAI/S-NSSAI/Service type) in the ciphering and integrity protection while applying a default primary authentication-based security context for a NAS connection, in response to the Security Requirement Type indicating that traffic of a corresponding network slice is to be protected using a dedicated (e.g., slice-specific) security context.

In some embodiments, receiving the SMC message comprises receiving a NAS SMC message (e.g., from an AMF) that contains an SSI inclusion indication parameter that indicates that the SSI for enforcement at the UE is provided with the NAS SMC message. Here, the SSI is both integrity protected and confidentiality protected with default/common (i.e., non-slice-specific) NAS security keys. In some embodiments, receiving the SMC message comprises receiving a NAS SMC message that contains a SRID that indicates that the NAS SMC message is slice-specific and is cryptographic separated using the SRID. In some embodiments, receiving the SMC message comprises receiving a NAS SMC message that contains a key indicator (e.g., "Use same Kamf" indicator) that indicates that the UE is to use a default/common AMF key ("Kamf") and related NAS keys (e.g., Knas-int and Knas-enc) for slice-specific NAS security using cryptographic separation.

In some embodiments, receiving the SMC message comprises receiving an AS SMC message (e.g., from a NG-RAN node) that contains an SSI inclusion indication parameter that indicates that the SSI for enforcement at the UE is provided with the AS SMC message. Here, the SSI is both integrity protected and confidentiality protected with default/common AS security keys. In some embodiments, receiving the SMC message comprises receiving an AS SMC message that contains a SRID that indicates that the AS SMC message is slice-specific and is cryptographic separated using the SRID. In some embodiments, receiving the SMC message comprises receiving an AS SMC message that contains a key indicator (e.g., "Use same KgNB" indicator) that indicates that the UE is to use a default/common RAN key (e.g., KgNB) and related AS keys for slice-specific AS security using cryptographic separation.

The memory 910, in one embodiment, is a computer readable storage medium. In some embodiments, the memory 910 includes volatile computer storage media. For example, the memory 910 may include a RAM, including dynamic RAM ("DRAM"), synchronous dynamic RAM ("SDRAM"), and/or static RAM ("SRAM"). In some embodiments, the memory 910 includes non-volatile computer storage media. For example, the memory 910 may include a hard disk drive, a flash memory, or any other suitable non-volatile computer storage device. In some embodiments, the memory 910 includes both volatile and non-volatile computer storage media.

In some embodiments, the memory 910 stores data related to determining and enforcing service specific network slice security. For example, the memory 910 may store various parameters, panel/beam configurations, resource assignments, policies, and the like as described above. In certain embodiments, the memory 910 also stores program code and related data, such as an operating system or other controller algorithms operating on the apparatus 900.

The input device 915, in one embodiment, may include any known computer input device including a touch panel, a button, a keyboard, a stylus, a microphone, or the like. In some embodiments, the input device 915 may be integrated with the output device 920, for example, as a touchscreen or similar touch-sensitive display. In some embodiments, the input device 915 includes a touchscreen such that text may be input using a virtual keyboard displayed on the touchscreen and/or by handwriting on the touchscreen. In some embodiments, the input device 915 includes two or more different devices, such as a keyboard and a touch panel.

The output device 920, in one embodiment, is designed to output visual, audible, and/or haptic signals. In some embodiments, the output device 920 includes an electronically controllable display or display device capable of outputting visual data to a user. For example, the output device 920 may include, but is not limited to, an LCD display, an LED display, an OLED display, a projector, or similar display device capable of outputting images, text, or the like to a user. As another, non-limiting, example, the output device 920 may include a wearable display separate from, but communicatively coupled to, the rest of the user equipment apparatus 900, such as a smart watch, smart glasses, a heads-up display, or the like. Further, the output device 920 may be a component of a smart phone, a personal digital assistant, a television, a table computer, a notebook (laptop) computer, a personal computer, a vehicle dashboard, or the like.

In certain embodiments, the output device 920 includes one or more speakers for producing sound. For example, the output device 920 may produce an audible alert or notification (e.g., a beep or chime). In some embodiments, the output device 920 includes one or more haptic devices for producing vibrations, motion, or other haptic feedback. In some embodiments, all or portions of the output device 920 may be integrated with the input device 915. For example, the input device 915 and output device 920 may form a touchscreen or similar touch-sensitive display. In other embodiments, the output device 920 may be located near the input device 915.

The transceiver 925 communicates with one or more network functions of a mobile communication network via one or more access networks. The transceiver 925 operates under the control of the processor 905 to transmit messages, data, and other signals and also to receive messages, data, and other signals. For example, the processor 905 may selectively activate the transceiver 925 (or portions thereof) at particular times in order to send and receive messages.

The transceiver 925 includes at least transmitter 930 and at least one receiver 935. One or more transmitters 930 may be used to provide UL communication signals to a base unit 121, such as the UL transmissions described herein. Similarly, one or more receivers 935 may be used to receive DL communication signals from the base unit 121, as described herein. Although only one transmitter 930 and one receiver 935 are illustrated, the user equipment apparatus 900 may have any suitable number of transmitters 930 and receivers 935. Further, the transmitter(s) 930 and the receiver(s) 935 may be any suitable type of transmitters and receivers. In one embodiment, the transceiver 925 includes a first transmitter/receiver pair used to communicate with a mobile communication network over licensed radio spectrum and a second transmitter/receiver pair used to communicate with a mobile communication network over unlicensed radio spectrum.

In certain embodiments, the first transmitter/receiver pair used to communicate with a mobile communication network over licensed radio spectrum and the second transmitter/receiver pair used to communicate with a mobile communication network over unlicensed radio spectrum may be combined into a single transceiver unit, for example a single chip performing functions for use with both licensed and unlicensed radio spectrum. In some embodiments, the first transmitter/receiver pair and the second transmitter/receiver pair may share one or more hardware components. For example, certain transceivers 925, transmitters 930, and receivers 935 may be implemented as physically separate components that access a shared hardware resource and/or software resource, such as for example, the network interface 940.

In various embodiments, one or more transmitters 930 and/or one or more receivers 935 may be implemented and/or integrated into a single hardware component, such as a multi-transceiver chip, a system-on-a-chip, an ASIC, or other type of hardware component. In certain embodiments, one or more transmitters 930 and/or one or more receivers 935 may be implemented and/or integrated into a multi-chip module. In some embodiments, other components such as the network interface 940 or other hardware components/circuits may be integrated with any number of transmitters 930 and/or receivers 935 into a single chip. In such embodiment, the transmitters 930 and receivers 935 may be logically configured as a transceiver 925 that uses one more common control signals or as modular transmitters 930 and receivers 935 implemented in the same hardware chip or in a multi-chip module.

Figure 10:
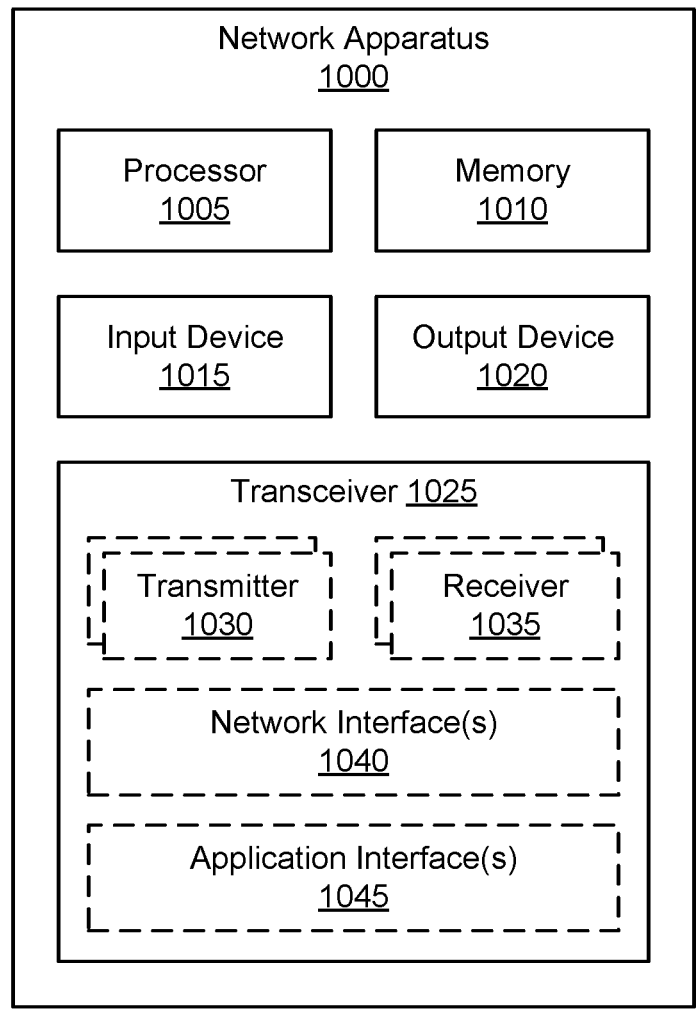
FIG. 10 is a diagram illustrating one embodiment of a network apparatus that may be used for determining and enforcing service specific network slice security.

FIG. 10 depicts a network apparatus 1000 that may be used for determining and enforcing service specific network slice security, according to embodiments of the disclosure. In one embodiment, network apparatus 1000 may be one implementation of a RAN node, such as the base unit 121, the RAN node 210, or gNB, described above. Furthermore, the base network apparatus 1000 may include a processor 1005, a memory 1010, an input device 1015, an output device 1020, and a transceiver 1025.

In some embodiments, the input device 1015 and the output device 1020 are combined into a single device, such as a touchscreen. In certain embodiments, the network apparatus 1000 may not include any input device 1015 and/or output device 1020. In various embodiments, the network apparatus 1000 may include one or more of: the processor 1005, the memory 1010, and the transceiver 1025, and may not include the input device 1015 and/or the output device 1020.

As depicted, the transceiver 1025 includes at least one transmitter 1030 and at least one receiver 1035. Here, the transceiver 1025 communicates with one or more remote units 105. Additionally, the transceiver 1025 may support at least one network interface 1040 and/or application interface 1045. The application interface(s) 1045 may support one or more APIs. The network interface(s) 1040 may support 3GPP reference points, such as Uu, N1, N2 and N3. Other network interfaces 1040 may be supported, as understood by one of ordinary skill in the art.

The processor 1005, in one embodiment, may include any known controller capable of executing computer-readable instructions and/or capable of performing logical operations. For example, the processor 1005 may be a microcontroller, a microprocessor, a CPU, a GPU, an auxiliary processing unit, a FPGA, or similar programmable controller. In some embodiments, the processor 1005 executes instructions stored in the memory 1010 to perform the methods and routines described herein. The processor 1005 is communicatively coupled to the memory 1010, the input device 1015, the output device 1020, and the transceiver 1025.

In various embodiments, the network apparatus 1000 is a RAN node (e.g., gNB) that sends UE configurations and receives measurement reports, as described herein. In such embodiments, the processor 1005 controls the network apparatus 1000 to perform the above described behaviors. When operating as a RAN node, the processor 1005 may include an application processor (also known as "main processor") which manages application-domain and operating system ("OS") functions and a baseband processor (also known as "baseband radio processor") which manages radio functions.

In various embodiments, the processor 1005 controls the network apparatus 1000 to perform the above described NG-RAN behaviors. When functioning as a RAN node, the processor 1005 establishes a connection with a UE and the network interface 1040 receives a UE Security Context setup message comprising SSI. The processor 1005 applies slice security for AS traffic related to a network slice according to a Security Requirement Type indicated in the SSI.

In some embodiments, the UE Security Context setup message contains a key indicator (e.g., "Use same Kamf" indicator) that indicates that the apparatus (e.g., NG-RAN) is to use a default/common (i.e., non-slice-specific) RAN key (e.g., KgNB) for slice-specific AS security using cryptographic separation.

In some embodiments, the processor 1005 applies security for the control plane and user plane traffic related to a network slice by sending (i.e., via transceiver 1025) an AS SMC message that contains an SSI inclusion indication parameter that indicates that the SSI for enforcement at the UE is provided with the AS SMC message, wherein the SSI is both integrity protected and confidentiality protected with default/common AS security keys.

In some embodiments, the processor 1005 applies security for the control plane and user plane traffic related to a network slice by sending (i.e., via transceiver 1025) an AS SMC message that contains a SRID that indicates that the AS SMC message is slice-specific and is cryptographic separated using the SRID. In some embodiments, the processor 1005 applies security for the control plane and user plane traffic related to a network slice by sending (i.e., via transceiver 1025) an AS SMC message that contains a key indicator (e.g., "Use same KgNB" indicator) that indicates that the UE is to use a default/common RAN key (e.g., KgNB) and related AS keys for slice-specific AS security using cryptographic separation.

In various embodiments, the processor 1005 controls the network apparatus 1000 to perform the above described UDM behaviors. When functioning as the UDM, the network interface 1040 may receive a subscription data request message from an AMF, said request message comprising a Subscription Identifier (e.g., SUPI) of an already authenticated UE and a Slice selection Subscription data IE". In one embodiment, the subscription data request message is a Nudm_SDM_Get Request message. In another embodiment, the subscription data request message is a Nudm_SDM_Subscribe request message.

Upon receiving the subscription data request message, the processor 1005 retrieves Slice-specific Security requirement Information ("SSI") associated with a set of network slices (e.g., retrieved based on the received SUPI and/or Subscription data of the authenticated UE). Moreover, the processor 1005 controls the network interface 1040 to send a subscription data response message to the AMF. Here, the response message contains the retrieved SSI.

In some embodiments, the processor 1005 retrieves the SSI from a UDR (e.g., a co-located and/or associated UDR. In certain embodiments, the UDR stores the SSI as part of UE subscription information and slice selection subscription data. In one embodiment, the SSI is a subscriber-specific parameter. In another embodiment, the SSI is a slice-specific parameter.

In some embodiments, each retrieved SSI includes a SRID, a Slice ID (e.g., S-NSSAI) that identifies at least one network slice, and a Security Requirement Type for each identified network slice. In one embodiment, a first Security Requirement Type indicates that the corresponding network slice is to be protected using a common (i.e., not slice-specific) security context. In another embodiment, a second Security Requirement Type indicates that the corresponding network slice is to be protected using a dedicated (i.e., slice-specific) security context.

In some embodiments, the processor 1005 sends slice selection subscription data to the AMF in the subscription data response message, where the slice selection subscription data contains a set of subscribed S-NSSAI, i.e., indicating network slices to which the UE is subscribed, and SSI for each subscribed S-NSSAI. In some embodiments, the subscription data request message further comprises a Slice Security Requirement IE (e.g., to request the SSI), wherein the processor 1005 retrieves the SSI in response to the Slice Security Requirement indicator. In other embodiments, the subscription data request message contains the Slice Security Requirement IE and does not include the Slice subscription data IE.

In various embodiments, the processor 1005 controls the network apparatus 1000 to perform the above described AMF/SEAF behaviors. When functioning as an AMF (e.g., with co-located SEAF), the processor 1005 performs primary authentication with a UE and the network interface 1040 sends a subscription data request message to a UDM. Here, the subscription data request message contains a Subscription Identifier (e.g., SUPI) of the authenticated UE and a Slice selection Subscription data IE. In one embodiment, the subscription data request message is a Nudm_SDM_Get Request message. In another embodiment, the subscription data request message is a Nudm_SDM_Subscribe request message.

The network interface 1040 further receives a subscription data response message from the UDM, where the subscription data response message contains a set of network slices (e.g., subscribed S-NSSAI) of the UE and SSI for the network slices. Moreover, the processor 1005 enforces slice security for control plane and user plane traffic related to a network slice according to a Security Requirement Type indicated in the SSI.

In some embodiments, each retrieved SSI includes a SRID, a Slice ID (e.g., S-NSSAI) that identifies at least one network slice, and a Security Requirement Type for each identified network slice. In one embodiment, a first Security Requirement Type indicates that traffic of the corresponding network slice is to be protected using a common security context. In another embodiment, a second Security Requirement Type indicates that traffic of the corresponding network slice is to be protected using a dedicated (e.g., slice-specific) security context.

In some embodiments, the processor 1005 enforces slice security according to the second Security Requirement Type via Cryptographic separation by using slice-specific inputs (e.g., SRID, SSI per S-NSSAI/S-NSSAI/Service type) in the ciphering and integrity protection while applying a default primary authentication-based security context for a NAS connection or by using slice-specific NAS keys (e.g., Knas-int and Knas-enc) for ciphering and integrity protection for a NAS connection.

In various embodiments, the processor 1005 further sends to the UE a NAS SMC message. In certain embodiments, the NAS SMC message contains a SRID that indicates that the NAS SMC message is slice-specific and is cryptographic separated using the SRID. In certain embodiments, the NAS SMC message contains an SSI inclusion indication parameter that indicates that the SSI for enforcement at the UE is provided with the NAS SMC message and that the SSI is both integrity protected and confidentiality protected with default/common (i.e., non-slice-specific) NAS security keys. In certain embodiments, the NAS SMC message contains a key indicator (e.g., "Use same Kamf" indicator) that indicates that the UE is to use a default/common AMF key ("Kamf") and related NAS keys (e.g., Knas-int and Knas-enc) for slice-specific NAS security using cryptographic separation.

In some embodiments, the processor 1005 further sends to a RAN node a UE Security Context setup message that contains at least one of: SSI that triggers the RAN node to initiate slice-specific security set up for the RRC and UP security for the UE and a key indicator (e.g., "Use same KgNB" indicator) that indicates that the RAN node is to use a default/common RAN key (e.g., KgNB) for slice-specific AS security using cryptographic separation.

The memory 1010, in one embodiment, is a computer readable storage medium. In some embodiments, the memory 1010 includes volatile computer storage media. For example, the memory 1010 may include a RAM, including dynamic RAM ("DRAM"), synchronous dynamic RAM ("SDRAM"), and/or static RAM ("SRAM"). In some embodiments, the memory 1010 includes non-volatile computer storage media. For example, the memory 1010 may include a hard disk drive, a flash memory, or any other suitable non-volatile computer storage device. In some embodiments, the memory 1010 includes both volatile and non-volatile computer storage media.

In some embodiments, the memory 1010 stores data related to determining and enforcing service specific network slice security. For example, the memory 1010 may store parameters, configurations, resource assignments, policies, and the like, as described above. In certain embodiments, the memory 1010 also stores program code and related data, such as an operating system or other controller algorithms operating on the apparatus 1000.

The input device 1015, in one embodiment, may include any known computer input device including a touch panel, a button, a keyboard, a stylus, a microphone, or the like. In some embodiments, the input device 1015 may be integrated with the output device 1020, for example, as a touchscreen or similar touch-sensitive display. In some embodiments, the input device 1015 includes a touchscreen such that text may be input using a virtual keyboard displayed on the touchscreen and/or by handwriting on the touchscreen. In some embodiments, the input device 1015 includes two or more different devices, such as a keyboard and a touch panel.

The output device 1020, in one embodiment, is designed to output visual, audible, and/or haptic signals. In some embodiments, the output device 1020 includes an electronically controllable display or display device capable of outputting visual data to a user. For example, the output device 1020 may include, but is not limited to, an LCD display, an LED display, an OLED display, a projector, or similar display device capable of outputting images, text, or the like to a user. As another, non-limiting, example, the output device 1020 may include a wearable display separate from, but communicatively coupled to, the rest of the network apparatus 1000, such as a smart watch, smart glasses, a heads-up display, or the like. Further, the output device 1020 may be a component of a smart phone, a personal digital assistant, a television, a table computer, a notebook (laptop) computer, a personal computer, a vehicle dashboard, or the like.

In certain embodiments, the output device 1020 includes one or more speakers for producing sound. For example, the output device 1020 may produce an audible alert or notification (e.g., a beep or chime). In some embodiments, the output device 1020 includes one or more haptic devices for producing vibrations, motion, or other haptic feedback. In some embodiments, all or portions of the output device 1020 may be integrated with the input device 1015. For example, the input device 1015 and output device 1020 may form a touchscreen or similar touch-sensitive display. In other embodiments, the output device 1020 may be located near the input device 1015.

The transceiver 1025 includes at least transmitter 1030 and at least one receiver 1035. One or more transmitters 1030 may be used to communicate with the UE, as described herein. Similarly, one or more receivers 1035 may be used to communicate with network functions in the PLMN and/or RAN, as described herein. Although only one transmitter 1030 and one receiver 1035 are illustrated, the network apparatus 1000 may have any suitable number of transmitters 1030 and receivers 1035. Further, the transmitter(s) 1030 and the receiver(s) 1035 may be any suitable type of transmitters and receivers.

Figure 11:
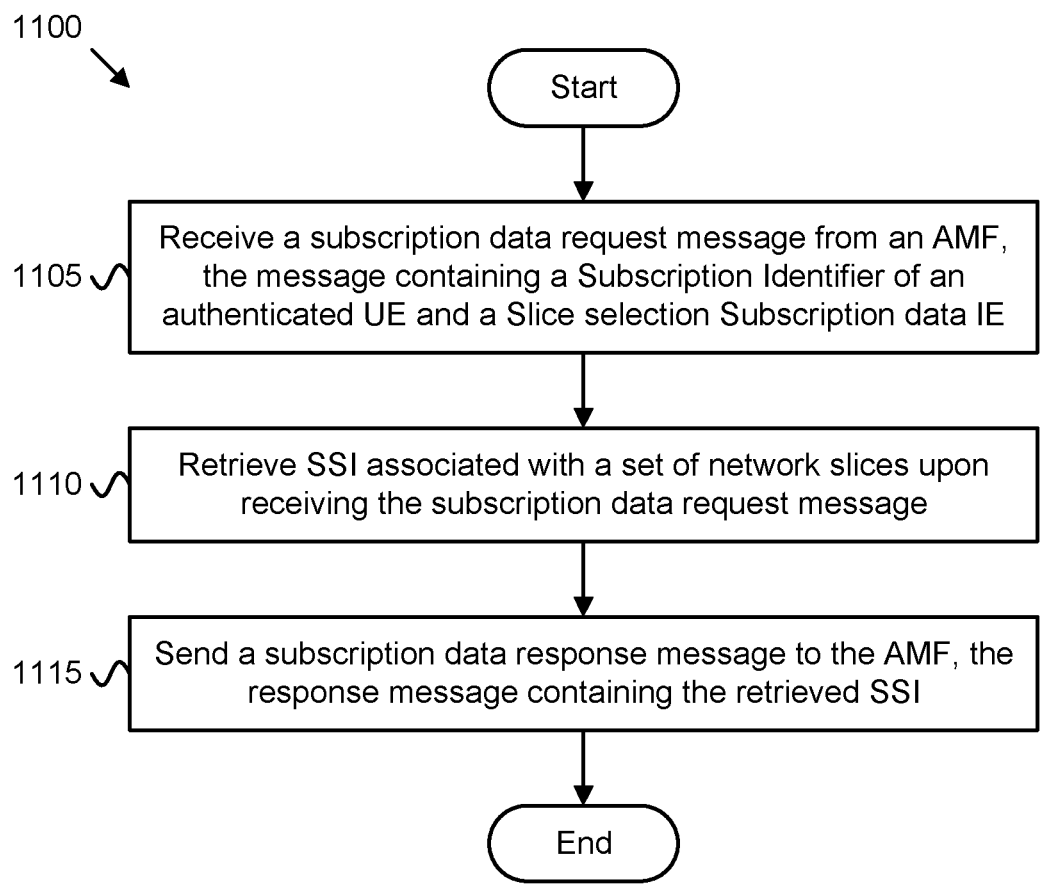
FIG. 11 is a flowchart diagram illustrating one embodiment of a first method determining and enforcing service specific network slice security.

FIG. 11 depicts one embodiment of a method 1100 for determining and enforcing service specific network slice security, according to embodiments of the disclosure. In various embodiments, the method 1100 is performed by an UDM in a mobile communication network, such as the UDR/UDR 139, the ARPF/UDM 309, and/or the network apparatus 1000, described above. In some embodiments, the method 1100 is performed by a processor, such as a microcontroller, a microprocessor, a CPU, a GPU, an auxiliary processing unit, a FPGA, or the like.

The method 1100 begins and receives 1105 a subscription data request message from an AMF, said request message comprising a Subscription Identifier (e.g., SUPI) of an authenticated UE and a Slice selection Subscription data IE. In one embodiment, the subscription data request message is a Nudm_SDM_Get Request message. In another embodiment, the subscription data request message is a Nudm_SDM_Subscribe request message.

The method 1100 includes retrieving 1110 SSI associated with a set of network slices (e.g., retrieved based on the received SUPI and/or Subscription data of the authenticated UE), upon receiving the subscription data request message. The method 1100 additionally includes sending 1115 a subscription data response message to the AMF, the response message containing the retrieved SSI. The method 1100 ends.

Figure 12:
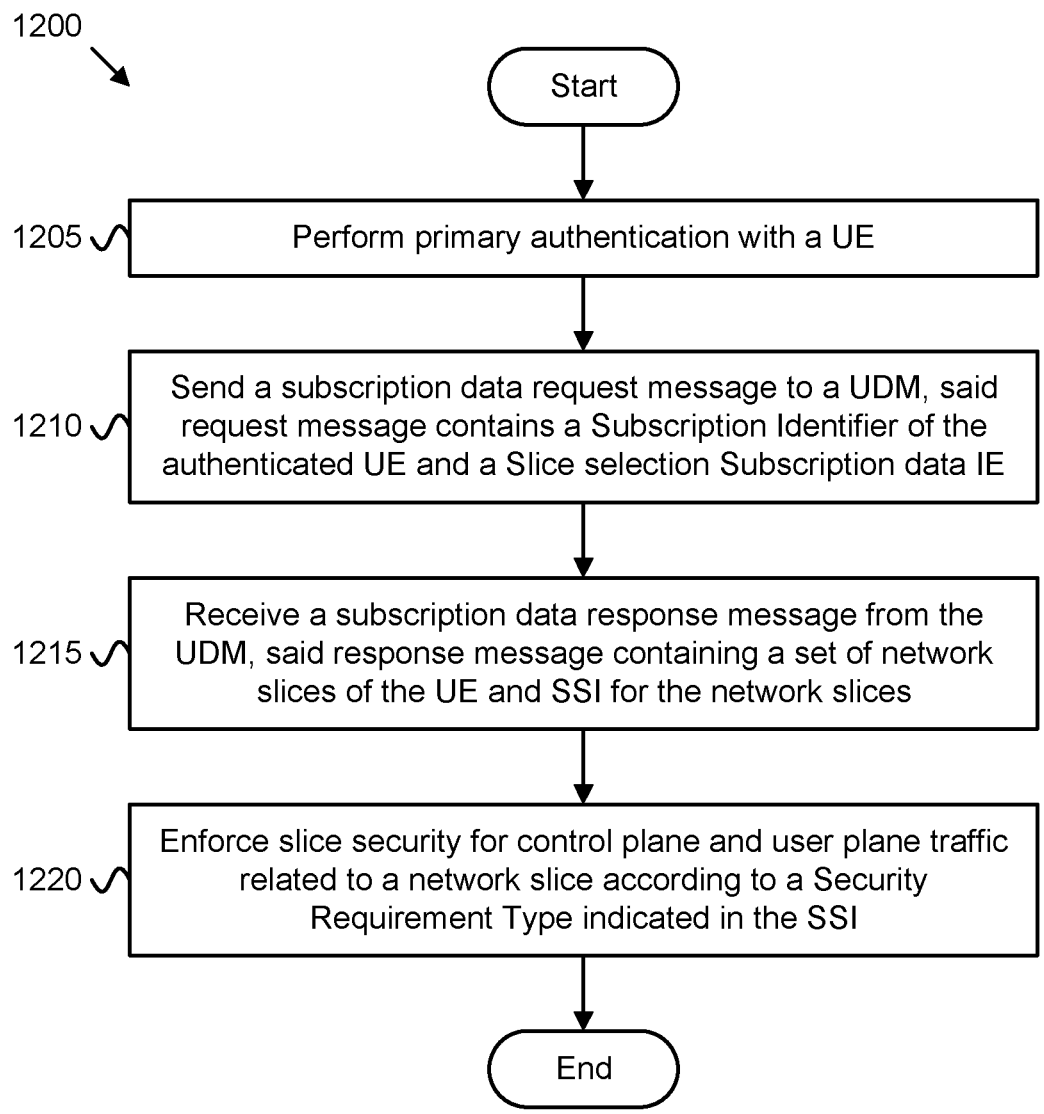
FIG. 12 is a flowchart diagram illustrating one embodiment of a second method determining and enforcing service specific network slice security.

FIG. 12 depicts one embodiment of a method 1200 for determining and enforcing service specific network slice security, according to embodiments of the disclosure. In various embodiments, the method 1200 is performed by an AMF/SEAF in a mobile communication network, such as the AMF 132, the AMF 215, the AMF/SEAF 301, and/or the network apparatus 1000, described above. In some embodiments, the method 1200 is performed by a processor, such as a microcontroller, a microprocessor, a CPU, a GPU, an auxiliary processing unit, a FPGA, or the like.

The method 1200 begins and performs 1205 primary authentication with a UE. The method 1200 includes sending 1210 a subscription data request message to a UDM. Here, the subscription data request message contains a Subscription Identifier (e.g., SUPI) of the authenticated UE and a Slice selection Subscription data IE. In one embodiment, the subscription data request message is a Nudm_SDM_Get Request message. In another embodiment, the subscription data request message is a Nudm_SDM_Subscribe request message.

The method 1200 includes receiving 1215 a subscription data response message from the UDM. The method 1200 includes enforcing 1220 slice security for control plane and user plane traffic related to a network slice according to a Security Requirement Type indicated in the SSI. Here, the response message comprising a set of network slices (e.g., subscribed S-NSSAI) of the UE and SSI for the network slices. The method 1200 ends.

Figure 13:
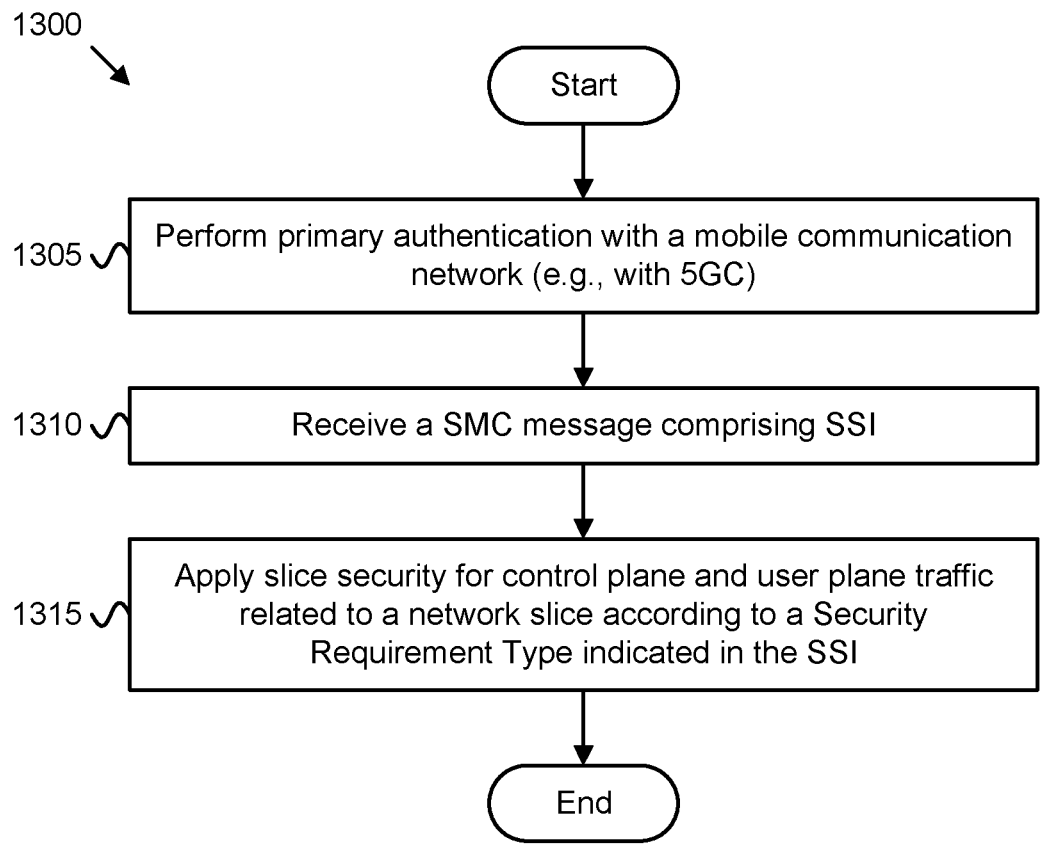
FIG. 13 is a flowchart diagram illustrating one embodiment of a third method determining and enforcing service specific network slice security.

FIG. 13 depicts one embodiment of a method 1300 for determining and enforcing service specific network slice security, according to embodiments of the disclosure. In various embodiments, the method 1300 is performed by a user equipment device, such as the remote unit 105, the UE 205, and/or the user equipment apparatus 900, described above. In some embodiments, the method 1300 is performed by a processor, such as a microcontroller, a microprocessor, a CPU, a GPU, an auxiliary processing unit, a FPGA, or the like.

The method 1300 begins and performs 1305 primary authentication with a mobile communication network, e.g., with 5GC, including AMF, AUSF, etc. The method 1300 includes receiving 1310 a SMC message comprising SSI. The method 1300 includes applying 1315 slice security for control plane and user plane traffic related to a network slice according to a Security Requirement Type indicated in the SSI. The method 1300 ends.

Figure 14:
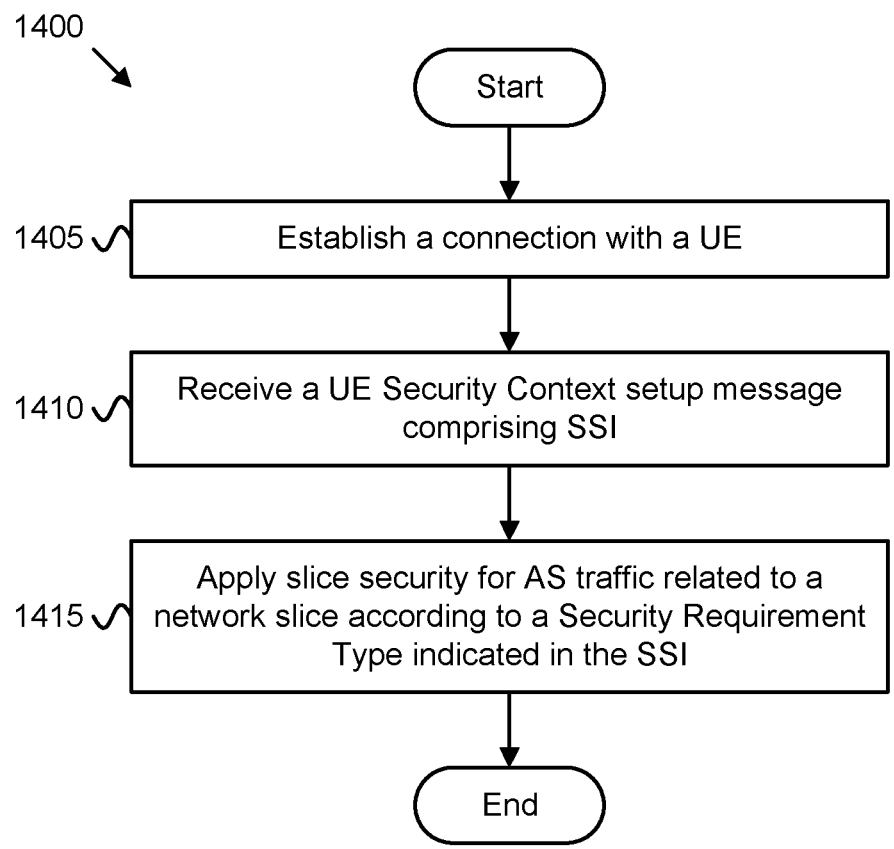
FIG. 14 is a flowchart diagram illustrating one embodiment of a fourth method determining and enforcing service specific network slice security.

FIG. 14 depicts one embodiment of a method 1400 for determining and enforcing service specific network slice security, according to embodiments of the disclosure. In various embodiments, the method 1400 is performed by a RAN apparatus in a mobile communication network, such as the base unit 121, the RAN 210, the NG-RAN 301, the gNB 801, and/or the network equipment 1000, described above. In some embodiments, the method 1400 is performed by a processor, such as a microcontroller, a microprocessor, a CPU, a GPU, an auxiliary processing unit, a FPGA, or the like.

The method 1400 begins and establishes 1405 a connection with a UE. The method 1400 includes receiving 1410 a UE Security Context setup message comprising SSI. The method 1400 includes applying 1415 slice security for AS traffic related to a network slice according to a Security Requirement Type indicated in the SSI. The method 1400 ends.

Disclosed herein is a first apparatus for determining and enforcing service specific network slice security, according to embodiments of the disclosure. The first apparatus may be implemented by an UDM in a mobile communication network, such as the UDM/UDR 139, the ARPF/UDM 309, and/or the network apparatus 1000 described above. The first apparatus includes a processor and a network interface that receives a subscription data request message from an AMF, said request message comprising a Subscription Identifier (e.g., SUPI) of an already authenticated UE and a Slice selection Subscription data IE. In one embodiment, the subscription data request message is a Nudm_SDM_Get Request message. In another embodiment, the subscription data request message is a Nudm_SDM_Subscribe request message.

Upon receiving the subscription data request message, the processor retrieves Slice-specific Security requirement Information ("SSI") associated with a set of network slices (e.g., retrieved based on the received SUPI and/or Subscription data of the authenticated UE). Moreover, the processor controls the network interface to send a subscription data response message to the AMF. Here, the response message contains the retrieved SSI.

In some embodiments, the processor retrieves the SSI from a UDR (e.g., a co-located and/or associated UDR. In certain embodiments, the UDR stores the SSI as part of UE subscription information and slice selection subscription data. In one embodiment, the SSI is a subscriber-specific parameter. In another embodiment, the SSI is a slice-specific parameter.

In some embodiments, each retrieved SSI includes a SRID, a Slice ID (e.g., S-NSSAI) that identifies at least one network slice, and a Security Requirement Type for each identified network slice. In one embodiment, a first Security Requirement Type indicates that the corresponding network slice is to be protected using a common (i.e., not slice-specific) security context. In another embodiment, a second Security Requirement Type indicates that the corresponding network slice is to be protected using a dedicated (i.e., slice-specific) security context.

In some embodiments, the processor sends slice selection subscription data to the AMF in the subscription data response message, where the slice selection subscription data contains a set of subscribed S-NSSAI, i.e., indicating network slices to which the UE is subscribed, and SSI for each subscribed S-NSSAI. In some embodiments, the subscription data request message further comprises a Slice Security Requirement IE (e.g., to request the SSI), wherein the processor retrieves the SSI in response to the Slice Security Requirement indicator.

Disclosed herein is a first method for determining and enforcing service specific network slice security, according to embodiments of the disclosure. The first method may be performed by a UDM/UDR 139, the ARPF/UDM 309, and/or the network apparatus 1000, described above. The first method includes receiving a subscription data request message from an AMF, said request message comprising a Subscription Identifier (e.g., SUPI) of an authenticated UE and a Slice selection Subscription data IE. In one embodiment, the subscription data request message is a Nudm_SDM_Get Request message. In another embodiment, the subscription data request message is a Nudm_SDM_Subscribe request message.

The first method includes retrieving SSI associated with a set of network slices (e.g., retrieved based on the received SUPI and/or Subscription data of the authenticated UE), upon receiving the subscription data request message. The first method additionally includes sending a subscription data response message to the AMF, the response message containing the retrieved SSI.

In some embodiments, retrieving the SSI comprises retrieving from a UDR (e.g., a co-located and/or associated UDR. In certain embodiments, the UDR stores the SSI as part of UE subscription information and slice selection subscription data. In one embodiment, the SSI is a subscriber-specific parameter. In another embodiment, the SSI is a slice-specific parameter.

In some embodiments, each retrieved SSI includes a SRID, a Slice ID (e.g., S-NSSAI) that identifies at least one network slice, and a Security Requirement Type for each identified network slice. In one embodiment, a first Security Requirement Type indicates that the corresponding network slice is to be protected using a common (i.e., not slice-specific) security context. In another embodiment, a second Security Requirement Type indicates that the corresponding network slice is to be protected using a dedicated (i.e., slice-specific) security context.

In some embodiments, the first method includes sending slice selection subscription data to the AMF in the subscription data response message, where the slice selection subscription data contains a set of subscribed S-NSSAI, i.e., indicating network slices to which the UE is subscribed, and SSI for each subscribed S-NSSAI. In some embodiments, the subscription data request message further comprises a Slice Security Requirement IE (e.g., to request the SSI), wherein retrieving the SSI occurs in response to the Slice Security Requirement indicator.

Disclosed herein is a second apparatus for determining and enforcing service specific network slice security, according to embodiments of the disclosure. The second apparatus may be implemented by an AMF apparatus, such as the AMF 132, the AMF 215, the AMF/SEAF 303, and/or the network apparatus 1000, described above. In certain embodiments, the AMF apparatus is co-located with a SEAF used when performing primary authentication. The second apparatus includes a processor that performs primary authentication with a UE and a network interface that sends a subscription data request message to a UDM. Here, the subscription data request message contains a Subscription Identifier (e.g., SUPI) of the authenticated UE and a Slice selection Subscription data IE. In one embodiment, the subscription data request message is a Nudm_SDM_Get Request message. In another embodiment, the subscription data request message is a Nudm_SDM_Subscribe request message.

The network interface further receives a subscription data response message from the UDM, where the subscription data response message contains a set of network slices (e.g., subscribed S-NSSAI) of the UE and SSI for the network slices. Moreover, the processor enforces slice security for control plane and user plane traffic related to a network slice according to a Security Requirement Type indicated in the SSI.

In some embodiments, each retrieved SSI includes a SRID, a Slice ID (e.g., S-NSSAI) that identifies at least one network slice, and a Security Requirement Type for each identified network slice. In one embodiment, a first Security Requirement Type indicates that traffic of the corresponding network slice is to be protected using a common security context. In another embodiment, a second Security Requirement Type indicates that traffic of the corresponding network slice is to be protected using a dedicated (e.g., slice-specific) security context.

In some embodiments, the processor enforces slice security according to the second Security Requirement Type via Cryptographic separation by using slice-specific inputs (e.g., SRID, SSI per S-NSSAI/S-NSSAI/Service type) in the ciphering and integrity protection while applying a default primary authentication-based security context for a NAS connection or by using slice-specific NAS keys (e.g., Knas-int and Knas-enc) for ciphering and integrity protection for a NAS connection.

In various embodiments, the processor further sends to the UE a NAS SMC message. In certain embodiments, the NAS SMC message contains a SRID that indicates that the NAS SMC message is slice-specific and is cryptographic separated using the SRID. In certain embodiments, the NAS SMC message contains an SSI inclusion indication parameter that indicates that the SSI for enforcement at the UE is provided with the NAS SMC message and that the SSI is both integrity protected and confidentiality protected with default/common (i.e., non-slice-specific) NAS security keys. In certain embodiments, the NAS SMC message contains a key indicator (e.g., "Use same Kamf" indicator) that indicates that the UE is to use a default/common AMF key ("Kamf") and related NAS keys (e.g., Knas-int and Knas-enc) for slice-specific NAS security using cryptographic separation.

In some embodiments, the processor further sends to a RAN node a UE Security Context setup message that contains at least one of: SSI that triggers the RAN node to initiate slice-specific security set up for the RRC and UP security for the UE and a key indicator (e.g., "Use same KgNB" indicator) that indicates that the RAN node is to use a default/common RAN key (e.g., KgNB) for slice-specific AS security using cryptographic separation.

Disclosed herein is a second method for determining and enforcing service specific network slice security, according to embodiments of the disclosure. The second method may be performed by an AMF, such as the AMF 132, the AMF 215, the AMF/SEAF 303, and/or the network apparatus 1000, described above. In certain embodiments, the AMF is co-located with a SEAF used when performing primary authentication. The second method includes performing primary authentication with a UE and sending a subscription data request message to a UDM. Here, the subscription data request message contains a Subscription Identifier (e.g., SUPI) of the authenticated UE and a Slice selection Subscription data IE. In one embodiment, the subscription data request message is a Nudm_SDM_Get Request message. In another embodiment, the subscription data request message is a Nudm_SDM_Subscribe request message.

The second method includes receiving a subscription data response message from the UDM and enforcing slice security for control plane and user plane traffic related to a network slice according to a Security Requirement Type indicated in the SSI. Here, the response message comprising a set of network slices (e.g., subscribed S-NSSAI) of the UE and SSI for the network slices.

In some embodiments, each retrieved SSI comprises a SRID, a Slice ID (e.g., S-NSSAI) that identifies at least one network slice, and a Security Requirement Type for each identified network slice. In one embodiment, a first Security Requirement Type indicates that traffic of the corresponding network slice is to be protected using a common security context. In another embodiment, a second Security Requirement Type indicates that traffic of the corresponding network slice is to be protected using a dedicated (e.g., slice-specific) security context.

In some embodiments, enforcing slice security according to the second Security Requirement Type via Cryptographic separation comprises using slice-specific inputs (e.g., SRID, SSI per S-NSSAI/S-NSSAI/Service type) in the ciphering and integrity protection while applying a default primary authentication-based security context for a NAS connection or by using slice-specific NAS keys (e.g., Knas-int and Knas-enc) for ciphering and integrity protection for a NAS connection.

In various embodiments, the second method further includes sending to the UE a NAS SMC message. In certain embodiments, the NAS SMC message contains a SRID that indicates that the NAS SMC message is slice-specific and is cryptographic separated using the SRID. In certain embodiments, the NAS SMC message contains an SSI inclusion indication parameter that indicates that the SSI for enforcement at the UE is provided with the NAS SMC message and that the SSI is both integrity protected and confidentiality protected with default/common (i.e., non-slice-specific) NAS security keys. In certain embodiments, the NAS SMC message contains a key indicator (e.g., "Use same Kamf" indicator) that indicates that the UE is to use a default/common AMF key ("Kamf") and related NAS keys (e.g., Knas-int and Knas-enc) for slice-specific NAS security using cryptographic separation.

In some embodiments, the second method includes sending to a RAN node a UE Security Context setup message that contains at least one of: SSI that triggers the RAN node to initiate slice-specific security set up for the RRC and UP security for the UE and a key indicator (e.g., "Use same KgNB" indicator) that indicates that the RAN node is to use a default/common RAN key (e.g., KgNB) for slice-specific AS security using cryptographic separation.

Disclosed herein is a third apparatus for determining and enforcing service specific network slice security, according to embodiments of the disclosure. The third apparatus may be implemented by a user equipment device in a mobile communication network, such as the remote unit 105, the UE 205, and/or the user equipment apparatus 900, described above. The third apparatus includes a processor that performs primary authentication with a mobile communication network (e.g., with 5GC, including AMF, AUSF, etc.) and a transceiver that receives a SMC message comprising SSI. The processor applies slice security for control plane and user plane traffic related to a network slice according to a Security Requirement Type indicated in the SSI.

In some embodiments, applying security for control plane and user plane traffic related to a network slice includes deriving at least one slice-specific security key in response to the Security Requirement Type indicating that traffic of a corresponding network slice is to be protected using a dedicated (e.g., slice-specific) security context. In such embodiments, the processor derives the at least one slice-specific security key using as inputs at least one of: a Slice SRID, the SSI, a Slice ID (e.g., S-NSSAI), a Slice Type, and a Service Type. In certain embodiments, the at least one slice-specific security key comprises one or more of: a slice-specific AMF key ("Kamf"), a slice-specific RAN key (e.g., KgNB), slice-specific NAS keys (e.g., Knas-int and Knas-enc), and slice-specific AS keys (e.g., Krrc (Krrc-int, Krrc-enc) and Kup (Kup-int, Kup-enc)).

In some embodiments, the processor applies security for the control plane and user plane traffic related to a network slice by using slice-specific inputs (e.g., SRID, SSI per S-NSSAI/S-NSSAI/Service type) in the ciphering and integrity protection while applying a default primary authentication-based security context for a NAS connection, in response to the Security Requirement Type indicating that traffic of a corresponding network slice is to be protected using a dedicated (e.g., slice-specific) security context.

In some embodiments, receiving the SMC message comprises receiving a NAS SMC message (e.g., from an AMF) that contains an SSI inclusion indication parameter that indicates that the SSI for enforcement at the UE is provided with the NAS SMC message. Here, the SSI is both integrity protected and confidentiality protected with default/common (i.e., non-slice-specific) NAS security keys. In some embodiments, receiving the SMC message comprises receiving a NAS SMC message that contains a SRID that indicates that the NAS SMC message is slice-specific and is cryptographic separated using the SRID. In some embodiments, receiving the SMC message comprises receiving a NAS SMC message that contains a key indicator (e.g., "Use same Kamf" indicator) that indicates that the UE is to use a default/common AMF key ("Kamf") and related NAS keys (e.g., Knas-int and Knas-enc) for slice-specific NAS security using cryptographic separation.

In some embodiments, receiving the SMC message comprises receiving an AS SMC message (e.g., from a NG-RAN node) that contains an SSI inclusion indication parameter that indicates that the SSI for enforcement at the UE is provided with the AS SMC message. Here, the SSI is both integrity protected and confidentiality protected with default/common AS security keys. In some embodiments, receiving the SMC message comprises receiving an AS SMC message that contains a SRID that indicates that the AS SMC message is slice-specific and is cryptographic separated using the SRID. In some embodiments, receiving the SMC message comprises receiving an AS SMC message that contains a key indicator (e.g., "Use same KgNB" indicator) that indicates that the UE is to use a default/common RAN key (e.g., KgNB) and related AS keys for slice-specific AS security using cryptographic separation.

Disclosed herein is a third method for determining and enforcing service specific network slice security, according to embodiments of the disclosure. The third method may be performed by a user equipment device in a mobile communication network, such as the remote unit 105, the UE 205, and/or the user equipment device 900, described above. The third method includes performing primary authentication with a mobile communication network (e.g., with 5GC, including AMF, AUSF, etc.). The third method includes receiving a SMC message comprising SSI and applying slice security for control plane and user plane traffic related to a network slice according to a Security Requirement Type indicated in the SSI.

In some embodiments, applying security for control plane and user plane traffic related to a network slice comprises deriving at least one slice-specific security key in response to the Security Requirement Type indicating that traffic of a corresponding network slice is to be protected using a dedicated (e.g., slice-specific) security context, the method further comprising deriving the at least one slice-specific security key using as inputs at least one of: a Slice SRID, the SSI, a Slice ID (e.g., S-NSSAI), a Slice Type, and a Service Type.

In some embodiments, the at least one slice-specific security key comprises one or more of: a slice-specific AMF key ("Kamf"), a slice-specific RAN key (e.g., KgNB), slice-specific NAS keys (e.g., Knas-int and Knas-enc), and slice-specific AS keys (e.g., Krrc (Krrc-int, Krrc-enc) and Kup (Kup-int, Kup-enc)).

In some embodiments, applying security for control plane and user plane traffic related to a network slice comprises using slice-specific inputs (e.g., SRID, SSI per S-NSSAI/S-NSSAI/Service type) in the ciphering and integrity protection while applying a default primary authentication-based security context for a NAS connection, in response to the Security Requirement Type indicating that traffic of a corresponding network slice is to be protected using a dedicated (i.e., slice-specific) security context.

In some embodiments, receiving the SMC message comprises receiving a NAS SMC message that contains an SSI inclusion indication parameter that indicates that the SSI for enforcement at the UE is provided with the NAS SMC message. Here, the SSI is both integrity protected and confidentiality protected with default/common (i.e., non-slice-specific) NAS security keys. In some embodiments, receiving the SMC message comprises receiving a NAS SMC message that contains a SRID that indicates that the NAS SMC message is slice-specific and is cryptographic separated using the SRID. In some embodiments, receiving the SMC message comprises receiving a NAS SMC message that contains a key indicator (e.g., "Use same Kamf" indicator) that indicates that the UE is to use a default/common AMF key ("Kamf") and related NAS keys for slice-specific NAS security using cryptographic separation.

In some embodiments, receiving the SMC message comprises receiving an AS SMC message that contains an SSI inclusion indication parameter that indicates that the SSI for enforcement at the UE is provided with the AS SMC message. Here, the SSI is both integrity protected and confidentiality protected with default/common AS security keys. In some embodiments, receiving the SMC message comprises receiving an AS SMC message that contains a SRID that indicates that the AS SMC message is slice-specific and is cryptographic separated using the SRID. In some embodiments, receiving the SMC message comprises receiving an AS SMC message that contains a key indicator (e.g., "Use same KgNB" indicator) that indicates that the UE is to use a default/common RAN key (e.g., KgNB) and related AS keys for slice-specific AS security using cryptographic separation.

Disclosed herein is a fourth apparatus for determining and enforcing service specific network slice security, according to embodiments of the disclosure. The fourth apparatus may be implemented by a RAN node, e.g., in a NG-RAN, such as the base unit 121, the RAN 210, the NG-RAN 301, the gNB 801, and/or the network equipment 1000, described above. The fourth apparatus includes a radio transceiver, a processor that establishes a connection with a UE, and a network interface (e.g., for communicating with 5GC) that receives a UE Security Context setup message comprising SSI. The processor applies slice security for AS traffic related to a network slice according to a Security Requirement Type indicated in the SSI.

In some embodiments, the UE Security Context setup message contains a key indicator (e.g., "Use same Kamf" indicator) that indicates that the apparatus (e.g., NG-RAN) is to use a default/common (i.e., non-slice-specific) RAN key (e.g., KgNB) for slice-specific AS security using cryptographic separation.

In some embodiments, the processor applies security for the control plane and user plane traffic related to a network slice by sending an AS SMC message that contains an SSI inclusion indication parameter that indicates that the SSI for enforcement at the UE is provided with the AS SMC message, wherein the SSI is both integrity protected and confidentiality protected with default/common AS security keys.

In some embodiments, the processor applies security for the control plane and user plane traffic related to a network slice by sending an AS SMC message that contains a SRID that indicates that the AS SMC message is slice-specific and is cryptographic separated using the SRID. In some embodiments, the processor applies security for the control plane and user plane traffic related to a network slice by sending an AS SMC message that contains a key indicator (e.g., "Use same KgNB" indicator) that indicates that the UE is to use a default/common RAN key (e.g., KgNB) and related AS keys for slice-specific AS security using cryptographic separation.

Disclosed herein is a fourth method for determining and enforcing service specific network slice security, according to embodiments of the disclosure. The fourth method may be performed by a RAN node, e.g., in a NG-RAN, such as the base unit 121, the RAN 210, the NG-RAN 301, the gNB 801, and/or the network equipment 1000, described above. The fourth method includes establishing a connection with a UE and receiving a UE Security Context setup message comprising SSI. The fourth method includes applying slice security for AS traffic related to a network slice according to a Security Requirement Type indicated in the SSI.

In some embodiments, the UE Security Context setup message contains a key indicator (e.g., "Use same Kamf" indicator) that indicates that the apparatus (e.g., NG-RAN) is to use a default/common RAN key (e.g., KgNB) for slice-specific AS security using cryptographic separation. In some embodiments, applying security for control plane and user plane traffic related to a network slice comprises sending an AS SMC message that contains an SSI inclusion indication parameter that indicates that the SSI for enforcement at the UE is provided with the AS SMC message. Here, the SSI is both integrity protected and confidentiality protected with default/common AS security keys.

In some embodiments, applying security for control plane and user plane traffic related to a network slice comprises sending an AS SMC message that contains a SRID that indicates that the AS SMC message is slice-specific and is cryptographic separated using the SRID. In some embodiments, applying security for control plane and user plane traffic related to a network slice comprises sending an AS SMC message that contains a key indicator (e.g., "Use same KgNB" indicator) that indicates that the UE is to use a default/common RAN key (e.g., KgNB) and related AS keys for slice-specific AS security using cryptographic separation.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A user equipment ("UE") for wireless communication, comprising:
   at least one memory; and
   at least one processor coupled with the at least one memory and configured to cause the UE to:
   perform primary authentication with a mobile communication network;
   receive a security mode command ("SMC") message comprising slice-specific security requirement information ("SSI") and a slice security requirement identifier ("SRID"), wherein the SSI includes a security requirement type parameter indicating whether to derive a dedicated security context after the primary authentication, and wherein the SRID identifies a security requirement information corresponding to a single network slice selection assistance information ("S-NSSAI"); and
   apply slice security for control plane and user plane traffic related to a network slice in response to the security requirement type parameter included in the SSI indicating to derive the dedicated security context after the primary authentication,
   wherein to apply slice security for control plane and user plane traffic related to the network slice, the at least one processor is configured to cause the UE to derive at least one slice-specific security key based on the received SSI and the SRID.

2. The UE of claim 1, wherein the at least one processor is configured to cause the UE to derive the at least one slice-specific security key using as additional inputs at least one of:
   a slice identifier ("ID"),
   a slice type, or
   a service type.

3. The UE of claim 2, wherein the at least one slice-specific security key comprises at least one of:
   a slice-specific access and mobility management function ("AMF") key ("Kamf"),
   a slice-specific radio access network ("RAN") key,
   a slice-specific non-access stratum ("NAS") key, or
   a slice-specific access stratum ("AS") key.

4. The UE of claim 1, wherein to apply security for control plane and user plane traffic related to a network slice, the at least one processor is configured to cause the UE to use slice-specific inputs in the ciphering and integrity protection while applying a default primary authentication-based security context for a non-access stratum ("NAS") connection, in response to the security requirement type parameter indicating that traffic of a corresponding network slice is to be protected using the dedicated security context.

5. The UE of claim 1, wherein the SMC message contains an SSI inclusion indication parameter that indicates that the SSI for enforcement at the UE is provided with the security mode command message, wherein the SSI is both integrity protected and confidentiality protected with default security keys.

6. The UE of claim 1, wherein the SMC message contains a security requirement identifier ("SRID") that indicates that the SMC message is slice-specific and is cryptographic separated using the SRID.

7. A processor for wireless communication, comprising:
   at least one memory; and
   at least one controller coupled with the at least one memory and configured to cause the processor to:
   perform primary authentication with a mobile communication network;
   receive a security mode command ("SMC") message comprising slice-specific security requirement information ("SSI") and a slice security requirement identifier ("SRID"), wherein the SSI includes a security requirement type parameter indicating whether to derive a dedicated security context after the primary authentication, and wherein the SRID identifies a security requirement information corresponding to a single network slice selection assistance information ("S-NSSAI"); and
   apply slice security for control plane and user plane traffic related to a network slice in response to the security requirement type parameter included in the SSI indicating to derive the dedicated security context after the primary authentication,
wherein to apply slice security for control plane and user plane traffic related to the network slice, the at least one controller is configured to cause the processor to derive at least one slice-specific security key based on the received SSI and the SRID.

8. The processor of claim 7, wherein the at least one controller is configured to cause the processor to derive the at least one slice-specific security key using as additional inputs at least one of:
a slice identifier ("ID"),
a slice type, or
a service type.

9. The processor of claim 7, wherein the at least one slice-specific security key comprises at least one of:
a slice-specific access and mobility management function ("AMF") key ("Kamf"),
a slice-specific radio access network ("RAN") key,
a slice-specific non-access stratum ("NAS") key, or
a slice-specific access stratum ("AS") key.

10. A method performed by a user equipment ("UE"), the method comprising:
performing primary authentication with a mobile communication network;
receiving a security mode command ("SMC") message comprising slice-specific security requirement information ("SSI") and a slice security requirement identifier ("SRID"), wherein the SSI includes a security requirement type parameter indicating whether to derive a dedicated security context after the primary authentication, wherein the security requirement type parameter indicates to derive the dedicated security context after the primary authentication, and wherein the SRID identifies a security requirement information corresponding to a single network slice selection assistance information ("S-NSSAI"); and
applying slice security for control plane and user plane traffic related to a network slice in response to the security requirement type parameter included in the SSI indicating to derive the dedicated security context after the primary authentication,
wherein applying slice security for control plane and user plane traffic related to the network slice further comprises deriving at least one slice-specific security key based on the received SSI and the SRID.

11. The method of claim 10, further comprising deriving the at least one slice-specific security key using as additional inputs at least one of:
a slice identifier ("ID"),
a slice type, or
a service type.

12. The method of claim 10, wherein the at least one slice-specific security key comprises at least one of:
a slice-specific access and mobility management function ("AMF") key ("Kamf"),
a slice-specific radio access network ("RAN") key,
a slice-specific non-access stratum ("NAS") key, or
a slice-specific access stratum ("AS") key.

* * * * *